United States Patent Office

3,509,969
Patented May 5, 1970

3,509,969
AVAILABLE CAR ELEVATOR CONTROL INCLUDING MEANS TO PROVIDE EXTENSION FLOOR SERVICE
John Suozzo, Paramus, and Henry C. Savino, Hackinsack, N.J., assignors to Westinghouse Electric Corporation, Pittsburgh, Pa., a corporation of Pennsylvania
Continuation-in-part of applications Ser. No. 94,723, Mar. 10, 1961, and Ser. No. 110,464, May 16, 1961. This application Aug. 30, 1962, Ser. No. 220,522
Int. Cl. B66f 1/18
U.S. Cl. 187—29                             24 Claims This application is a continuation-in-part of our co-pending patent applications, Ser. Nos. 94,723 and 110,464 which were filed respectively on Mar. 10, 1961, and May 16, 1961; and which have issued as Pats. 3,256,958 and 3,292,736.

The present application as filed included most of the subject matter of our aforesaid patent application, Ser. No. 110,464, and comprised a thorough description of the invention. Inasmuch as the latter patent application has issued as a Pat. 3,292,736, the present specification has been redrafted to delete virtually all common subject matter appearing in the patent, which will be referred to as the reference patent. It is to be understood that all subject matter appearing in the specification of such patent, including all conventions, is incorporated herein by reference as modified below. In our present patent application an extension or basement floor forms part of the invention.

In accordance with the invention, an elevator car which is not assigned to serve a floor and which is stopped at a floor other than the lower terminal floor in general may become available for dispatching or assignment to serve any other floor, including the lower terminal floor, provided that its doors are closed and that no car call is registered for such car. It may be desirable to impose further limitations upon the availability of such car. For example, if the car, made its last stop during an up trip, it may become an available car provided that, in addition to the foregoing conditions, no up floor call is registered for any floor above the car in a lower group or zone of floors which includes the floor at which the car is stopped, although concurrently an up floor call may be registered for a floor in a higher zone. Under such a limitation, the car must answer all registered up floor calls in the aforesaid lower zone (and all subsequently registered car calls) before it is permitted to become an available car.

If, however, the elevator car made its last stop during a down trip, it may become available for dispatching or assignment to serve any other floor if, as an alternative to the aforesaid absence of a registered car call for such car, suitable detecting means determines that no one is inside of the car. This is for the reason that a passenger, knowing that his car is conditioned for down travel, may expect the car to proceed automatically to the lower terminal floor, despite the fact that he has not registered a car call therefor.

In our reference patent a sequence is described for answering up floor calls. If an available car located in the high up zone is selected and assigned to answer an up floor call for a floor in the low up zone such car will travel down to the low up zone, will reverse at the lowest floor for which an up floor call is registered in such low up zone and preferably will answer all up floor calls for floors above the car in the low up zone and all car calls.

Further modifications and refinements may be introduced in order to provide increased efficiency of elevator service. In a preferred embodiment of the invention, if a plurality of demands for elevator service are registered up and down zones are given preferential service in accordance with the following sequence: timed-out down zones, timed-out up zones, non-timed-out down zones, non-timed-out up zones. In addition, it may be desirable to provide means for varying automatically or manually the time required for an unanswered floor call to become a priority call. For example, during a down peak or an up peak traffic demand period such time may be lengthened automatically; and similarly if an elevator car is taken out of service due to malfunction or for maintenance, since the average time during which a prospective passenger must await the arrival of an elevator car in response to his registration of a floor call then would increase. Moreover, a clock may be employed for decreasing such time in order to provide preferential service for some or all of the floors at predetermined times during the day. Additionally, a manually operable device such as a switch may be provided to effect preferential service for a given floor, such as an executive floor. Means also may be furnished for adjusting the times of priority floor calls to different values for different floors or zones of floors under the same traffic condition.

In accordance with the invention, if the elevator system serves a basement floor or zone and a passenger within an elevator car capable of serving such floor (hereafter referred to as a "basement car") registers a car call therefor, such car proceeds to the basement floor. After the passenger is discharged, the car may become available for assignment, and thereafter it may be treated in the manner explained above. If a prospective passenger registers a down floor call for the lower terminal floor or an up floor call for the basement floor, i.e., a demand for basement service, and there are a plurality of basement cars, one of such cars is selected to provide such service in accordance with a program providing optimum efficiency of the system. Thus, in general, the closest unassigned basement car to the basement floor is assigned to respond to a demand for basement service. For this purpose, means are provided for selecting a car in one of the following four predetermined conditions, preference being given in the order of listing:

(1) A car located in the basement zone;
(2) A non-next basement car at the lower terminal floor;
(3) An available next basement car at the lower terminal floor;
(4) The closet unassigned basement car to the lower terminal floor, either available or down-travelling.

For example, if there are simultaneously two elevator cars meeting respectively the first and second listed conditions, the car in the first listed condition is assigned to provide the desired service for the basement floor.

If the closest unassigned down-traveling basement car to the lower terminal floor (see the fourth listed condition above) is selected to respond to a demand for basement service, such car will answer all car calls as it proceeds to the basement floor. In a preferred embodiment of the invention, the car also will stop on its way down at each floor for which a down floor call has been registered unless a priority down floor call for the first floor or a priority up floor call for the basement floor, i.e., a priority basement service demand, is registered. In the latter instance, the car may be expressed to the basement floor, that is, it may be prevented from stopping at any floor for which a down floor call is registered except the lower terminal floor or, if desired, it may be conditioned to answer only priority down floor calls. Means also may be provided to insure that in either event only the selected car will by-pass each floor above the lower terminal floor for which a non-priority down floor call is registered. Thus, if another basement car subsequently must travel to the basement floor in response to a car call therefor, it must stop on its way down at each floor for which a down floor call is registered, even if the last-named call is a non-priority call. Preferably, the indication that a service demand for which a basement car has been selected to respond is a priority demand is cancelled when such car arrives at the lower terminal floor.

Desirably, if an intending passenger at the lower terminal floor registers a down floor call and subsequently fails to enter an elevator car assigned to provide basement service in response to his call, the assignment of such car to provide basement service is cancelled.

In some applications, at certain periods of the day heavy demands for up travel from both the lower terminal floor and a basement floor may be encountered. If a parking garage, for example, is located below a building the provision of efficient elevator service for both the lower terminal floor and a basement floor immediately before the start of a business day may pose a problem of substantial magnitude. Likewise, if a cafeteria is located at the basement level, a similar problem may arise toward the end of the lunch period.

According to another aspect of the invention, the elevator system is transferred to a modified form of no demand return operation when there are relatively high demands for up service simultaneously from the lower terminal floor and a basement floor. The transfer may be effected either manually or at a predetermined time. During such operation, if no elevator car is located at or assigned to the lower terminal floor or to the basement floor, the closest available or unassigned down-traveling car to the respective floor in general is assigned to serve such floor. Furthermore, under certain conditions, the assigned car may be expressed to the particular floor in the manner described above. Additional features of operation for further expediting service for both the lower terminal and basement floors under the specified conditions will be discussed hereafter.

In accordance with this system, if there is no available car at the lower terminal floor and if the elevator system serves a basement floor below such terminal floor, an available car at the basement floor may be selected to respond to the down service demands.

The invention also contemplates the provision of "emergency" service in the event that a malfunction in the elevator system results in the failure of an elevator car to operate in a normal manner, and, more specifically, if an available car fails to respond to a demand for service. Thus, upon the expiration of a predetermined time following such failure, each remaining available car may be assigned and dispatched in turn to serve a floor for which a down floor call is registered. For example, each of such cars may be assigned to answer the highest down floor call remaining after the preceding car has been so assigned. If, on the other hand, one or more up floor calls are registered, successive next elevator cars are dispatched from the lower terminal floor to answer such calls. Consequently, during emergency operation the continuity of elevator service is maintained in a reasonable manner.

To facilitate an understanding of the invention, a block diagram showing many features of the invention is presented in FIG. 19 and will now be described.

In this block diagram two elevator cars A and B are located at the first or main floor and a third car C is positioned at the second floor of the building. Signals representing information such as floor call registration, car direction, car positions, car loading, car call registration are supplied to apparatus which controls operation of the system.

The First Floor Dispatcher BLK1 selects a car at the first floor as the next car to leave the floor after expiration of a loading interval. Under certain conditions Instant Dispatch Unit BLK3 operates to start next cars from the first floor in rapid succession. For example, this may occur when a car set for down travel is fully loaded.

The No-Demand Return feature BLK5 operates in response to a substantial demand for service in the up direction. Such a demand may be ascertained by measurement of the loading of an elevator car conditioned for up travel at the lower terminal floor. In No-Demand Return operation movement to the first floor of a car set for down travel may be expedited, for example as a result of registration of an artificial call for such floor.

Under certain conditions calls may be termed "priority" calls, such as calls which have been registered for at least a predetermined time. The Adjustable Priority Call apparatus BLK7 for determining priority calls is adjustable for varying the conditions establishing a priority call, such as the value of such predetermined time.

The floors are divided into zones. If a plurality of demands for elevator service are registered the zones are given preferential service in predetermined sequence dependent on factors such as direction of demand and presence of priority calls, and a zone is selected by the Zone Selector BLK9.

An Available Car Detector BLK11 detects the availability of a car for assignment. Such a car may be one which has no registered car call and which has closed doors. If the car made its last stop during an up trip a further requirement may be that no up floor call is registered for a floor above the car in the zone occupied by the car. The presence of such a car is noted by a unit BLK13.

Such a car also may be one which made its last stop during a down trip, if it has no registered car call or is empty as determined by a unit BLK15.

Dependent on the availability of a car and the zone selected, an available car in the best position is selected for assignment to such zone by a selector BLK17.

It is possible that a selected car may fail to respond. Under such circumstances an emergency service unit BLK19 assigns each remaining car to serve a floor for which a down floor call is registered.

To provide basement service a unit BLK21 selects a basement serving car which is in the best position to provide such service. Under certain conditions as those involving heavy traffic from lower terminal or basement floors or presence of a priority call condition service for such floors is expedited by a unit BLK23.

It is, therefore, a first object of the invention to provide an improved elevator system comprising a bank of elevator cars.

It is a second object of the invention to provide an improved bank of elevator cars wherein each of the elevator cars becomes available for assignment and dispatching from each of the floors served thereby to serve any other floor provided that, in general, the car is stopped, its doors are closed and no car call is registered for such car, and regardless of whether the car made its last stop during an up trip or a down trip.

It is a third object of the invention to provide an improved elevator system wherein expedited elevator service is proveded for floors for which there are priority service demands in accordance with a predetermined sequence and wherein the establishment of a given priority service demand is responsive to each of a plurality of conditions.

It is a fourth object of the invention to provide an improved elevator system as defined in the preceding object, in which such conditions include the overall demand for elevator service.

It is a fifth object of the invention to provide an improved elevator system as defined in the third object, in which such conditions include the number of elevator cars in the bank capable of providing normal elevator service.

It is a sixth object of the invention to provide an improved elevator system having a plurality of elevator cars capable of serving principal floors of a structure, including a main floor, and at least one extension floor adjacent such main floor.

It is a seventh object of the invention to provide an elevator system as defined in the preceding paragraph, in which, upon the registration of a demand for service for an extension floor, the closest unassigned elevator car to such floor is selected to respond to such demand.

It is an eighth object of the invention to provide an elevator system as specified in the preceding object, in which, upon the occurrence of a predetermined condition, the selected elevator car is expressed to the extension floor, thereby further expediting service for such floor.

It is a ninth object of the invention to provide an improved elevator system having a plurality of elevator cars for serving principal floors of a structure, including a main floor, and at least one extension floor adjacent such main floor wherein the elevator system may be transferred to a mode of operation providing efficient service for both the main floor and an extension floor when there is a substantial demand for service from both of such floors.

It is a tenth object of the invention to provide an improved elevator system as defined in the preceding paragraph, in which during such mode of operation an elevator car is specifically assigned to serve each of the main and extension floors under predetermined conditions.

It is an eleventh object of the invention to provide an improved elevator system as specified in the preceding object wherein, upon the occurrence of a predetermined condition, an assigned elevator car is expressed to its assigned floor for further expediting service for such floor.

It is a twelfth object of the invention to provide an improved elevator system comprising a bank of elevator cars serving a plurality of floors of a structure wherein, in response to the occurrence of a predetermined condition, only a portion of the elevator cars serves the floors of the structure.

It is a thirteenth object of the invention to provide an elevator system comprising a bank of elevator cars having improved emergency service in response to the occurrence of a malfunction in the system.

It is a fourteenth object of the invention to provide an improved elevator system having a bank of elevator cars wherein, in response to the failure of a portion of the elevator cars to satisfy a demand for service, the remaining portion of cars is transferred to a predetermined mode of operation for maintaining the continuity of elevator service.

Other objects of the invention will be apparent from the following description, taken in conjunction with the accompanying drawings, in which.

Figure 19:
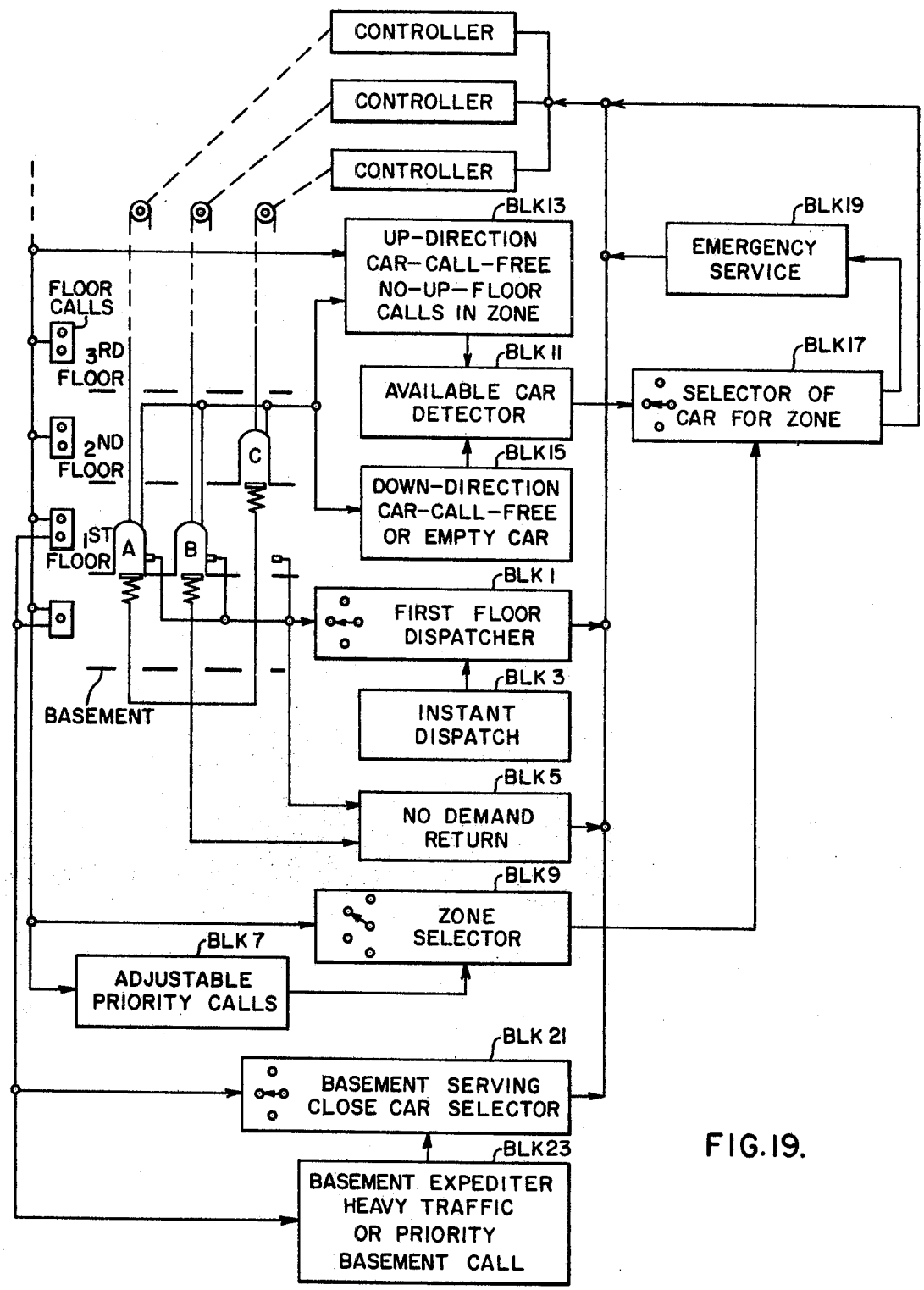

FIGS. 18A through 18K are key representations in stem form of electromagnetic relays, solenoids and switches and their respective associated contacts employed in the circuits of FIGS. 1 through 16. In these figures, the switches, solenoids and relays are arranged first in alphabetical and then in numerical sequence. Each stem is headed by a reference character which designates the coil of the particular relay or switch with which it is associated; and FIG. 19 is a block diagram showing many features of the invention.

Figure 14:
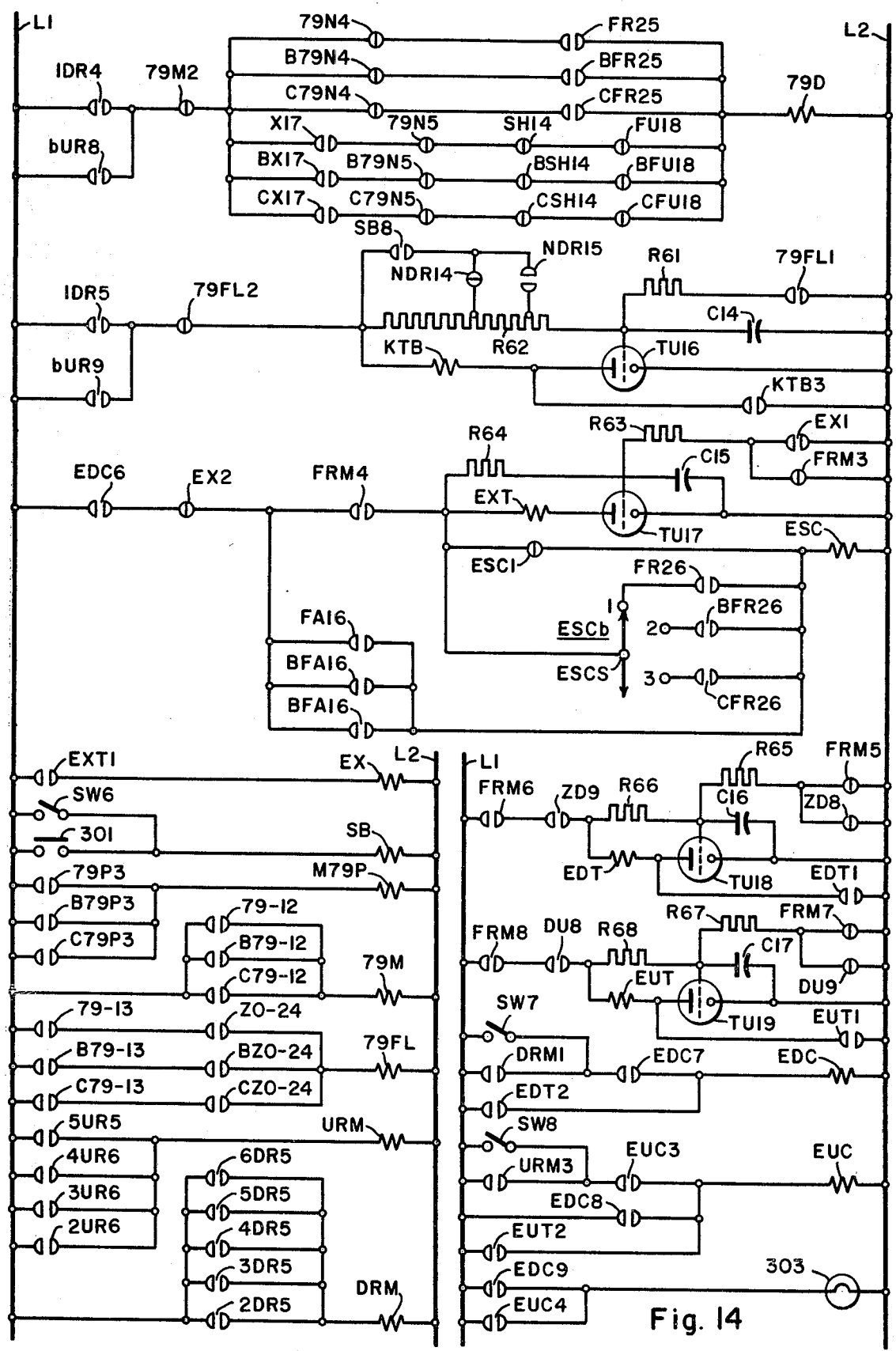

Components and circuits which differ from our reference patent are shown in heavy lines, except for FIG. 14 which is new.

In our Pat. 3,292,736 an elevator system is described in detail for a structure or building having six principal floors including a lower terminal floor, an upper terminal floor and four intermediate floors. In the following description an extension or basement floor is added below the lower terminal floor.

In order to facilitate the presentation of the invention, certain apparatus specific to the car A and certain apparatus common to all of the elevator cars are set forth as follows. (Items followed by an asterisk are not shown in our Pat. 3,292,736. In some cases the relays which correspond to our patent relays have additional contacts.)

APPARATUS FOR ELEVATOR CAR A bCR—Basement car call registering relay*
D—Down switch
DCA—Down call above relay
DC—Door-close solenoid
DFR—Down available car relay*
DO—Door-open solenoid
DS—Door relay
E—Inductor slowdown relay
F—Inductor stopping relay
FA—Down call assigned relay
FCR—Demand response relay
FR—Available car relay
FRS—Auxiliary available car relay
FU—Up call assigned relay
FUH—High up zone assigned relay
G—Holding relay
KA—Assigned zone stepping switch
KB—Down zone call below relay
LB—Detector relay
LU—Limited up travel relay*
M—Running relay
ND—Notch relay
P—Parking relay
RA—First auxiliary running relay
S—Floor call stopping relay
SH—Down zone assigned relay
SS—Start relay
ST—Assigned zone stopping relay
T—Car call stopping relay
TDC—Priority zone stopping relay
U—Up switch
V—Speed relay
W—Up preference relay
X—Down preference relay
ZB*, Z0, Z1, Z2, Z3—Zone position relays
1CR through 6CR—Car call registering relays
38D—Car call below relay*
38R—Car call above relay
42—Auxiliary door-control relay
45—Door-control relay
50—Motor-generator starting relay
69H—High call reversal relay
69L—Low call reversal relay
70T—Non-interference relay
78D—Up call below relay
78U—Up call above relay
79—Basement service relay*
79N—Basement cutout relay*
79P—Basement by-pass relay*
80—Second auxiliary running relay
139—Motor-generator shutdown relay
981—Lower terminal no-start relay

APPARATUS COMMON TO ALL CARS

AH—Master high up zone assigned relay
AHC—Highest down call relay
AL—Low up zone assigned relay
bUR—Basement up floor call registering relay*
DRM—Master down call relay*
DT—Down by-pass timing relay
DU—Up zone demand relay
DUL—Low up zone demand relay
DUH—High up zone demand relay
EDC—Down emergency relay*
EDT—Down emergency timing relay*
ESC—Down emergency stepping switch*
EUC—Up emergency relay*
EUT—Up emergency timing relay*
EX—Down emergency reset relay*
EXT—Down emergency reset timing relay*
FRM—Master available car relay
FSH—High zone stepping switch
FSL—Low zone stepping switch
FZM—Master zone relay
FZT—Zone resetting relay
FZ0, FZ1, FZ2, FZ3—Zone relays
F0C, F1C, F2C, F3C—Assigned zone relays
H—Motor-generator running relay
KBH—High zone demand relay
KBL—Low zone demand relay
KH—High up zone call relay
KHT—High up zone timing relay
KL—Low up zone call relay
KLT—Low up zone timing relay
KMT—Down zone priority relay
KTB—Basement timing relay*
K0, K1, K2, K3—Down zone demand registering relays
K1T, K2T, K3T—Down zone timing relays
LNT—Absence timing relay
MCA—Master down call above relay
MFB—Lower terminal surplus car relay
MFC—Multiple available car relay
MG—Motor-generator timing relay
MN—Master next car relay
MX—Master down preference relay
MZ0—Master car position relay
M79P—Master basement by-pass relay*
NDR—No demand return relay
NFT—Loading relay
NL—Lonely car relay
PD—Instant dispatch relay
RNS—No scan relay
SB—Special basement service relay*
SC—Down demand mid-point relay
SCR—Pulsing relay
SCT—Firing relay
SFB—Lower terminal non-next relay
SHN—High zone no selection relay
SLN—Low zone no selection relay
SZ—Down demand mid-point stepping switch
SZR—Scan relay
UHT—First loading interval relay
URM—Master up call relay*
UT—Second loading interval relay
ZD—Down zone demand relay
Z1U—Low up zone position relay
Z2U—High up zone position relay
1DR* through 6DR—Down floor call registering relays
1UR through 5UR—Up floor call registering relays
69P—Closest car relay
77D—Down by-pass relay*
77U—Up by-pass relay
79D—Basement demand relay*
79FL—Basement time resetting relay*
79M—Master basement service relay*
911R—Clearance relay
982—Master lower terminal relay In order to present the invention in an orderly manner, the apparatus and control circuits for each of the FIGS. 1 through 16 will be discussed separately. Thereafter, a number of typical operations of the entire system will be considered.

Since many similar components are employed in the apparatus and control circuits for the elevator cars A, B and C, the description of the apparatus and control circuits will be directed primarily to those associated with the car A. With the notation employed, similar components employed for the other elevator cars readily may be traced. If different components are employed for certain of the elevator cars, these different components will be discussed as required.

FIG. 1

Figure 1:
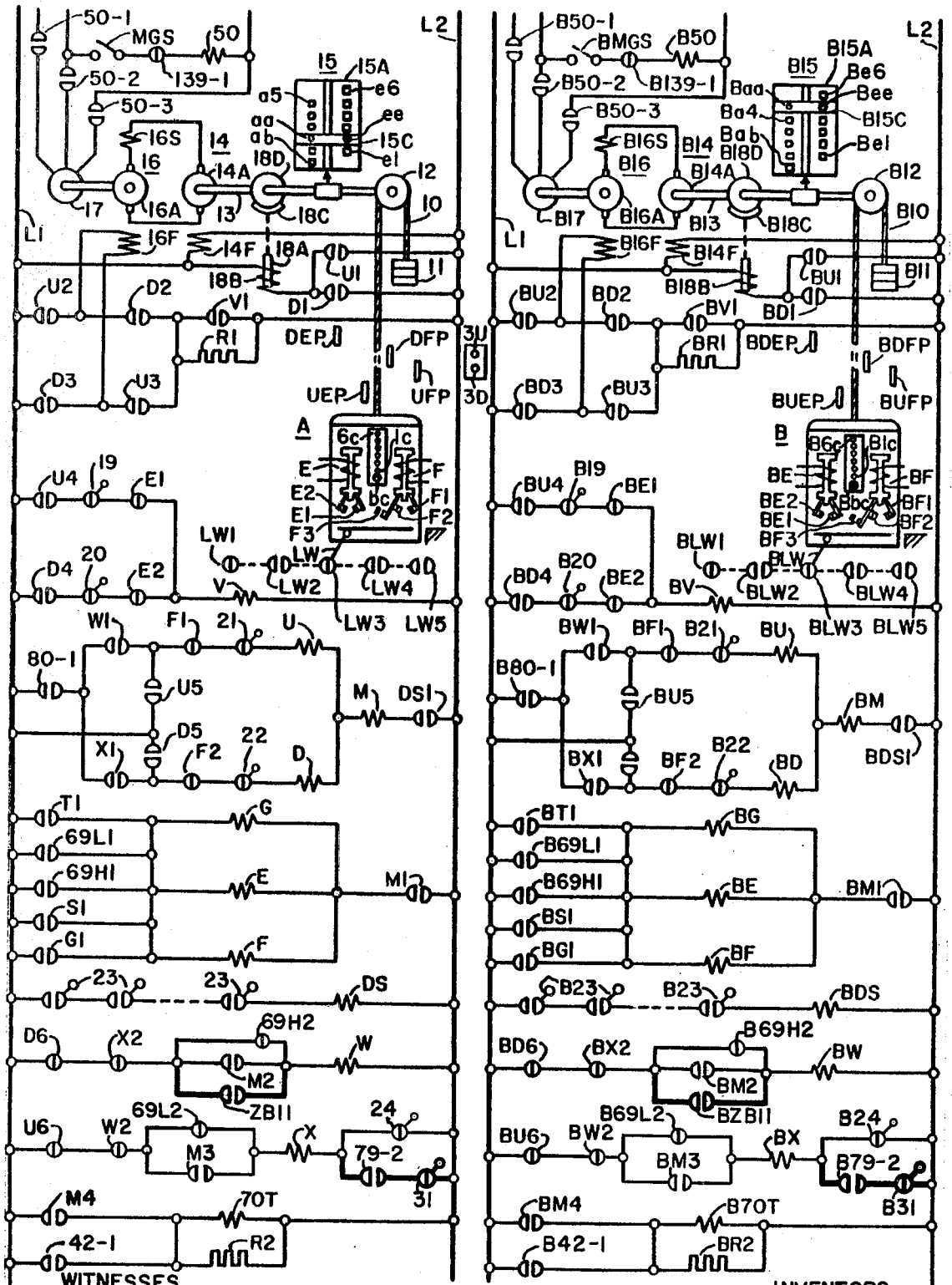
FIG. 1 is a schematic view in straightline form of a portion of an elevator control system embodying the invention.

FIG. 1 is similar to FIG. 1 of our reference patent except as follows:

Inasmuch as a basement floor has been added a car call push button bc is shown for such floor.

A contact segment ab for the basement floor is shown on the selector panel 15A. Also instead of the b row on the selector, contact segments are represented by the row e1 to e6 for the first to sixth floors. This row is associated with a brush ee mounted on the brush carriage 15C.

The make contacts M2 are shunted by make contacts ZB11 which are closed when the elevator car is adjacent the basement floor to permit energization therethrough of the up preference relay W.

In the circuit for the down preference relay X, the limit switch 24 is shunted by a limit switch 31 and make contacts 79-2. The limit switch 31 is cam-operated to open as the car A reaches the basement floor and the contacts 79-2 close if the car is to answer a call for basement service.

FIGS. 2 AND 3

A sign of conventional construction may be provided for each of the elevator cars. For the car A, the sign 55 is controlled by make contacts 79N1 of the basement cutout relay 79N. Thus, if relay 79N is picked up to render the car A incapable of providing basement service, its contacts 79N1 close to illuminate the sign 55, thereby conveying the information that this car does not provide basement service.

The available car relay FR, when energized, indicates that the elevator car A is available to accept an assignment for service. Let it be assumed that the car A is stopped (break contacts M9 of the running relay M are closed) at the lower terminal or first floor (break contacts Z0-1 of the zone position relay Z0 are open), that the car A is conditioned for up travel (make contacts W7 of the up preference relay W are closed) and that the doors of the elevator car A are open. Since the doors of the car A are open, a switch 27 also is in open condition. The switch 27 is cam operated to close as the doors of the car A close when such doors are approximately four inches from their fully-closed position. Assume further that break contacts 38R2 are closed to indicate that no car call is registered for the car A, that the car A is not to be started from the first floor to answer a car call for a floor above the first floor (break contacts SS1 are closed), that it is not assigned to answer an up floor call (break contacts FU2 are closed) and that it is not assigned to answer a down floor call (break contacts FA3 are closed).

If the preceding conditions are met, an energizing circuit is completed for the relay FR if the following conditions also are met: Make contacts N1 are closed to indicate that the car A has been selected by the dispatcher for the first floor as the next car to leave such floor and break contacts NFT1 are closed to signify that no load has entered or left the car A during a pre-determined interval of time following such selection or make contacts UT3 of the second loading interval relay UT are closed (as a practical matter, the latter contacts are operable for effecting pickup of the relay FR only when the elevator system is conditioned for instant dispatch operation); make contacts 981–1 are closed to signify that the car A is at the first floor and is not to be started in the up direction; finally, break contacts NDR1 are closed to signify that the elevator system is not conditioned for no demand return operation or make contacts SB1 are closed to indicate that the elevator system is conditioned to provide special service for the basement floor. When the available car relay FR picks up, its make contacts FR3 close to establish a holding circuit around the contacts ZB9, 981–1 and 78U3.

If in the preceding example the elevator car A is not selected by the lower terminal floor dispatcher as the next car to leave such floor (make contacts N1 are open), the available car relay FR may be energized if the doors of the elevator car A are closed, since such closure is accompanied by closure of the cam-operated switch 27, as aforesaid.

From the preceding discussion, it will be observed that if the elevator car A is stopped at a floor other than the first floor and is conditioned for up travel, the available car relay FR may be energized to indicate that the car A is available to accept an assignment for service if the doors of the car A are closed, if no car call is registered for the car A and if the car A is positioned at the basement floor (make contacts ZB9 are closed) or, in the event that the car is located above the first floor, if no up floor call is registered for a floor above and in the same zone as the floor at which the car is located, as follows:

L1, 27, SS1, M9, FU2, FA3, 38R2, 78U3, Z0–1, W7, FR, L2

For purposes which will be discussed hereinafter, the available car relay FR is provided with a slight time delay in dropout by any conventional means.

The auxiliary available car relay FRS also may be energized through the same circuits which effect energization of the available car relay FR, provided that the closest car relay 69P is dropped out (break contacts 69P1 are closed) and that either the car A is capable of providing basement service (break contacts 79N2 are closed) or, if it is not so capable (the contacts 79N2 are open), break contacts 79D1 are closed. If, however, the relay 69P is picked up (break contacts 69P1 are open and make contacts 69P2 are closed) for reasons which will be discussed hereinafter, energization of the relay FRS may be completed through either of two groups of contacts. The first of these groups again comprises the circuits which effect pickup of the relay FR, make contacts FR21, which close when the relay FR is energized, make contacts 79D2, which are closed if an elevator car capable of serving the basement floor, i.e., a basement car is in a condition to be selected to respond to an existing demand for basement service and break contacts 79N2, which are closed if the car A is capable of serving the basement floor (the contacts 79D1 are open when the contacts 79D2 are closed). On the other hand, if the relay FR is dropped out (make contacts FR21 are open), an energizing circuit is completed for the auxiliary available car relay FRS if the elevator car A is not assigned to answer a registered up floor call (break contacts FU12 are closed), is not assigned to serve a specific down zone (break contacts SH11 are closed), is conditioned for down travel (make contacts X12 are closed) and is not conditioned to serve the basement floor (break contacts 79–16 are closed), and if the contacts 79N2 or 79D1 are closed as aforesaid.

Pickup of the down available car relay DFR indicates in general that the elevator car A is stopped at a floor above the lower terminal or first floor, is conditioned for down travel, is unassigned and has no car call registered for a floor below the floor at which it is located. By inspection of FIG. 2, it will observed that a portion of the energizing circuit for the available car relay FR also is employed in the energizing circuit of the relay DFR. The operation of such portion will be understood from the preceding discussion. In addition, pickup of the relay DFR may be effected if make contacts H13 are closed (two or more elevator car motor-generator sets are running), break contacts SH13 are closed (the car A is not assigned to serve a particular down zone of floors), break contacts 79–18 are closed (the car A is not conditioned to serve the basement floor), break contacts NDR12 are closed (the elevator system is not conditioned for no demand return operation), break contacts EDC10 are closed (the elevator system is not conditioned to provide emergency down service), break contacts P5 are closed (the car A is not to park at the first floor), break contacts 38D1 are closed (no car call is registered for the car A for a floor below the car) and make contacts X15 are closed (the car A is conditioned for down travel).

Pickup of the down available car relay DFR is accompanied by closure of its make contacts DFR2 to establish with break contacts FR22 a holding circuit around the contacts 38D1 and X15. In addition, make contacts DFR1 close to prepare the available car relay FR for energization.

Figure 2:
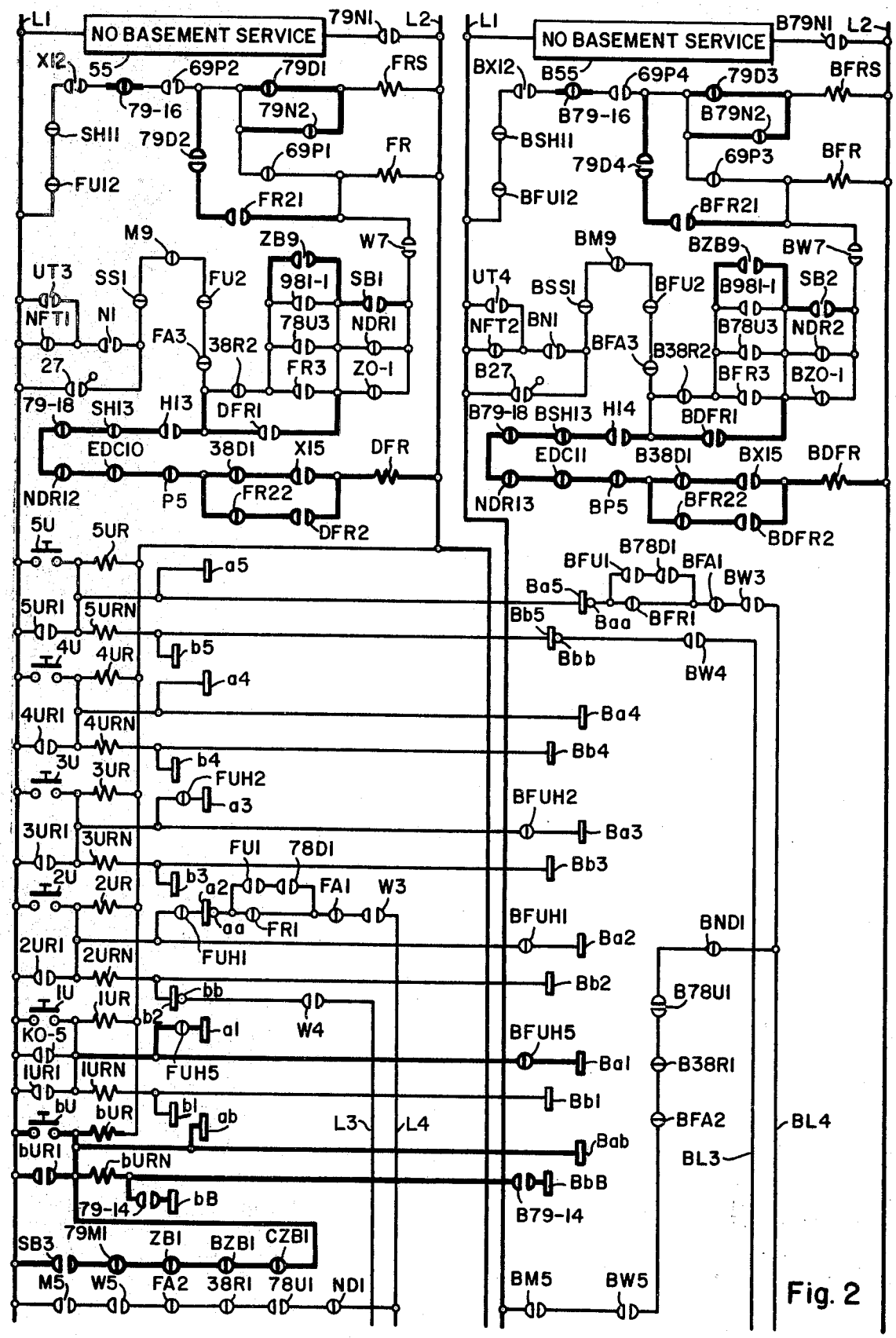
FIGS. 2 through 14 are schematic views with circuits shown in straight-line form of further portions of the elevator control system illustrated in FIG. 1.
Figure 3:
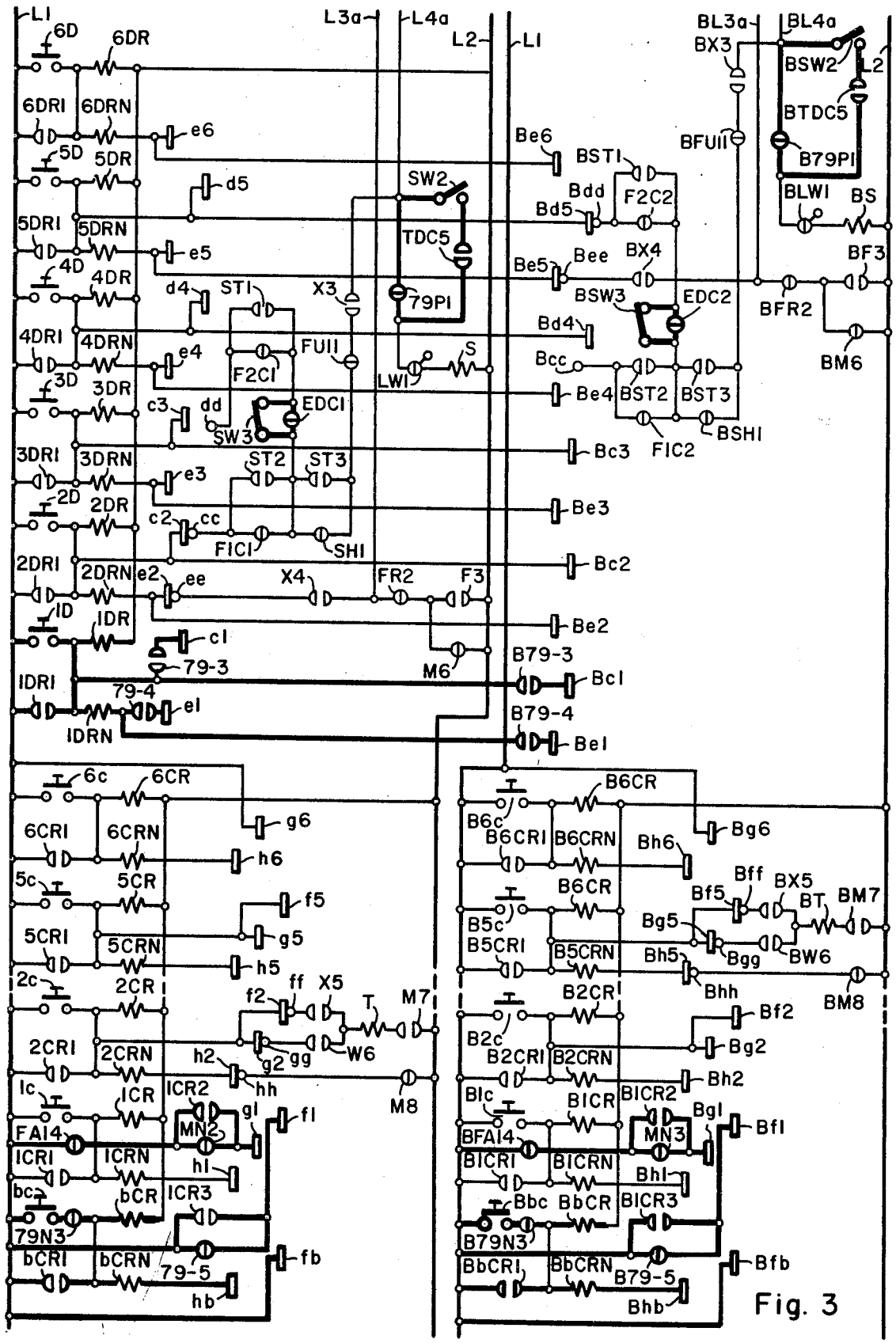

The lower part of FIG. 2 illustrates the up floor call registering circuits for the elevator cars, while the upper part of FIG. 3 shows down floor call registering circuits for the cars. For a clear understanding of the following discussion of such circuits, FIG. 2 should be positioned above FIG. 3 so that buses L3a, L4a, BL3a and BL4a of FIG. 3 respectively are aligned with and continuations of correpsonding buses L3, L4, BL3 and BL4 of FIG. 2.

Figure 4:
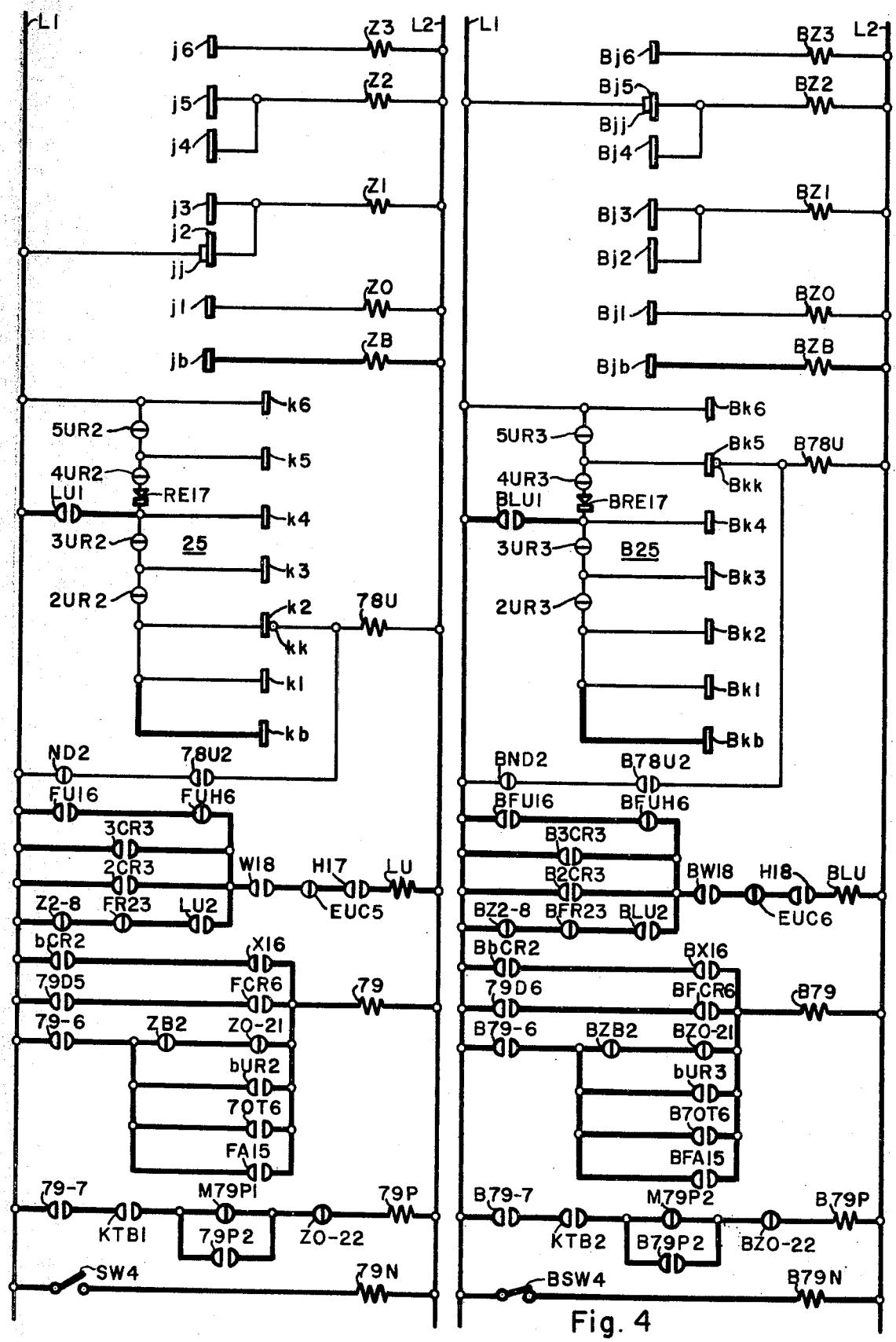

It should be noted that in general the functions of the relays FR and FRS are similar to those in FIG. 4 of our reference patent. However, because of the substantial changes in their control circuits these circuits have been described in detail above.

The up floor call registering circuits operated by the push buttons 1U through 5U are similar to those shown in FIG. 2 of our Pat. 3,292,736. However an up floor push button bU with its registering relay bUR and cancelling coil bURN are shown associated with their contact segments ab, bB in the a and b selector rows, and similar segments for the other cars in a manner analogous to that employed for the other push buttons. One difference resides in the provision of make contacts 79–14 between the contact segment bB and its associated cancelling coil bURN. The car A can cancel a registered up floor call for the basement floor only if the make contacts 79–14 are closed to indicate that the car A is to respond to such call.

The break contacts 79P1 added in series with the coil of the floor call stopping relay are closed when the basement by-pass relay 79P is dropped out. These contacts may be by-passed through a manually-operated switch SW2 in series with make contacts TDC5 of the priority zone stopping relay TDC.

Closure of the make contacts 1UR1 of the first-floor call registering relay connects a first-floor contact segment a1 of the a row in series with break contacts FUH5 to the bus L1. If the car A is assigned to answer registered up floor calls for floors in the high up zone, the relay FUH opens its break contacts FUH5 to prevent energization of the floor call stopping relay S as the car travels up from the basement floor.

Referring to the up floor call registering relay 1UR for the first floor, it will be noted that make contacts K0–5 are in parallel with the push button 1U. Consequently, if the contacts K0–5 are closed to indicate the existence of an automatic or artificial demand for first floor service, the elevator car A will stop at the first floor while traveling up from the basement floor even though the push button 1U has not been pressed to register an up floor call for the first floor, provided also that break contacts FUH5 are closed to indicate that the car A is not assigned to answer registered up floor calls for floors in the high up zone and that break contacts FA1 are closed to signify that the car A is not assigned to answer a registered down floor call.

In addition, under certain conditions, an automatic or artificial up floor call is registered for the basement floor. For this purpose, a group of contacts are connected across the up floor call push button bU for the basement floor. Thus, if the elevator system is to provide special service for the basement floor (make contacts SB3 are closed), if no car has been assigned to serve the basement floor (break contacts 79M1 are closed) and if no elevator car is located at such floor (break contacts ZB1, BZB1 and CZB1 are closed), and energizing circuit is completed for the basement floor up floor call registering relay bUR even in the absence of actuation of the push button bU.

In the upper half of FIG. 3 the down floor call circuits are similar to those shown in the lower half of FIG. 2 of our Pat. 3,292,736 except that break contacts EDC1 of a down emergency relay EDC are connected in series with the brush dd. These contacts are shunted by a manually-operated switch SW3. As previously noted contacts 79P1 and TDC5 together with the switch SW2 are also added in FIG. 3. Thus to answer a down floor call through the brush dd the switch SW3 or the contacts EDC1 must be closed; to answer a down floor call through either of the brushes dd and cc the contacts 79P1 or the series circuit including the switch SW2 and the contacts TDC5 must be closed.

Inasmuch as the elevator car A can now serve the basement floor a first floor down push button 1D, a first floor down call registering relay and a first floor down call cancelling coil 1DRN are associated with contact segments c1 and e1 in a manner similar to the association of corresponding components for the second floor. Make contacts 79-3 and 79-4 of the basement service relay in series with the contact segments c1 and e1, respectively, close to stop the car A at the lower terminal or first floor in response to the registered down floor call therefor and to cancel such call only if the car A during a particular down trip is to provide service for the basement floor. Since the elevator cars do not travel downwardly from the basement floor, no down floor call registering circuits are provided for such floor.

Assuming that a manually-operable switch SW2 is in its open condition, as is shown in FIG. 3, and that the car A is to provide service for the basement floor during a particular down trip, break contacts 79P1 of the basement by-pass relay open to prevent energization of the floor call stopping relay S and consequently the stopping of the car A during such trip in response to a registered of the car A during such trip for any floor above the lower terminal down floor call for any floor above the lower terminal floor. Alternatively, the switch SW2 may be operated to its closed condition if desired, and make contacts TDC5 of the priority zone stopping relay will close to effect stopping of the car A during such trip in response to a registered down floor call, provided that such call is a priority or timed-out call.

The switch SW3 in the circuit of the brush dd may be operated manually to its open condition to render break contacts EDC1 of the down emergency relay effective to control the stopping of the car A in response to registered down floor calls for the fourth and fifth floors in the second down zone. Thus if the switch SW3 is open and the elevator system is conditioned to provide emergency down service, the contacts EDC1 are open to prevent the car A from answering a registered down floor call for either the fourth or the fifth floor. Under all other conditions, the contacts EDC1 are closed and the car A operates as heretofore described, regardless of the condition of the switch SW3.

The car call registering circuits for the basement floor also may be similar to those provided for the intermediate floors. Since the elevator car A can stop at the basement floor only during down travel, however, a contact segment for the basement floor need not be provided in the g row. For this reason, in the car call registering circuits only contact segments fb and hb are illustrated for the basement floor. By reference to FIG. 3, it will be noted that the contact segment fb is connected directly to the bus L1, since the car A always stops at the basement floor if it reaches such floor. It also will be observed that the pressing of the push button bC is effective for energizing the relay bCR to register a basement car call for the car A only if break contacts 79N3 of the basement cutout relay are closed. Thus, if the relay 79N is picked up for the purpose of rendering the car A incapable of serving the basement floor, the contacts 79N3 are open to prevent the registration of a car A car call for such floor.

The car call registering circuits for the lower terminal or first floor are somewhat modified with respect to those associated with the intermediate floors. Thus, it will be observed that the contact segment f1 is connected to the bus L1 through parallel break contacts 79-5 and make contacts 1CR3. Consequently, the elevator car A always stops at the first floor during down travel if it reaches such floor provided that it is not conditioned to serve the basement floor (the contacts 79-5 are closed). If it is so conditioned (the contacts 79-5 are open), the contact segment f1 is effective for stopping the car only if a car call is registered for the first floor (the contacts 1CR3 are closed). Similarly, the contact segment g1 is connected to the bus L1 through break contacts FA14 connected in series with parallel break contacts MN2 and make contacts 1CR2. As a result, the car A always stops at the first floor during up travel from the basement floor if the car is not assigned to answer a registered down floor call (the contacts FA14 are closed) and if there is no next elevator car at the first floor (the contacts MN2 are closed). If a next car is located at the lower terminal floor (the contacts MN1 are open), the contact segment g1 effects stopping of the car A at such floor only if a car call is registered therefor (the contacts 1CR2 are closed), provided that the contacts FA14 also are closed.

FIG. 4

In order to ascertain the position of the elevator cars with respect to the floors of the building, a plurality of zone position relays are provided for each of the cars. For the elevator car A, these relays comprise the zone position relays ZB, X0, Z1, Z2 and Z3. Such relays are similar to the relays shown in the lower part of FIG. 3 of our reference patent except for the addition of the relay ZB and its contact segment jb in the j row for the basement floor which engages the brush jj to energize the zone position relay ZB when the car A is at or adjacent the basement floor.

The call above circuit 25 is similar to the circuit shown in the lower part of FIG. 3 of our Pat. 3,292,736 except for the addition of a contact segment kb which is connected to the contact segment k1 and which engages the brush kk when the car A is at or adjacent the basement floor.

Also a rectifier RE17 is interposed between the contacts 4UR2 and the contact segment k4. Finally, the contact segment k4 is connected to the bus L1 through make contacts LU1.

If the car A is located below the fifth floor, closure of make contacts LU1 of the limited up travel relay LU renders ineffective the opening of break contacts 4UR2 or 5UR2 (indicating the registration of an up floor call for the fourth or fifth floor) to deenergize and drop out the relay 78U. The blocking rectifier RE17, on the other hand, prevents energization of the relay 78U through the contacts LU1 when the car A is positioned at the fifth floor.

The limited up travel relay LU controls the availability for assignment of the elevator car A when the car is located in the low up zone (second and third floors). In order for this relay to be energized, make contacts H17 must be closed to indicate that at least two elevator car motor-generator sets are running, break contacts EUC5 must be closed to signify that the elevator system is not conditioned to provide emergency up service and make contacts W18 must be closed to indicate that the car A is conditioned for up travel. Additionally, initial energization of the relay LU requires that the car A be assigned to answer up floor calls in the low up zone (make contacts FU16 and break contacts FUH6 are closed) or that a car call be registered for the car A for a floor in the low up zone (make contacts 2CR3 or 3CR3 are closed). Pickup of the relay LU is accompanied by closure of its make contacts LU2 to establish a self-holding circuit through break contacts Z2–8 of the zone position relay Z2, break contacts FR23 of the available car relay FR and the contacts W18 and H17. Thus, the relay is maintained energized through its holding circuit until the contacts Z2–8 open to indicate that the car A floor selector is in its fourth or fifth-floor position, or until the contacts FR23 open to signify that the car A is available for assignment or until the contacts W18 open to indicate that the car A is conditioned for down travel.

Pickup of the basement service relay 79 indicates that the elevator car A is conditioned to provide service for the basement floor. An initial energizing circuit is completed for the relay 79 if a basement car call is registered for the car A (make contacts bCR2 are closed) and the car A is conditioned for down travel (make contacts X16 are closed) or if a basement car is in a condition to be selected to respond to an existing demand for basement service (make contacts 79D5 are closed) and the car A is so selected (make contacts FCR6 are closed). Pickup of the relay 79 results in closure of its make contacts 79–6 to complete self-holding circuit provided that the car A is not located at either the basement or the lower terminal floor (break contacts ZB2 and Z0–21 respectively are closed), or that an up floor call is registered for the basement floor (make contacts bUR2 are closed) or that the non-interference time for the car A has not expired (make contacts 70T6 are closed), or finally that the car A is assigned to answer a registered down floor call (make contacts FA15 are closed). It should be noted that with 79 and FA picked up, it signifies that the car is assigned to answer a down basement call at the first floor.

Pickup of the basement by-pass relay 79P conditions the elevator car A, while traveling down, to bypass any floor for which a down floor call is registered except the lower terminal or first floor. In order for this relay initially to be energized, make contacts 79–7 must be closed to indicate that the car A is to provide service for the basement floor, make contacts KTB1 must be closed to signify that a priority or timed-out down floor call for the first floor or up floor call for the basement floor is registered and break contacts M79P1 must be closed to indicate that no other elevator car is conditioned to serve the basement floor or that if another car is so conditioned that it is not also conditioned to by-pass floors for which down floor calls are registered except the first floor. Finally, break contacts Z0–22 must also be closed to signify that the car A is not located at the first floor. Pickup of the basement by-pass relay 79P is accompanied by closure of its make contacts 79P2 to establish a holding circuit around the contacts M79P1.

The basement cutout relay 79N conveniently may be controlled by a manually-operable switch SW4. Thus, when this switch is in its open condition the relay 79N is dropped out, and the elevator car A may serve the basement floor. Conversely, closure of the switch SW4 results in energization and pickup of the relay 79N to render the car A incapable of serving the basement floor.

FIG. 5

The high call reversal relay 69H is similar to that shown in FIG. 4 of our reference patent except for the addition of break contacts ZB3 in series therewith. Contacts ZB3 are closed when the car A is not at the basement floor.

The car call location circuit 29 is similar to that shown in FIG. 4 of our reference patent except that the junction between the contacts 2CR2 and m2 now is connected through a normally-closed switch m1 and a car call below relay 38D to the bus L2. In addition the junction between the switch m1 and the relay 38D is now connected to the bus L1 through make contacts 1CR4. The cam mm opens the switch m1 when the car A is adjacent the first floor.

The car call below relay 38D is energized when a car call is registered for a floor above the basement and below the position of the car A.

The circuit for the second auxiliary running relay 80 is similar to that shown in FIG. 4 of our reference patent except for the connection of make contacts 79–15 across the contacts 981–2. Contacts 79–15 are closed if the car A is to provide service for the basement floor.

The down call assigned relay FA, when energized, primarily indicates that the car A is assigned to answer a down floor call. In order for this relay to be energized initially, make contacts FR5 must be closed to signify that the elevator car A is available for assignment for service, break contacts 38R3 must be closed to denote that no car call is registered for the car A for a floor above the floor at which the car is located and break contacts FU17 must be closed to signify that the car A is not assigned to answer a registered up floor call. Energization of the relay FA may be completed through any one of several paths. For example, if the car A is assigned to run to the highest floor for which a down floor call is registered, if it is the only elevator car available for assignment and if it is located at the first floor or if, in general, no up floor call is registered for a floor above the floor at which the car A is located, the following energizing circuit is completed:

I1, FR5, RNS1, MFC1, Z0–23 or 78U4, 38R3, FU17, FA, L2

If at least two elevator cars are available for assignment, break contacts MFC1 are open. However, if the car A is selected to respond to a demand for service, make contacts FCR1 paralleling the contacts MFC1 are closed. Should the elevator car A be assigned to run to a specific down zone of floors, the down call assigned relay FA may be energized through make contacts SH2 (make contacts RNS1 then are open). If fewer than two elevator car motor-generator sets are running, break contacts H1 of the motor-generator running relay H are closed; if the car A is not located at the basement floor, break contacts ZB4 are closed; and if the car A is at the first floor and is to be started in the up direction or the car A is not located at the first floor, break contacts 981–3 are closed, and the relay FA under these conditions may be energized through the contacts H1, ZB4 and 981–3. If two or more elevator car motor-generator sets are running, break contacts H1 are open and make contacts H2 are closed. Thus, under these conditions the relay FA may be picked up through the last named contacts, although the car A is not located at the first floor (make contacts Z0–23 are open) and an up floor call is registered for a floor above the location of the car A (make contacts 78U4 are open).

It will be observed that energization of the down call assigned relay FA also may be effected through the contacts FR5, 38R3 and FU17 if the elevator car A is to provide service for the basement floor (make contacts 79–8 are closed) and the car A is not located at the basement floor (break contacts ZB5 are closed) or is located at such floor (the contacts ZB5 are open and make contacts ZB6 are closed) but no up floor call is registered therefor (break contacts bUR4 are closed).

Finally, the relay FA may be energized through the level ESCa of the down emergency stepping switch ESC if the elevator system is conditioned to provide down emergency service (make contacts EDC3 are closed) and the car A is available for assignment (make contacts FR24 are closed), provided that the brushes of the level ESCa are in the position illustrated. It will be apparent that energization of the down call assigned relays for the elevator cars B & C may be effected in a similar manner as these brushes step in a clockwise direction, as viewed in FIG. 5. The stepping switch ESC will be considered in greater detail in the discussion of the circuits of FIG. 14.

Upon energization, the down call assigned relay FA closes its make contacts FA6 to complete a holding circuit for the relay through break contacts X7 of the down preference relay X. Consequently, the relay FA may remain energized through its holding circuit until the contacts X7 open to indicate that the elevator car A is conditioned for down travel.

The circuits for the first auxiliary running relay RA, the auxiliary door control relay 42, the door control relay 45, the door close solenoid DC and the door open solenoid DO are similar to those shown at the bottom of FIG. 4 of our reference patent.

FIG. 6

Figure 5:
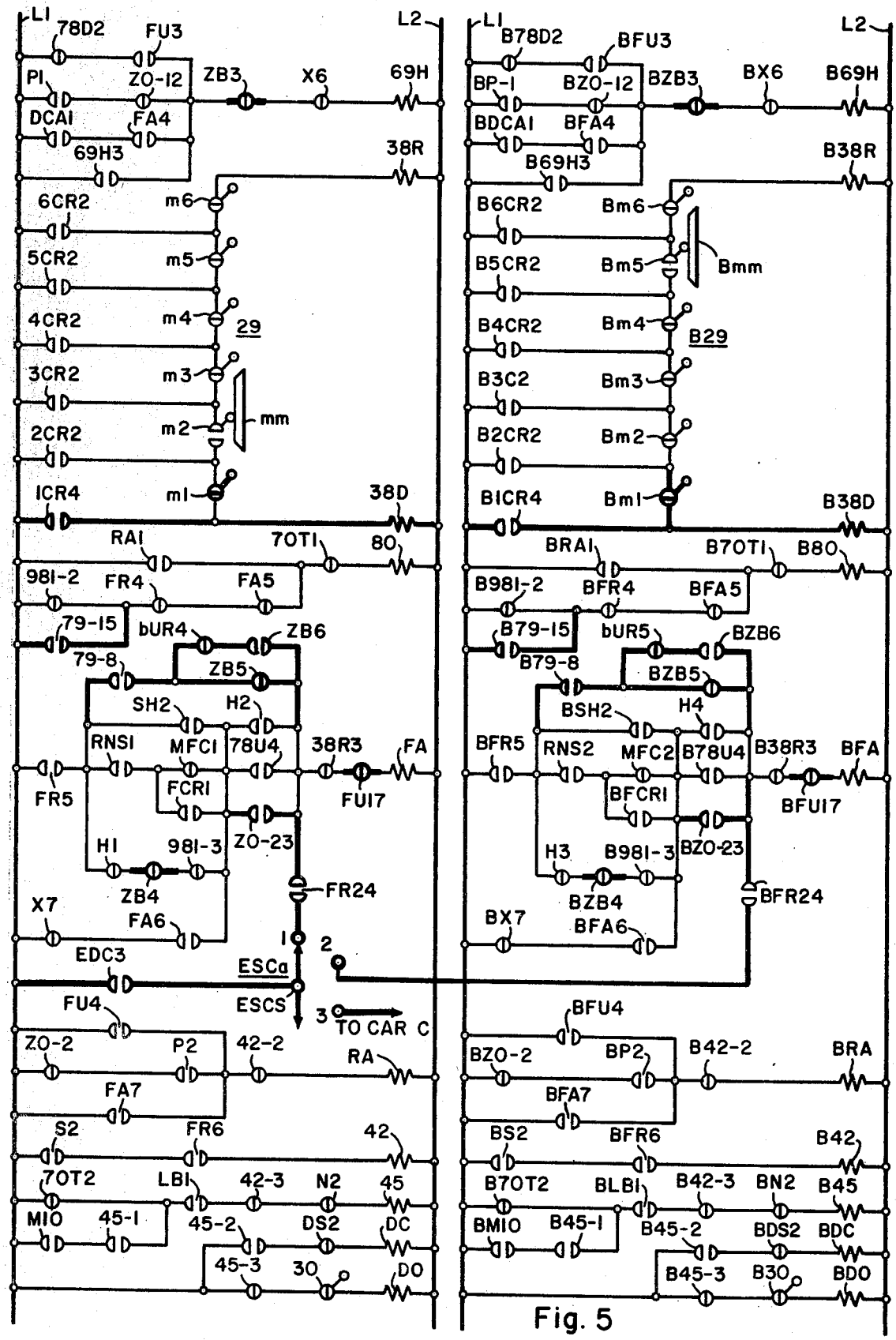
Figure 6:
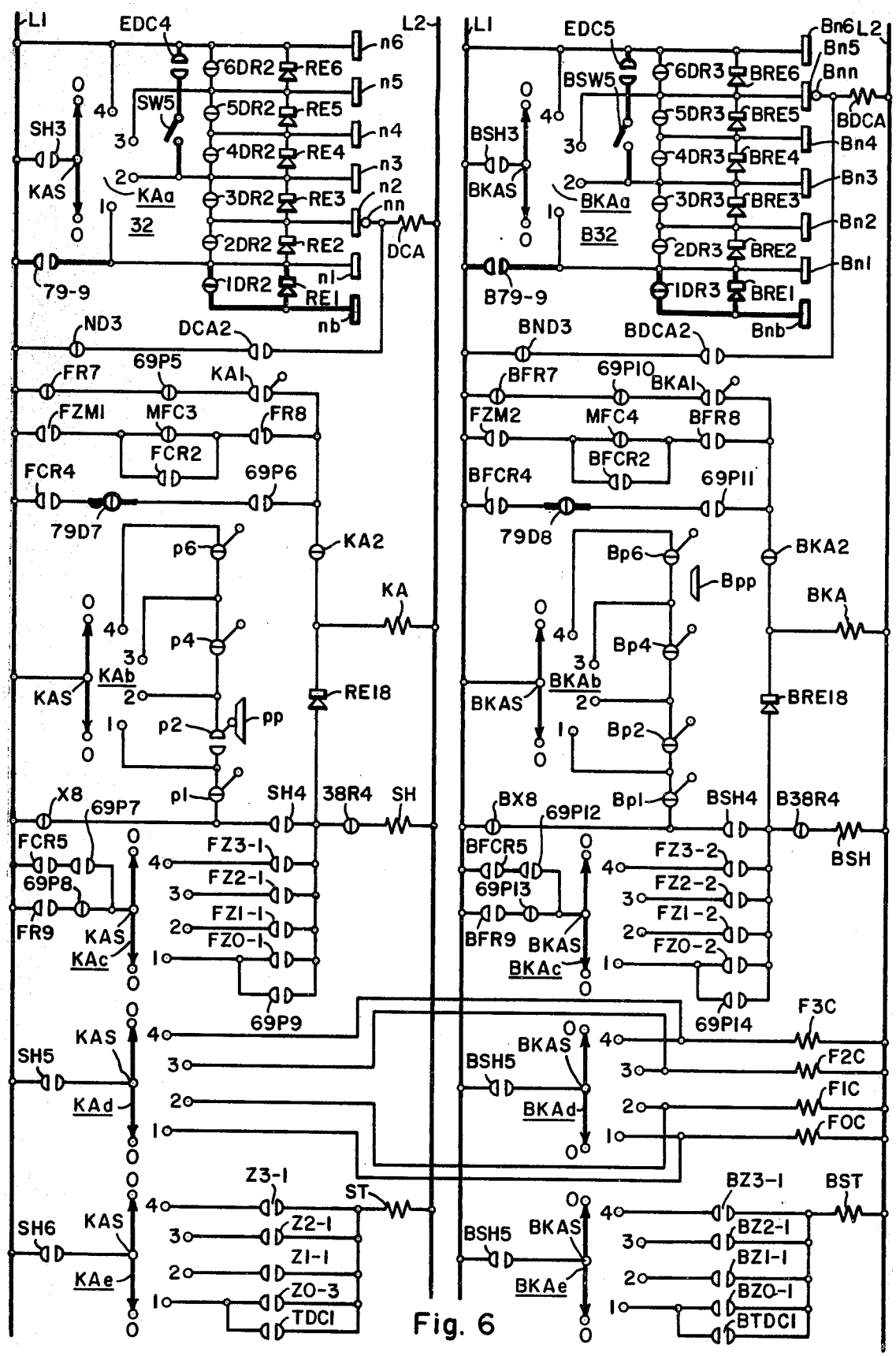

FIG. 6 is similar to FIG. 5 of our reference patent except as follows.

In the down floor call above circuit 32 make contacts EDC4 are connected through a manually-operated switch SW5 between the contact 2 of the level KAa and the bus L1.

Make contacts 79–9 are connected between the contact 1 of the stepping switch level KAa and the bus L1.

A contact segment nb in the n row is positioned to engage the brush nn when the car A is adjacent the basement floor. This contact segment is connected to the contact segment n1 through break contacts 1DR2 of the first floor down call registering relay and also through a rectifier RE1 polarized similarly to the rectifiers RE2 etc.

The rectifier RE1 of our reference patent is here labeled RE18.

Break contacts 79D7 are inserted between the contacts FCR4 and 69P6, and are closed if there is no demand for basement service.

It will be noted that the effect upon the relay DCA of closure of make contacts 79–9 to indicate that the elevator car A is to provide service for the basement floor is the same as that produced when the contacts SH3 are closed and the brushes of the level KAa are in their first position (signifying that the car A is to serve the lower terminal floor). Thus, if the contacts 79–9 are closed, the opening of any of the contacts 2DR2 through 6DR2 in response to the registration of a down floor call for a corresponding floor above the lower terminal floor has no effect upon the relay DCA, regardless of the location of the car A.

Similarly, it will be observed that if the switch SW5 is operated to its closed condition, the effect upon the relay DCA of closure of make contacts EDC4, signifying that the elevator system is conditioned to provide emergency down service, is the same as that produced when the contacts SH3 are closed and the brushes of the level KAa are in their second position, indicating that the car A is assigned to respond to a demand for down service in the first down zone (second and third floors). Thus, if the switch SW5 is in its closed condition and the contacts EDC4 also are closed, the opening of any of the contacts 4DR2, 5DR2 or 6DR2 in response to the registration of a down floor call for a corresponding floor above the third floor is without effect on operation of the relay DCA, regardless of the position of the car A.

Figure 7:
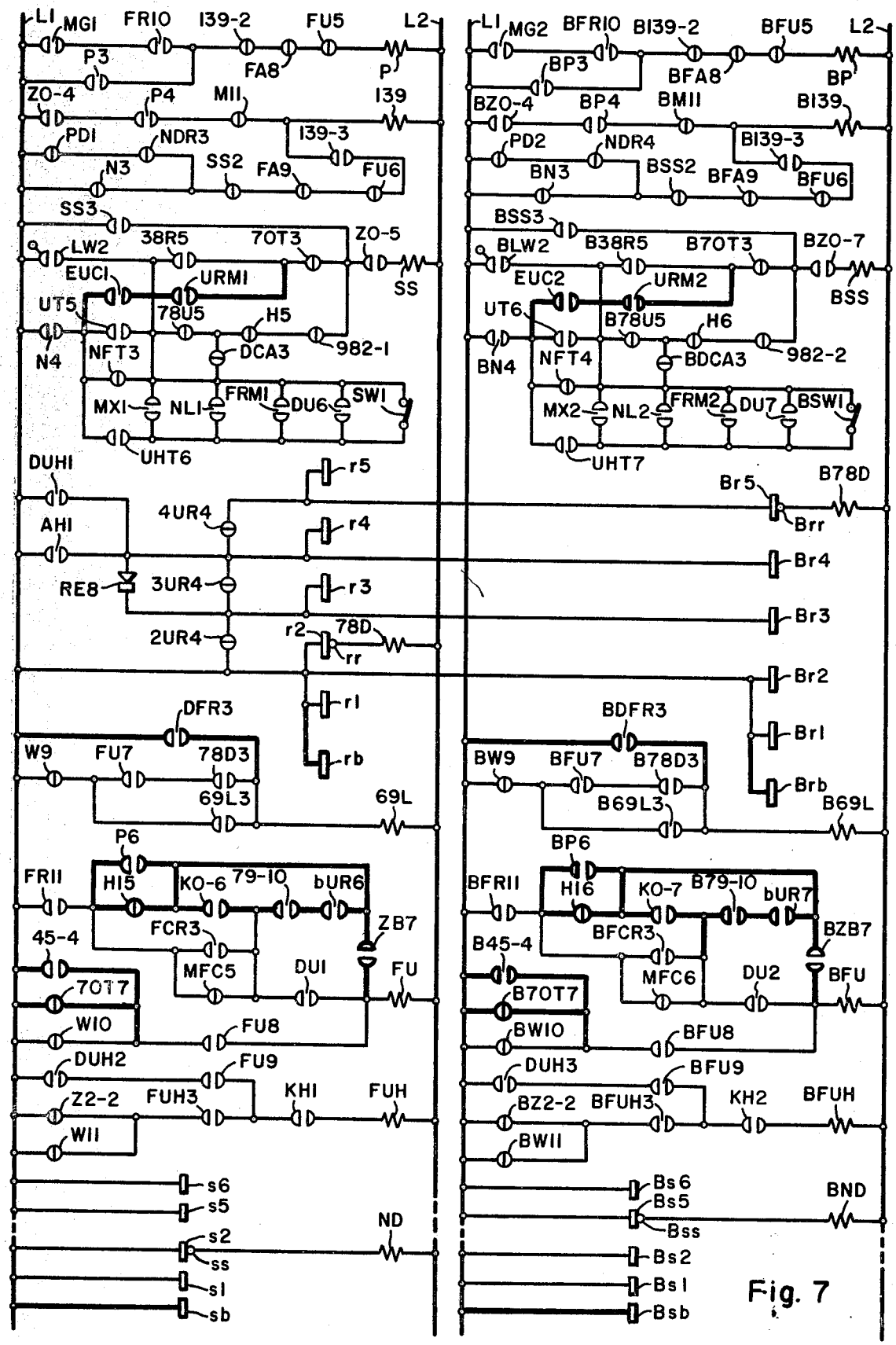

FIG. 7 is similar to FIG. 6 of our reference patent except as follows.

The start relay SS, when picked up, in general indicates that the car A is to be started from the first floor to answer a car call for a higher floor.

If the elevator car A has been selected as the next car to leave the lower terminal floor (make contacts N4 are closed) and if its non-interference time has expired (break contacts 70T3 are closed), the start relay SS may be energized regardless of whether the loading interval has expired provided that the elevator system is conditioned to provide up emergency service (make contacts EUC1 are closed) and an up floor call (as opposed to a car call above under normal operating conditons) is registered for a floor above the first floor (make contacts URM1 are closed).

A contact segment rb is located in the r row to engage the brush rr when the car A is adjacent the basement floor, and is connected to the contact segment r1. Thus the up call below relay 78D is always picked up when the car A is adjacent the basement floor.

The low call reversal relay 69L may be energized and picked up when the elevator car A while traveling down reaches the lowest floor for which an up floor call is registered in the up zone to which the car is assigned. Thus, an energizing circuit is established for the relay 69L if the car A is conditioned for down travel (break contacts W9 are closed), the car is assigned to answer up floor calls (make contacts FU7 are closed) and no up floor call is registered for a floor below the location of the car A in the up zone to which the car is assigned (make contacts 78D3 are closed). Pickup of the relay 69L under these conditions causes the elevator car A to stop at the lowest floor for which an up floor call is registered in the up zone to which the car A is assigned. Alternatively, if the car A in general is stopped at a floor above the lower terminal floor, is conditioned for down travel, is unassigned and has no car call registered for a floor below the floor at which it is located, make contacts DFR3 are closed to energize the relay 69L. Pickup of this relay through either of the foregoing circuits results in a change in the direction of travel for which the car A is conditioned from down to up. Such pickup is accompanied by closure of make contacts 69L3 to establish a holding circuit for the relay through the contacts W9. Consequently, the relay is maintained energized through its holding circuit until the contacts W9 open to indicate that the car A is conditioned for up travel.

The up call assigned relay FU, when picked up, primarily indicates that the elevator car A is assigned to answer a registered up floor call. In order for this relay initially to be energized, the car A must be available for assignment (make contacts FR11 are closed). An initial energizing circuit for the relay FU may be completed through any one of several paths. For example, make contacts DU1 are closed if there is a demand for up service for a floor intermediate the lower and upper terminal floors. If the car A is the only elevator car available for assignment, break contacts MFC5 are closed. However, if at least one additional car is available for assignment, the contacts MFC5 are open; and if the elevator car A is selected to respond to the aforesaid demand for up service, make contacts FCR3 are closed, and the relay FU is energized.

Alternatively, if the contacts DU1 are open an intial energizing circuit may be completed for the up call assigned relay FU only if the elevator car A is available for assignment at the basement floor (the contacts FR11 and make contacts ZB7 both are closed). If, in addition, fewer than two elevator car motor-generator sets are running, break contacts H15 are closed to energize the relay FU. However, if two or more motor-generator sets are running, the contacts H15 are open, and the relay FU may be energized if the car A is conditioned to park at the first floor (make contacts P6 are closed) or if there is an automatic or artificial demand for first floor service (make contacts K0–6 are closed) and if the car A is the only car available for assignment (break contacts MFC5 are closed) or, if at least one additional car is available for assignment (the contacts MFC5 are open), provided that the car A is selected to respond to such demand (make contacts FCR3 are closed).

When the relay FU picks up, it closes its make contacts FU8 to establish a holding circuit therefor, provided that the car A is conditioned for down travel (break contacts W10 are closed) and/or the non-interference time for the car A has expired (break contacts 70T7 are closed) and/or the doors of the car A are closed (make contacts 45–4 are closed). If the elevator car A is conditioned for up travel, the contacts W10 are open, and the holding circuit for the up call assigned relay FU is interrupted when the car A stops at a floor and its doors start to open (the contacts 70T7 and 45–4 both are open).

A contact segment $sb$ in the $s$ row is located to engage the brush $ss$ when the car A is adjacent the basement floor and is connected to the bus L1. To conserve space the contact segments $s3$ and $s4$ are not shown in FIG. 7.

FIG. 8

Figure 8:
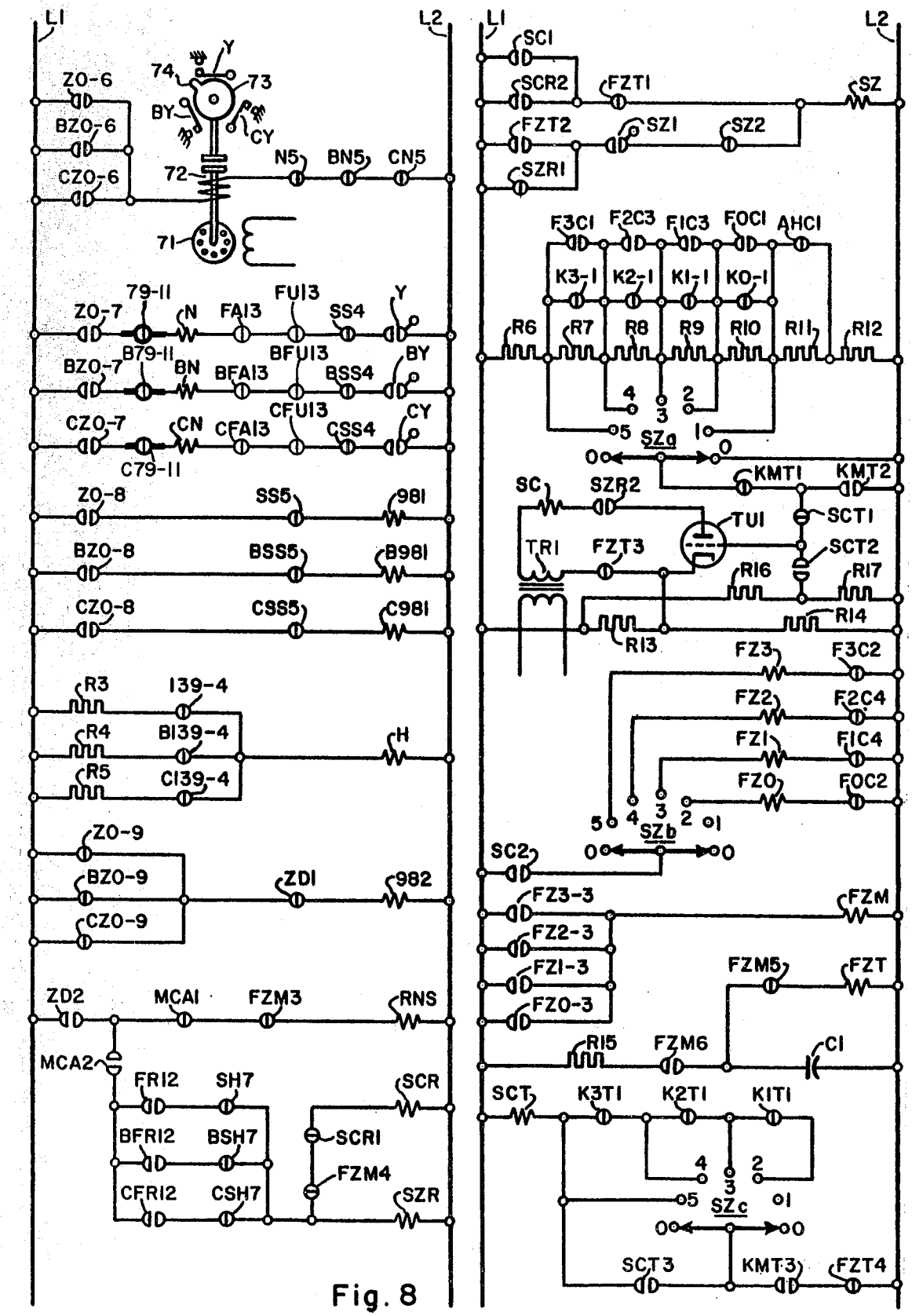

FIG. 8 is similar to FIG. 7 of our reference patent except as follows.

Break contacts 79–11 are connected in series with the next car relay N and are closed when the car A is not to provide service for the basement floor.

FIG. 9

Figure 9:
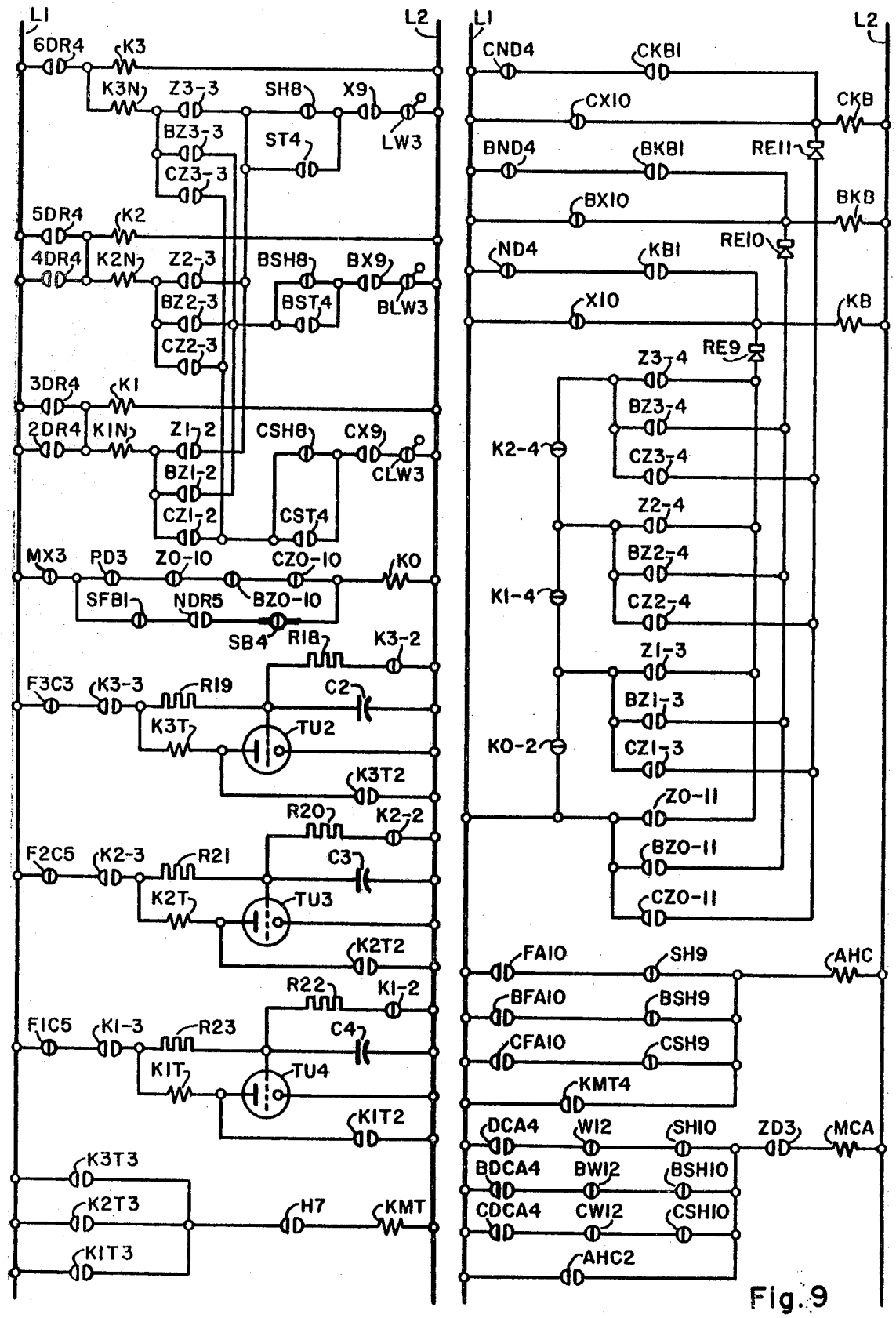

FIG. 9 is similar to FIG. 8 of our reference patent except as follows.

In one energizing circuit for the down zone demand registering relay K0 break contacts SB4 are inserted and are closed if the elevator system is not conditioned to provide special service for the basement floor.

FIG. 10

Figure 10:
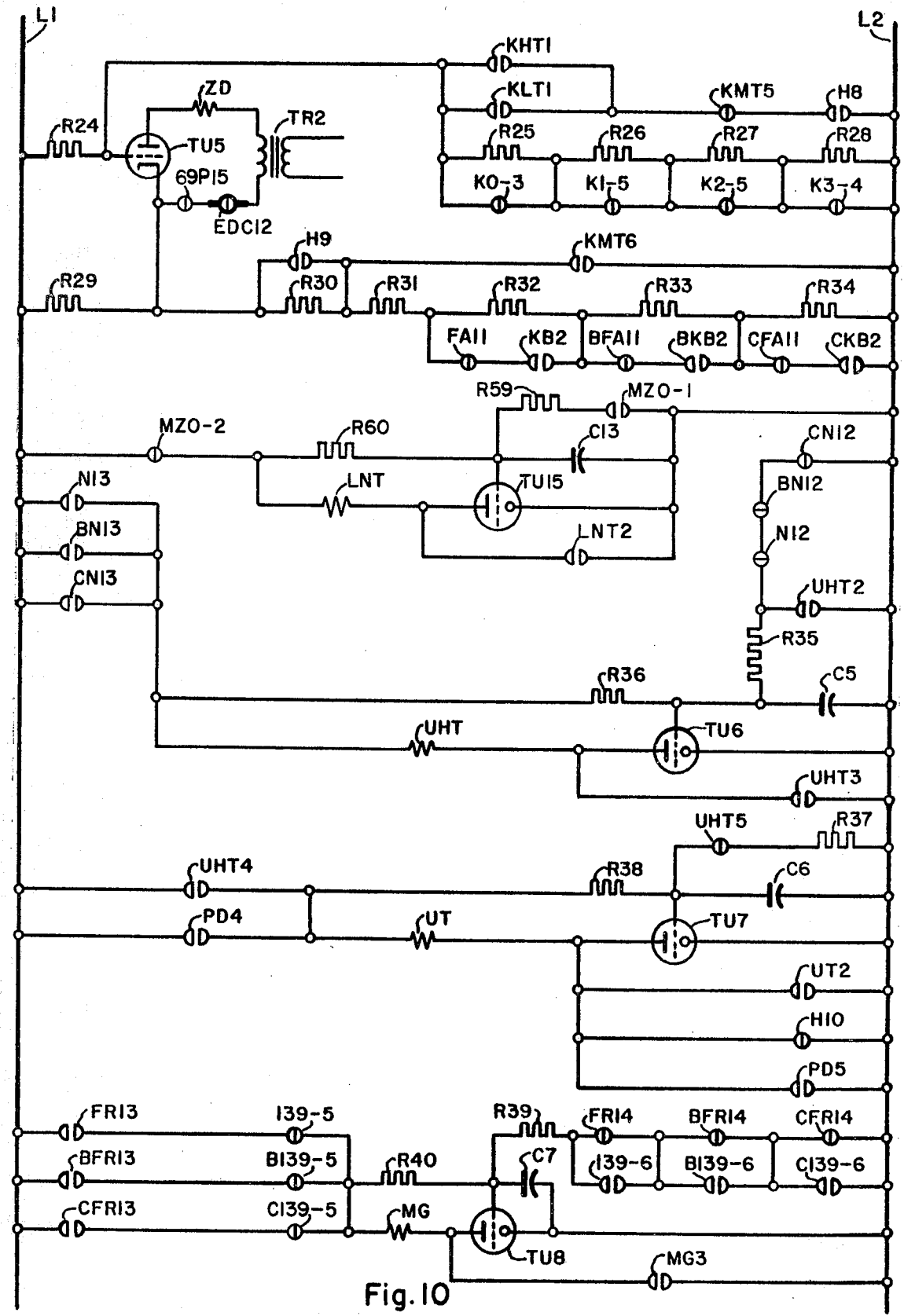

FIG. 10 is similar to FIG. 9 of our reference patent except as follows.

In the present case the contacts 69P15 also are open to prevent pickup of the relay ZD when a basement car is to be selected to respond to a demand for basement service. The contacts EDC12 are open for the same purpose when the elevator system is conditioned to provide emergency down service.

FIG. 11

Figure 11:
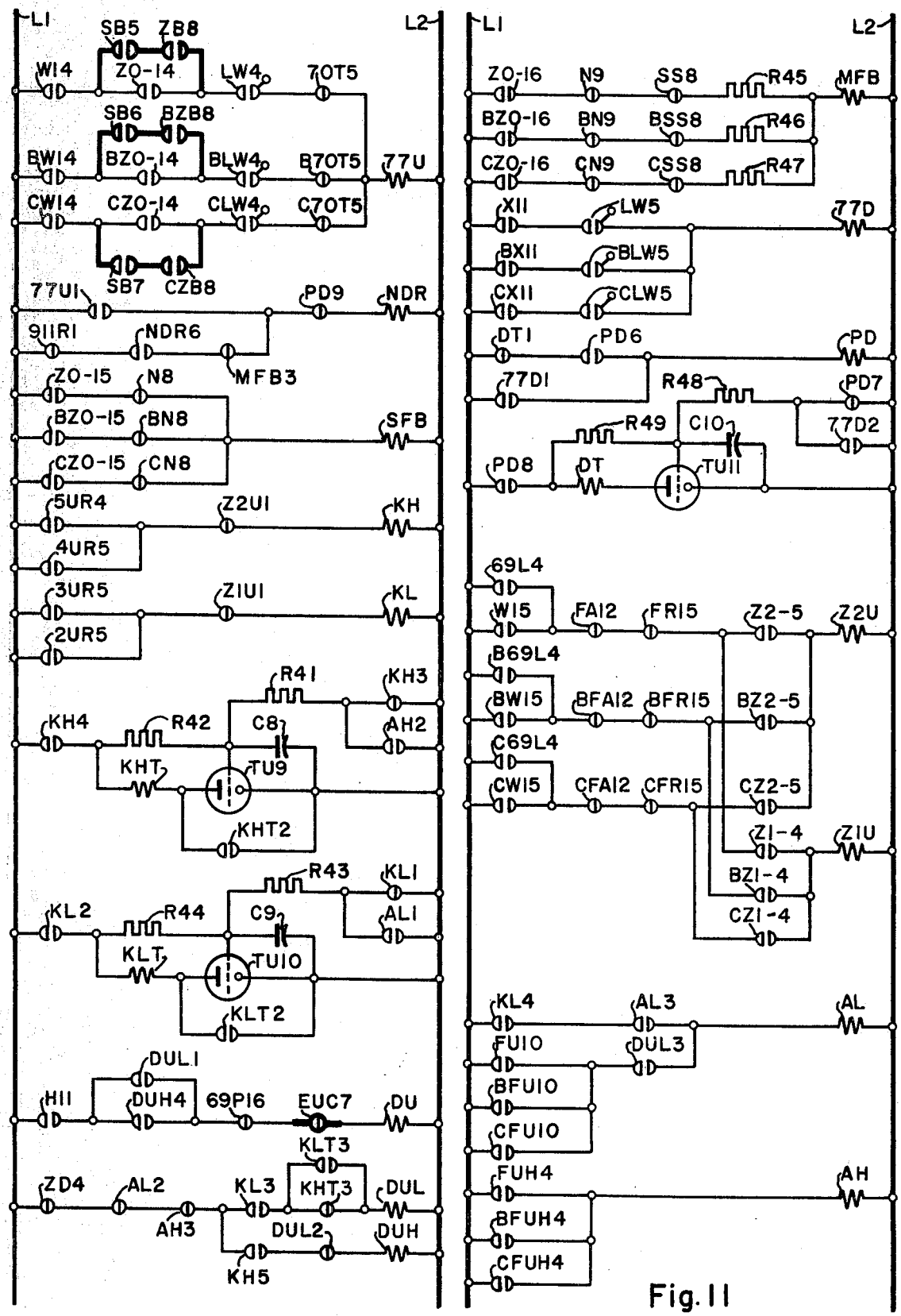

FIG. 11 is similar to FIG. 10 of our reference patent except as follows.

In the present case the by-pass relay 77U when energized indicates that an elevator car whose non-interference time has expired is conditioned for up travel and is fully loaded and that such car is positioned at the first floor or that it is located at the basement floor and the elevator system is conditioned to provide special service for the basement floor. Thus if the contacts Z0–14 are open the relay 77U still may be energized if the car A is at the basement floor (make contacts ZB8 are closed) and the elevator system is conditioned to provide special service for the basement floor (make contacts SB5 are closed).

Pickup of the by-pass relay 77U is indicative of an up peak traffic condition either from the lower terminal or first floor or from the basement floor when the elevator system is conditioned to provide special service for the basement floor.

Pickup of the no demand return relay conditions the system to expedite service for the first floor (and for the basement floor provided that the elevator system is conditioned to furnish special service therefor).

It should be noted that if the closest unassigned down-traveling elevator car to the lower terminal floor is to be selected to provide expedited service therefor or if a basement car is to be selected to respond to a demand for basement service, the break contacts 69P16 are open to prevent pickup of the relay DU. The relay DU cannot pick up if break contacts EUC7 are open to indicate that the elevator system is conditioned to provide emergency up service.

FIG. 12

Figure 12:
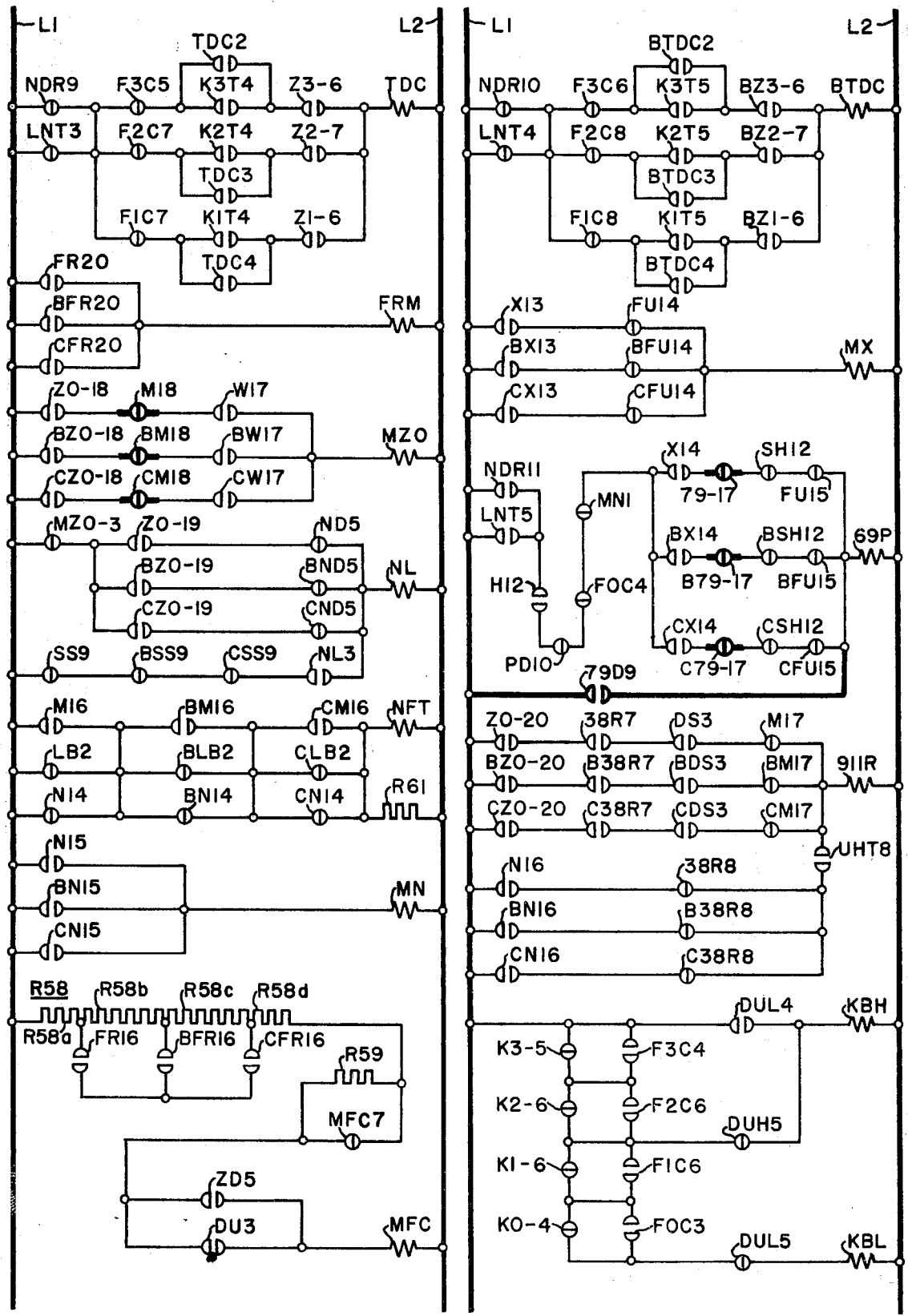

FIG. 12 is similar to FIG. 11 of our reference patent except as follows.

The master car position relay MZ0 additionally is controlled by contacts of the running relays. Thus for the car A break contacts M18 of the running relay M are inserted in series with the contacts Z0–18 and W17 to control the relay MZ0.

Because of the provision of basement service the closest car relay 69P has additional controls. Thus for the car A break contacts 79–17 of the basement service relay 79 are inserted between the contacts X14 and SH12.

Alternatively, the relay 69P may be energized through make contacts 79D9 (which are closed if at least one basement car is in a condition to be selected to respond to an existing demand for basement service. Pickup of the relay 69P under this condition results in the selection, in general, of the closest unassigned basement car to the basement floor to respond to such service demand.

Energization of the clearance relay 911R indicates that an elevator car has started from the first floor to answer a car call above or that a predetermined interval of time has expired following selection by the first floor dispatcher of the next car to leave the first floor and that no car call is registered for such car.

FIG. 13

Figure 13:
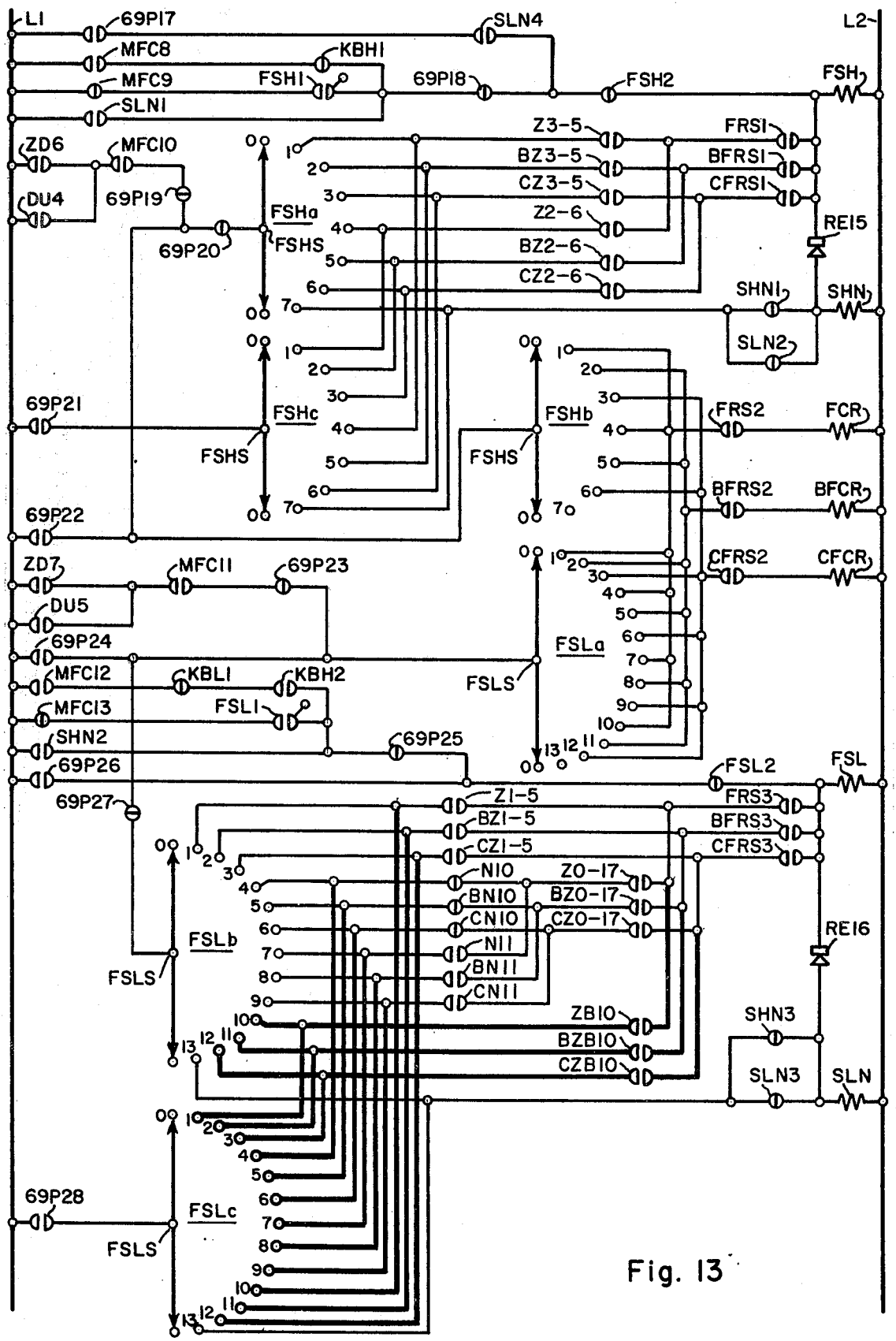

FIG. 13 is similar to FIG. 12 of our reference patent except as follows.

Inasmuch as a basement floor is here included, the reference to floors in our reference patent may here refer to the "principal" floors or the floors above the basement floor.

When there is a demand for down service for the high zone, and no available car is located in the high zone or low zone, an available car at the basement floor is selected by operation of the stepping switch FSL. If there is a demand for up service for the high zone, the high zone, the low zone and then the basement floor are scanned for an available car.

If there is a demand for down service for the low zone and there is no available car in the low zone above the first floor or at the first floor then an available car at the basement floor is selected. If none, in general the highest available car in the high zone is selected.

When there are demands for down service for both the high and low zones, the high zone, the low zone and finally the basement zone are scanned for an available car. If there are demands for up service for both the low and high zones, the low zone, then the basement floor and finally the high zone are scanned for an available car.

The circuits of FIG. 13 also effect the selection of the closest unassigned basement car to the basement floor or zone in response to a demand for basement service.

The stepping switch FSL is employed for selecting an available car which is located in the low zone or in the basement zone to respond to a demand for service for the low zone, as indicated by closure of break contacts KBL1 and make contacts KBH2. This stepping switch also is used in selecting a car to respond to a demand for basement service.

The stepping switch FSL has thirteen positions or contacts associated with each of the brushes instead of ten as in our reference patent. Position thirteen corresponds to position 10 of our patent.

The three added positions or contacts are numbered 10, 11 and 12. For these positions contacts of the zone position relays ZB, BZB and CZB for the basement zone are effective. Thus contact 10 is connected through make contacts ZB10, contacts FRS3 and then the coil of stepping switch FSL to the bus L2. It will be noted that the low zone stepping switch FSL when activated rapidly scans the low and then the basement zone for an available car. For example, during a scanning operation of the stepping switch FSL, if the first available car is car A at the basement floor (make contacts ZB10 are closed), the brushes of the stepping switch FSL would stop at their tenth position to pick up the car A demand response relay FCR through the level FSLa.

For the level FSLa, the positions or contacts 1–9 and 13 correspond to the positions 1–10 of our reference patent. The positions or contacts 10, 11 and 12 are connected to the positions or contacts 1, 2 and 3 respectively.

The positions or contacts 1–13 of the level FSLc are connected respectively to the positions or contacts 10, 11, 12, 4–9, 1, 2, 3 and 13 of the level FSLb.

EXAMPLE

Assume that the closest car relay 69P is picked up. In this instance, however, it will be assumed that such pickup is not for the purpose of effecting the selection for the first floor, but for the purpose of effecting the selection of a basement car to respond to a demand for basement service.

Such demand may constitute the registration of a down floor call for the first floor or of an actual or automatic (artificial) up floor call for the basement floor; and, for optimum system efficiency, it is desired that the selected car be the closest basement car to the basement floor which is available for assignment or which is unassigned and set for down travel.

If any basement elevator car meets either of the foregoing conditions when there is a demand for basement service, its associated auxiliary available car relay will be energized. For example, assuming that the cars A and C are capable of serving the basement floor, if the car A is available for assignment, its auxiliary available car relay FRS will be energized to close its make contacts FRS1, FRS2 and FRS3; and if the car C is unassigned and set for down travel, its auxiliary car relay CFRS will be picked up to close its make contacts CFRS1, CFRS2 and CFRS3.

By inspection of FIG. 13 and from the preceding discussion, it will be observed that pickup of the relay 69P under these circumstances results first in the scanning by the c level of the low zone stepping switch FSL for a basement elevator car satisfying either of the specified conditions. It will be noted further that the circuits are arranged so that the scanning for such a car occurs in the following sequence: a car located at the basement floor; a non-next basement car located at the first floor; a next basement car located at the first floor; a basement car located in the first zone (second and third floors).

If the stepping switch FSL is unable to locate a suitable car in the foregoing list, it will be clear from the preceding discussion that the c level of the high zone stepping switch FSH then scans the second zone (fourth and fifth floors) and finally the third zone (sixth floor) for an appropriate car.

In view of the detailed description here and in Examples 1 through 9, as described in our reference Pat. 3,292,736, col. 70, line 23 et seq., it is deemed unnecessary to set forth a specific example for selection of a basement car to serve the basement floor by operation of the circuits of FIG. 13. It will be apparent that, in general, these circuits effect the selection of the closest unassigned basement car to the basement floor for response to a demand for basement service.

It should be noted that the presence of only one suitable elevator car is sufficient to effect pickup of the closest car relay 69P for producing the operations described in Examples 8 and 9 of our reference patent and in the additional example just described. On the other hand, at least two elevator cars must be available for assignment in order for the multiple available car relay MFC to be energized, as a result of which the operations discussed in Examples 1 through 7 take place.

FIG. 14

FIG. 14 shows circuits for controlling the provision by the elevator system of basement service and of emergency service.

Energization of the basement demand relay 79D indicates that there is a demand for basement service, that no elevator car is conditioned to serve the basement floor and that one of the elevator cars in the system capable of providing basement service is in a condition to be selected to do so. In order for the relay 79D to be energized, a down floor call for the first floor and/or an up floor call for the basement floor must be registered (make contacts 1DR4 and/or bUR8 are closed). In addition, break contacts 79M2 of the master basement service relay must be closed to indicate that no elevator car is conditioned to serve the basement floor. An energizing circuit for the relay 79D may be completed through any one or more of six parallel circuit branches, two of each of which are associated with a separate one of the elevator cars A, B and C. For example, if the car A is capable of serving the basement floor, break contacts 79N4 and 79N5 are closed. If, in addition, the car A is available for assignment, make contacts FR25 are closed to energize the relay 79D. Alternatively, the relay 79D may be energized if the car A is conditioned for down travel (make contacts X17 are closed) and if it is not assigned to respond to a demand for down service or for up service (break contacts SH14 and FU18 respectively are closed). It will be observed that once an elevator car is conditioned to provide service for the basement floor, break contacts 79M2 open to prevent pickup of or to drop out the relay 79D, as the case may be, regardless of the state of the remaining contacts associated therewith.

For expediting service to the basement floor under certain conditions, it is desirable to determine if a demand for basement service has been registered for more than a predetermined time. (Such demand may be termed a priority basement demand.) The basement timing relay KTB is provided for this purpose. Since the timing circuits associated with this relay basically are similar to those described heretofore, it appears unnecessary to discuss the functions of the various components thereof, and the present description will be directed instead primarily to the operation of such circuits. These circuits include a firing capacitor C14, a capacitor discharge resistor R61, a capacitor charging resistor R62 and a cold-cathode thyratron tube TU16.

It will be assumed that system conditions are such that make contacts 79FL1 are open and break contacts 79FL2 are closed to indicate that no basement car conditioned to serve the basement floor is approaching or located at the first floor. It also will be assumed that the elevator system is not conditioned to provide special basement service (make contacts SB8 are open) and that it is not conditioned for no demand return operation (break contacts NDR14 are closed and make contacts NDR15 are open). Finally, let it be assumed that either a down floor call is registered for the first floor (make contacts 1DR5 are closed) or an up floor call is registered for the basement floor (make contacts bUR9 are closed). Immediately prior to such registration, the relay KTB was deenergized.

Since the open contacts 79FL1 interrupt the discharge circuit of the capacitor C14, closure of the contacts 1DR5 or bUR9 results in completion of the following charging circuit for the capacitor:

L1, 1DR5 or bUR9, 79FL2, R62, C14, L2

The capacitor C14 now charges at a rate determined by the resistance and capacitance of its charging circuit. Upon expiration of the time required for the voltage across the capacitor C14 to build up to a suitable value, the tube TU16 fires to establish the following energizing circuit for the basement timing relay KTB:

L1, 1DR5 or bUR9, 79FL2, KTB, TU16, L2

The time delay in pickup of the relay KTB depends upon the specific requirements of each installation. As representative of suitable parameters, it will be assumed that this relay has a time delay in pickup of the order of one minute. The resistor R62 or the capacitor C14 or both of these components may be adjustable for the purpose of adjusting the time delay of the relay KTB.

In picking up, the relay KTB closes its make contacts KTB3 to establish a holding circuit around the tube TU16. Inasmuch as the contacts KTB3 shunt the plate and cathode electrodes of the tube the discharge between such electrodes is terminated.

Assuming that the basement time resetting relay 79FL subsequently picks up, its break contacts 79FL2 open to interrupt the charging circuit for the capacitor C14 and the energizing circuit for the basement timing relay KTB. In addition, make contacts 79FL1 close to establish a discharge circuit for the capacitor C14 through the resistor R61. Inasmuch as the relay KTB now is deenergized and dropped out, its make contacts KTB3 open with no immediate effect on the operation of the system.

If the elevator system is conditioned to provide special service for the basement floor, make contacts SB8 are closed to shunt a portion of the charging resistor R62 through break contacts NDR14. It will be assumed that the effective resistance of the resistor R62 under these conditions is reduced sufficiently to reduce the time delay in pickup of the basement timing relay KTB from one minute to approximately twenty seconds. If, however, the elevator system is conditioned for no demand return operation when the contacts SB8 are closed, the contacts NDR14 are open and make contacts NDR15 are closed to shunt all but a small portion of the resistor R62. As a result, the relay KTB has substantially no time delay, the function of the then effective resistance of the resistor R62 being essentially to limit the charging current of the capacitor C14 to a safe value.

The circuits associated with the down emergency reset timing relay EXT includes a firing capacitor C15, a capacitor discharge resistor R63, a capacitor charging resistor R64 and a cold-cathode thyratron tube TU17. Let it be assumed that at least one elevator car is available for assignment (break contacts FRM3 of the master available car relay are open and make contacts FRM4 thereof are closed) and that the elevator system is conditioned to provide emergency down service (make contacts EDC6 are closed). Assuming that the relay EXT initially is deenergized, its make contacts EXT1 are open to deenergize the down emergency reset relay EX. Consequently, make contacts EX1 in the discharge circuit of the capacitor C15 are open, and break contacts EX2 in the charging circuit thereof are closed. It will be observed that under these conditions, the capacitor C15 charges through the following circuit:

L1, EDC6, EX2, FRM4, R64, C15, L2

When the voltage across the capacitor C15 reaches a suitable value, the tube TU17 fires to complete the following circuit:

L1, EDC6, EX2, FRM4, EXT, TU17, L2

The time delay in pickup of the down emergency reset timing relay EXT depends upon the specific requirements of each installation. As representative of suitable parameters, it will be assumed that this relay has a time delay in pickup of the order of fifteen seconds. The resistor R64 or the capacitor C15 or both of these components may be adjustable for the purpose of adjusting the time delay of the relay EXT.

In picking up, the relay EXT closes its make contacts EXT1 to energize the down emergency reset relay EX. This relay, in turn, opens its break contacts EX2 to interrupt the charging circuit for the capacitor C15 and the energizing circuit for the down emergency reset timing relay EXT. In addition, make contacts EX1 close to effect discharge of the capacitor C15 through the resistor R63.

Dropout of the relay EXT is accompanied by reopening of its make contacts EXT1 to deenergize the down emergency reset relay EX. Desirably, however, the relay EX is provided with a slight time delay in dropout by any conventional means so that its make contacts EX1 remain closed sufficiently long to complete discharge of the capacitor C15. The subsequent dropout of the relay EX results in the resetting of the circuits associated with the relay EXT.

The down emergency stepping switch ESC controls the dispatching of elevator cars to answer down floor calls when the elevator system is conditioned to provide emergency down service. This stepping switch comprises two levels, ESCa (FIG. 5) and ESCb. Each of these levels, in turn, includes three contacts which are engaged by two brushes, the brushes being displaced from each other by 180° about a common shaft ESCS. The brushes of the level ESCa are suitably insulated from the brushes of the level ESCb.

Although the stepping switch ESC is similar to the stepping switches dicussed heretofore, the switch ESC is not required to "home" after a electing operation. Conequently, no homing contacts are associated with its coil, and its brushes have no homing position. The three contacts or positions associated with each of the brushes are numbered 1, 2 and 3, each position respectively being associated with a separate one of the elevator cars A, B and C.

In order to step shaft ESCS, the down emergency stepping switch ESC is provided with a set of self-stepping break contacts ESC1. In order to energize the coil of the switch ESC initially, the contacts ESC1 must be closed, and certain other conditions, to be discussed below, must be met. Upon energization of the coil of the stepping switch through its contacts ESC1, these contacts open, and if no other energizing circuit is completed for the coil, the brushes of the switch step rapidly in a clockwise direction, as viewed in FIG. 14. As long as the coil of the switch is energized continuously, however, the brushes cannot step, and they remain in a fixed position.

It will be assumed that make contacts EDC6 are closed to indicate that the elevator system is conditioned to provide emergency down service, that break contacts EX2 of the down emergency reset relay are closed, that no elevator car is assigned to answer a down floor call (make contacts FA16, BFA16 and CFA16 are open), that the elevator car B is available for assignment (make contacts BFR26 of the available car relay for the car B and make contacts FRM4 of the master available car relay both are closed) and that brushes of the down emergency stepping switch ESC initially are in their first position, as is illustrated in FIG. 14. Under these conditions, the following energizing circuit is completed:

L1, EDC6, EX2, FRM4, ESC1, ESC, L2

Energization of the coil of the stepping switch ESC results in the rapid scanning for an available car by the brushes of the level ESCb. When these brushes arrive at their second position, the coil of the stepping switch is energized continuously through the contacts BFR26, which are assumed to be closed. As a result, the scanning operation of the brushes is terminated.

Referring for a moment to FIG. 5, it will be noted that the level ESCa simultaneously effects pickup of the down call assigned relay BFA for the elevated car B through make contacts EDC3 and BFR24, which are closed under the assumed conditions. (In addition, no car call is registered for a floor above the floor at which the car B is located and the car B is not assigned to answer up floor calls, so that break contacts B38R3 and BFU17, respectively, also are closed.) Pickup of the relay BFA indicates that the elevator car B is assigned to answer down floor calls. Returning to the stepping switch ESC in FIG. 14, it will be noted that such pickup is accompanied by closure of make contacts BFA16. Since pickup of the relay BFA results in dropout of the available car relay BFR for the car B to open make contacts BFR26 shortly after such pickup, the closed contacts BFA16 prevent further operation of the brushes of the stepping switch until the car B becomes conditioned for down travel, at which time the relay BFA drops out and the contacts BFA16 open to permit the stepping switch to select another available elevator car in a manner similar to that just described.

In the event that the relay BFA fails to pick up, or, if it does pick up, fails to drop out as discussed above because of a malfunction, make contacts BFR24 or BRA16, as the case may be, would remain closed to maintain continuous energization of the coil of the stepping switch ESC. Consequently, the brushes of the stepping switch could not operate to select another available car. It will be noted, however, that a timing operation of the down emergency reset timing relay EXT was initiated simultaneously with the initiation of operation of the stepping switch ESC. The time delay in pickup of the relay EXT (15 seconds) is sufficient to permit normal operation of the stepping switch ESC. But if the relay EXT should pick up under the conditions described heretofore, its make contacts EXT1 would close to pick up the down emergency reset relay EX. As a result, break contacts EX2 would open not only to reset timing circuits of the relay EXT but also to interrupt the energizing circuit of the coil of the stepping switch ESC, and the brushes of the stepping switch would be rotated to effect the selection of another available elevator car.

The special basement service relay SB, when energized, conditions the elevator system to provide special service for the basement floor. This relay may be energized either by closure of a manually-operable switch SW6 or by operation of a suitable timing mechanism or clock to close a pair of contacts 301. Such timing mechanisms are well known in the art.

Pickup of the master basement by-pass relay M79P indicates that one of the elevator cars in the system is conditioned to provide expedited service for the basement floor. For example, if there is a priority service demand for the basement floor (refer to the preceding discussion of the basement timing relay KTB) and the car A is conditioned to serve such floor and to by-pass on its way thereto each floor above the first floor for which a down floor call may be registered, make contacts 79P3 of the basement by-pass relay for the car A are closed to pick up the relay M79P. Such pickup prevents similar by-passing by any other car which simultaneously may be conditioned to serve the basement floor.

Energization of the master basement service relay 79M indicates that at least one of the elevator cars in the system is conditioned to serve the basement floor. Thus, if the car A is so conditioned, make contacts 79–12 are closed to pick up the relay 79M.

The basement time resetting relay 79FL, when picked up, signifies that an elevator car conditioned to serve the basement floor is approaching or located at the first floor. For example, if the car A is conditioned to serve the basement floor, make contacts 79–13 are closed; and if such car is approaching or located at the first floor, make contacts Z0–24 are closed to energize the relay 79 FL. It will be recalled that contacts of this relay are employed for resetting the timing circuits associated with the basement timing relay KTB.

Energization of the master up call relay URM indicates that an up floor call is registered for a floor above the lower terminal or first floor. Thus, the energizing circuit for this relay includes parallel make contacts of the respective up floor call registering relays for the second, third, fourth and fifth floors. If for example, an up floor call is registered for the fourth floor, make contacts 4UR6 are closed to energize the relay URM.

Similary, pickup of the master down call relay DRM signifies that a down floor call is registered for a floor above the first floor. It will be observed that the energizing circuit for the relay DRM includes in parallel make contacts of the down floor call registering relays for the second through the sixth floors, respectively. Thus, if a down floor call is registered for the fourth floor, for example, make contacts 4DR5 are closed to energize the relay DRM.

Pickup of the down emergency timing relay EDT signifies that for at least a predetermined period of time one or more of the elevator cars have been available for assignment while concurrently, in general, at least one down zone demand for service has been registered. Such pickup is indicative of a malfunction in the system which results in the failure of the elevator car dispatching controls to effect the selection of and/or to send an available car to respond to a down zone service demand.

The circuits associated with the down emergency timing relay EDT include a firing capacitor C16, which has a discharge resistor R65 and a charging resistor R66, and a cold-cathode thyratron tube TU18. Let it be assumed that the relay EDT initially is dropped out, that at least one elevator car is available for assignment (break contacts FRM5 are open and make contacts FRM6 are closed) and that a down zone service demand exists (break contacts ZD8 are open and make contacts ZD9 are closed). Under these conditions, it will be observed that the discharge circuit for the capacitor C16 is interrupted and that a charging circuit for the capacitor is established through the contacts FRM6 and ZD9 and the resistor R66.

Upon expiration of the time required for the voltage across the capacitor C16 to build up to a suitable value, the tube TU18 fires to energize the down emergency timing relay EDT therethrough and through the contacts FRM6 and ZD9. If desired, the resistor R66 may have an adjustable resistance or the capacitor C16 may have an adjustable capacitance, or both may be adjustable for the purpose of adjusting the time delay in pickup of the relay EDT. As representative of suitable parameters, it will be assumed that the relay EDT has a time delay of the order of 20 seconds. The specific time delay, however, will depend upon the requirements of each specific installation.

In picking up, the relay EDT closes its make contacts EDT1 to establish a holding circuit around the tube TU18. Since these contacts shunt the plate and cathode electrodes of the tube, the tube discharge is extinguished.

If the master available car relay FRM drops out to indicate that an elevator car no longer is available for assignment or if the down zone demand relay ZD drops out to signify that a down zone service demand no longer exists, make contacts FRM6 or ZD9, as the case may be, open to interrupt the charging circuit for the capacitor C16 and the energizing circuit for the down emergency timing relay EDT. In addition, respective break contacts FRM5 or ZD8 close to discharge the capacitor C16 through the resistor R65.

Energization of the up emergency timing relay EUT indicates that for at least a predetermined period of time one or more of the elevator cars have been available for assignment while concurrently, in general, at least one up zone demand for service has existed. Such energization is indicative of a malfunction in the system which results in the failure of the elevator car dispatching controls to effect the selection of and/or to send an available car to respond to an up zone service demand.

It will be apparent by inspection that the timing circuits associated with the relay EUT are similar to those described for the relay EDT, with the exception that contacts of the up zone demand relay DU are employed in the circuits of the relay EUT as opposed to contacts of the down zone demand relay ZD in the circuits of the relay EDT. Consequently, further description of the components associated with the relay EUT is deemed unnecessary at this time. It will be assumed that the up emergency timing relay EUT also has a time delay in pickup of the order of 20 seconds.

The down emergency relay EDC, when picked up, conditions the elevator system to provide emergency down service. This relay initially is energized through make contacts EDT2 of the down emergency timing relay, whose operation has been described above. Pickup of the relay EDC is accompanied by closure of its make contacts EDC7 to complete a self-holding circuit through make contacts DRM1 of the master down call relay. It will be recalled that the relay DRM is picked up as long as a down floor call is registered for a floor above the first floor. Consequently, once energized, the relay EDC is maintained picked up through the contacts DRM1 until all down floor calls for floors above the first floor have been answered. Conveniently, a manually-operable switch SW7 may be connected in parallel with the contacts DRM1. This switch may be closed so that the elevator system, once conditioned to provide emergency down service, remains so conditioned, regardless of whether the contacts DRM1 subsequently open, until the switch is manually opened. For example, it may be deemed desirable to maintain this mode of operation continuously until maintenance personnel have had an opportunity to inspect the control system and to make any repairs which may be necessary.

Energization of the up emergency relay EUC conditions the elevator system to provide emergency up service. Although this relay initially may be energized only through make contacts EUT2 of the up emergency timing relay, it also conveniently may be energized through make contacts EDC8 of the down emergency relay. Pickup of the relay EUC is accompanied by closure of its make contacts EUC3 to complete a self-holding circuit through make contacts URM3 of the master up call relay. It will be recalled that the relay URM is picked up as long as an up floor call is registered for a floor above the first floor. Thus, once energized, the relay EUC is maintained picked up through the contacts URM3 until all up floor calls for floors above the first floor have been answered or until the down emergency relay EDC drops out to open its make contacts EDC8, whichever occurs later. A manually-operable switch SW8 may be connected in parallel with the contacts URM3. The purpose of this switch will be understood from the foregoing description of the switch SW7 in the holding circuit of the relay EDC.

Conveniently, a suitable signal in the form of a lamp 303 may be provided to indicate that the elevator system is conditioned to provide emergency service. Thus, the lamp 303 is energized if make contacts EDC9 are closed to signify that the elevator system is conditioned to provide emergency down service or if make contacts EUC4 are closed to indicate that the system is conditioned to provide emergency up service.

FIGS. 15 AND 16

Figure 15:
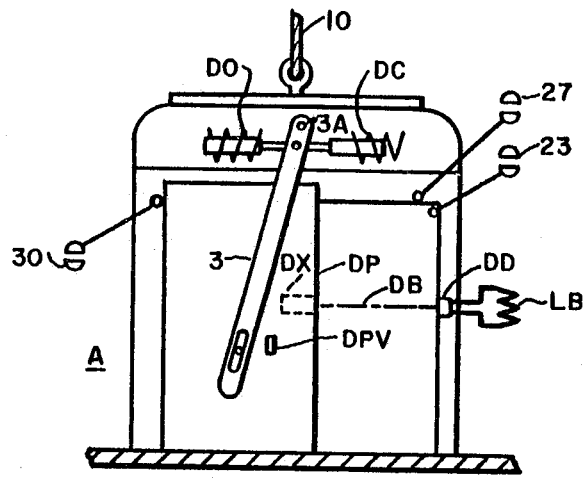
FIG. 15 is a view in front elevation illustrating suitable door operating components for one of the elevator cars of FIG. 1.
Figure 16:
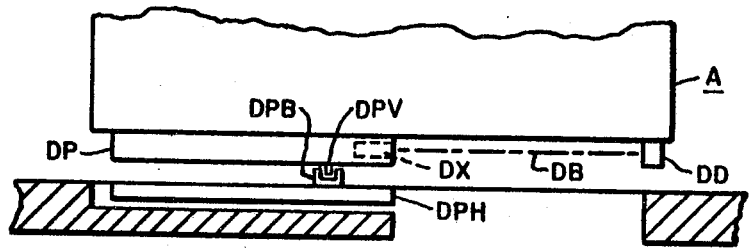
FIG. 16 is a top plan view with parts broken away, parts in section and parts not shown of the elevator car of FIG. 15 associated with a hoistway.

FIGS. 15 and 16 are similar to FIGS. 13 and 14 of our reference patent.

OPERATION

In applying the operation discussion of our reference patent to the present drawings, it will be recalled that a component appearing in a figure of the patent may appear in a different figure of the present drawings. It should be noted at the outset that in the circuit of the relays FR and FRS (FIG. 2) make contacts ZB9 of the relay and make contacts SB1 of the special basement service relay are assumed to be open for the initial discussion. In addition, break contacts 79D1 and 79N2 are closed in the energizing circuit for the relay FRS.

Turning to the bottom of FIG. 4, it will be assumed lastly that the switches SW4 and CSW4 (not shown) are in their respective open conditions, while the switch BSW4, as illustrated, is in its closed condition. Consequently, the basement cutout relays 79N and C79N are deenergized, and the elevator cars A and C thus are capable of serving the basement floor and they may be termed basement cars. On the other hand, the relay B79N is picked up, rendering the car B incapable of serving such floor, i.e., the car B is a non-basement car. As a result, make contacts B79N1 (FIG. 2) are closed to effect illumination of the "No Basement Service" sign B55 for the car B. (Although break contacts B79N2 are open, break contacts 79D3 in parallel therewith are closed to maintain energization of the auxiliary available car relay BFRS.) The remaining switches in the control system will be discussed as necessary hereinafter.

In applying the operation of our reference patent to the present circuits it may be helpful to note here some of the changes to be made in the reference patent as follows:

REFERENCE PATENT LOCATION

| Column: | Line | Change |
|---|---|---|
| 80 | 49 | include B79-11 |
| 81 | 55 | contacts M2 now parallel 69H2 and 79-1 |
| 84 | 44 | include ZB4 and FU17 |
| 84 | 60 | include FU17 in holding circuit |
| 84 | 63 | include ZB3 in holding circuit |
| 86 | 64 | include 79-1 |
| 91 | 69 | energizing circuit of KO includes SB4 |
| 92 | 30 | include BFU17 |
| 92 | 36 | include ZB4 |
| 93 | 51 | include B79-17 (This circuit selects lowest unassigned car above the first floor which is not conditioned to serve the basement floor). |
| 93 | 61 | include B79-16. |
| 93 | 71 | for "tenth" read thirteenth. |
| 94 | 24 | energization also is through 79D8. |
| 95 | 49 | include EDC2 and B79P1 |
| 96 | 50 | include SB4 |
| 96 | 70 | pickup is also through BM18. |
| 98 | 12 | The particular car selected is above the first floor and is not conditioned to serve the basement floor. |
| 98 | 63 | car call registered for floor above first |
| 99 | 32, 56, 73 | car call is above |
| 99 | 37 | car is conditioned for up travel |
| 100 | 14, 25 | car call is above |
| 101 | 57 | next scans basement zone |
| 101 | 58 | for "tenth" read thirteenth. |
| 101 | 72 | energizing circuit includes ZB3. |
| 102 | 56 | include 79-17 |
| 102 | 59 | car is above first floor |
| 103 | 11 | and upon closure of M18 as car A stops |
| 104 | 40 | include BFU17 |
| 105 | 30 | include EDC2, BSW3, B79P1 |
| 106 | 5 | closure of B2CR2 (Fig. 5) energizes B38D through MB1. Opening of B38D1 (Fig. 2) prevents pickup of BDFR when B27 closes due to door closure. |
| 106 | 29-51 | Ignore. |

It will be recalled that the present elevator system includes means for providing special service for the basement floor. Such service may be deemed desirable, for example, immediately before the start of a business day if a parking garage is located below the building served by the elevator system; or it may be considered equally desirable near the end of a lunch period if a cafeteria is located on a basement floor.

Referring to FIG. 14, energization of the special basement service relay SB conditions the elevator system to provide special service for the basement floor. As has been pointed out hereinbefore, such energization may be effected by closure of the manually-operable switch SW6 or of the contacts 301 of a suitable timing mechanism. Let it be assumed that either of such closures has occurred and that the relay SB consequently is picked up. (For example, if parking facilities are located on the basement floor, the timing mechanism may be adjusted to close its contacts 301 shortly before the beginning of the business day.)

Referring to FIG. 2, pickup of the relay SB is accompanied by closure of make contacts SB3 to energize the relay $b$UR, thus registering an automatic or artificial up floor call for the basement floor, since it is assumed that no elevator car is conditioned to serve the basement floor (break contacts 79M1 are closed) and that no car is located at such floor (break contacts ZB1, BZB1 and CZB1 are closed). In picking up, the relay $b$UR closes its make contacts $b$UR1 to establish a self-holding circuit. Closure of make contacts $b$UR8 (FIG. 14) prepares the basement demand relay 79D for energization. Recalling that it was assumed initially that only the cars A and C are capable of serving the basement floor (break contacts 79N4, 79N5, C79N4 and C79N5 all are closed), it will be assumed additionally at this time that the car A is conditioned for down travel (make contacts X17 of the car A down preference relay are closed) and is not assigned to answer down floor calls (break contacts SH14 are closed) or up floor calls (break contacts FU18 are closed) and that the elevator car C is available for assignment (make contacts CFR25 of the car C available car relay are closed). Consequently, it will be apparent that the relay 79D is picked up through two of the parallel circuit branches associated therewith, since no elevator car is conditioned to serve the basement floor (break contacts 79M2 are closed). As a result make contacts 79D9 (FIG. 12) close to energize the closest car relay 69P, and the relay 69P picks up to open its break contacts 69P1 (FIG. 2) to prevent energization therethrough of the auxiliary available car relay FRS for the car A and closes its make contacts 69P2 to complete the following energizing circuit for the relay FRS:

L1, FU12, SH11, X12, 79–16, 69P2, 79N2, FRS, L2

Inasmuch as the car B is not capable of serving the basement floor (break contacts B79N2 are open), the open break contacts 79D3 insure that the auxiliary available car relay BFRS remains dropped out. However, since it is assumed that the car C is a basement car and is available for assignment, is auxiliary available car relay CFRS (not shown) is energized, since the contacts associated with the car C corresponding to the contacts FR21, 79D2 and 79N2 in the energizing circuit of the relay FRS for the car A all are closed.

Returning to pickup of the closest car relay 69P (FIG. 12), such pickup under the specified conditions indicates that it is desired to select for serving the basement floor the lowest basement car which is available for assignment or which is unassigned and set for down travel. It will be assumed that the car A, which is a basement car and which is unassigned and set for down travel, is located at the third floor in the first zone (second and third floors) and that the car C, which also is a basement car and which is available for assignment, is located in the third zone (sixth floor). Turning to FIG. 13, closure of make contacts 69P26 energizes the coil of the low zone stepping switch FSL through its self-stepping contacts FSL2. Consequently, the brushes of the level FSL$c$ rapidly scan for the lowest suitable car in the low zone (first, second and third floors). Thus, when these brushes reach their tenth position, the coil of the low zone stepping switch FSL continuously is energized through the level FSL$c$ and make contacts 69P28, Z1–5 and FRS3. (Inasmuch as the elevator car A is located at the third floor in the first zone, its zone position relay Z1, FIG. 4, is picked up to close the contacts Z1–5.) Consequently, the brushes of the stepping switch FSL remain in their tenth position, wherein the demand response relay FCR is energized through the level FSL$a$ and make contacts 69P24 and FRS2. Pickup of the relay FCR indicates that the elevator car A has been selected to serve the basement floor.

In picking up, the relay FCR closes its make contacts FCR6 (FIG. 4) to energize the car A basement service relay 79 through make contacts 79D5. Energization of the relay 79 conditions the car A to serve the basement floor, and is accompanied by closure of its make contacts 79–6 to establish a self-holding circuit through make contacts $b$UR2. The relay 79 also closes its make contacts 79–12 (FIG. 14) to pick up the master basement service relay 79M and opens its break contacts 79–16 (FIG. 2) to drop out the auxiliary available car relay FRS. It will be noted that pickup of the relay 79M results in opening of its break contacts 79M1, but the basement up floor call registering relay $b$UR remains energized through its holding contacts $b$UR1. The master basement service relay also opens its break contacts 79M2 (FIG. 14) to deenergize the basement demand relay 79D, which opens its make contacts 79D9 (FIG. 12) to drop out the closest car relay 69P. Dropout of the relay 69P results in the resetting of the brushes of the low zone stepping switch FSL (FIG. 13) to their homing position by a sequence of operations which will be understood from the preceding discussion.

It will be observed that had the elevator car A been available for assignment at the third floor rather than unassigned and conditioned for down travel, its associated available car relay FR (FIG. 2) would have been picked up to close its make contacts FR5 (FIG. 5) in the energizing circuit of the down call assigned relay FA. Consequently, upon selection of the car A to serve the basement floor, closure of make contacts 79–8 would have resulted in energization of the relay FA through the contacts FR5 and break contacts ZB5, 38R3 and FU17. Thus, pickup of the relay FA would have effected a change in the direction of travel for which the car A was conditioned from up to down and would have caused the car A to run in the latter direction from the third floor in a manner which will be clear from the previous discussion.

It now will be assumed that a down floor call has been registered for the second floor by the pressing of the pushbutton 2D (FIG. 3) to pick up the down floor call registering relay 2DR. Normally, an elevator car which is assigned to serve the basement floor, as in the case of the car A under the assumed conditions, answers, on its way to such floor, all of its car calls and all down floor calls which another car is not specifically assigned to answer. Consequently, the car A, as it proceeds toward the basement floor, stops at the second floor, for which a down floor call is assumed to be registered, as a result of energization of the floor call stopping relay S (FIG. 3) in a manner which will be explained in greater detail in the section entitled "Down Floor Calls."

It will be assumed, however, that by the time the car A reaches the second floor, the artificial up floor call which initially was registered by closure of make contacts SB3 (FIG. 2) to energize the basement up floor call registering relay $b$UR has become a priority call, i.e., that the basement timing relay KTB is picked up through make contacts $b$UR9 in a manner which will be clear from the preceding discussion of FIG. 14 to signify that the artificial up floor call for the basement floor has been registered continuously for at least 20 seconds. (It will be noted that since the elevator system is conditioned for special basement service operation, make contacts SB8 of the special basement service relay are closed to shunt a portion of the resistor R62 in the timing circuit of the relay KTB through break contacts NDR14, thus reducing the time delay in pickup of this relay from one minute to 20 seconds.)

Pickup of the basement timing relay KTB is accompanied by closure of its make contacts KTB1 (FIG. 4) to energize the basement by-pass relay 79P for the elevator car A through make contacts 79–7 and break contacts M79P1 and Z0–22. The relay 79P closes its make contacts 79P2 to shunt the contacts M79P1. This relay also closes its make contacts 79P3 (FIG. 14) to energize the master basement by-pass relay M79P, which opens its break contacts M79P1 (FIG. 4), but the relay 79P remains energized through its holding contacts 79P2. It will be noted, however, that pickup of the relay M79P prevents pickup of the respective basement by-pass relays for the remaining elevator cars in the system. For example, break contacts M79P2 open to prevent energization of the basement by-pass relay B79 for the elevator car B.

In picking up, the relay 79P for the car A opens its break contacts 79P1 (FIG. 3) in the energizing circuit of the floor call stopping relay S for the car A. Consequently, the car A is expressed toward the basement floor, i.e., it is prevented from stopping at the second floor in response to the down floor call which is assumed to be registered therefor and will by-pass such floor unless a car A car call also is registered for the second floor. On the other hand, the car B is not similarly prevented from stopping at the second floor, inasmuch as break contacts B79P1 in the energizing circuit of the car B floor car stopping relay BS remain closed, as will be apparent from the above discussion.

If desired, the switch SW2 may be closed to render make contacts TDC5 of the priority zone stopping relay effective for energizing the relay S to stop the car A at any floor for which a priority down floor call is registered, although the car A is conditioned to serve the basement floor. (The manner in which the relay TDC, FIG. 12, is energized will be clear from the preceding discussion of pickup of the relay BTDC to stop the car B for a priority down floor call for the second floor.) Thus, assuming that the switch SW2 is closed and that the down floor call which is registered for the second floor is a priority call, as the elevator car A approaches the second floor the brush cc engages the contact segment c2 to complete the following energizing circuit:

L1, 2DR1, c2, cc, F1C1, SH1, FU11,
        X3, SW2, TDC5, LW1, S, L2

Energization of the floor call stopping relay S results in the stopping of the car A at the second floor.

After the elevator car A answers the priority down floor call for the second floor, it continues its downward travel toward the first floor. Consequently, the brush jj (FIG. 4) disengages the contact segment j2 to drop out the zone position relay Z1 and engages the contact segment j1 to pick up the zone position relay Z0. Closure of make contacts Z0–24 (FIG. 14) results in pickup of the basement time resetting relay 79FL through make contacts 79–13. Such pickup is accompanied by closure of the make contacts 79FL1 and opening of break contacts 79FL2 to reset the timing circuits associated with the basement timing relay KTB in a manner which will be understood from the discussion of FIG. 14. The zone position relay Z0 also opens its break contacts Z0–22 (FIG. 4) to deenergize the car A basement by-pass relay 79P, and the relay 79P opens its make contacts 79P3 (FIG. 14) to drop out the master basement by-pass relay M79P. The relay 79P also closes its break contacts 79P1 (FIG. 3) in the energizing circuit of the floor call stopping relay S for the car A.

It will be recalled that a down-traveling car which reaches the first floor and which is not conditioned to serve the basement floor automatically is stopped at the first floor. For example, if the car A were not conditioned to serve the basement floor, engagement of the brush ff with the contact segment f1 in the circuit of the car call stopping relay T would result in the stopping of the car A at the first floor. Under the assumed conditions, however, break contacts 79–5 of the car A basement service relay are open to render the contact segment f1, upon engagement therewith by the brush ff, unable to effect energization of the relay T. Consequently, the relay T would be energized only if make contacts 1CR3 were closed as the result of pickup of the car call registering relay 1CR to indicate the registration of a car A car call for the first floor. It also will be observed that the registration of a down floor call for the first floor would result in the stopping of the car A at such floor and the cancellation of such call, since make contacts 79–3 and 79–4 in series with the respective contact segments c1 and e1 associated with the floor call stopping relay S are closed. It will be assumed, however, that neither a car call for the car A nor a down floor call is registered for the first floor. Consequently, the car A by-passes the first floor and continues downwardly toward the basement floor.

Referring to FIG. 8, it will be noted that the open break contacts 79–11 in the energizing circuit of the next car relay N prevented the selection of the car A as the next car to leave the first floor when the car A approached such floor. It also will be noted that the closed make contacts 79–2 (FIG. 1) insured through the limit switch 31 continued energization of the down preference relay X, although the limit switch 24 opened as the car A reached the first floor, as has been explained heretofore.

As the elevator car A approaches the basement floor and the carriage of its floor selector notches to its basement-floor position, the brush ff (FIG. 3) engages the contact segment fb to energize the car call stopping relay T. Such energization results in the stopping of the car A at the basement floor in a manner which will be clear from the preceding discussion.

Since the limit switch 31 (FIG. 1) opens as the elevator car A reaches the basement floor, it follows that the down preference relay X is deenergized. (It is assumed that the limit switch 24 remains open as long as the car A is located below the first floor.) Inasmuch as the brush jj (FIG. 4) now is in engagement with the contact segment jb, the zone position relay ZB is picked up. Consequently, dropout of the relay X (FIG. 1) to close its break contact X2 results in energization of the up preference relay W through make contacts ZB11 and break contacts 69H2 and D6.

In picking up, the up preference relay W closes its make contacts W4 (FIG. 2) to complete the following cancelling circuit:

L1, bUR1, bURN, 79–14, bB, bb, W4, L3, L3a (FIG. 3), FR2, M6, L2

Energization of the cancelling coil bURN (FIG. 2) resets the up floor call registering relay bUR to cancel the (artificial) up floor call for the basement floor. In dropping out, the relay bUR opens its holding contacts bUR1 and opens its make contacts bUR2 (FIG. 4) in the holding circuit of the basement service relay 79. Inasmuch as the non-interference time for the car A has not yet expired, however, make contacts 70T6 in parallel with the contacts bUR2 are closed to maintain the relay 79 picked up through its holding contacts 79–6.

The stopping of the elevator car A at the basement floor is accompanied by the opening of its doors by a sequence of operations which will be understood from the preceding discussion.

Let it be assumed that before the doors of the elevator car A reclose at the basement floor, a sufficient number of passengers enter the car to load the car to its rated capacity. In response to such loading, the load switch LW (FIG. 1) for the car A is actuated. At the expiration of the non-interference time for the car A, its associated non-interference relay 70T drops out to initiate closure of the doors of the car A, as will be understood from the preceding discussion. In addition, the relay 70T opens its make contacts 70T6 (FIG. 4) in the holding circuit of the basement service relay 79, and the relay 79 consequently drops out. Such dropout is accompanied by opening of make contacts 79–12 (FIG. 14) to deenergize the master basement service relay 79M, and this relay closes its break contact 79M2 to permit subsequent energization of the basement demand relay 79D and closes its break contacts 79M1 (FIG. 2) to prepare the basement up floor call registering relay bUR for subsequent energization as the car A prepares to leave the basement floor and break contacts ZB1 of its associated zone position relay ZB close.

Referring to FIG. 11, it will be noted that the up bypass relay 77U now is energized, since the elevator car A is conditioned for up travel (make contacts W14 are closed), the elevator system is conditioned to provide special service for the basement floor (make contacts SB5 are closed), the car A is located at the basement floor (make contacts ZB8 are closed) and is fully loaded (make contacts LW4 of its associated load switch are closed) and its non-interference time has expired (break contacts 70T5 are closed). Pickup of the relay 77U once again is indicative of the existence of an up peak traffic condition and is accompanied by closure of make contacts 77U1 to energize the no demand return relay NDR. The relay NDR, in turn, closes its make contacts NDR6 to establish a self-holding circuit through break contacts 911R1 and MFB3. (By inspection of FIG. 11 and from the preceding discussion, it will be recalled that pickup of the relay 77U to close the contacts 77U1, thus energizing the relay NDR, also occurs if an elevator car conditioned for up travel and whose non-interference time has expired is fully loaded at the first floor.)

Pickup of the no demand return relay NDR when the elevator system is conditioned to provide special service for the basement floor conditions the system for a modified form of no demand return operation, which has been described in detail heretofore. During such modified operation, elevator service is expedited for both the basement and first floors. Thus, if no car is located at the basement floor, an automatic or artificial up floor call is registered therefore, and the lowest basement car which is available for assignment or which is unassigned and set for down travel is selected to serve the basement floor. It will be recalled that such a call resulted in the selection of the car A to serve the basement floor. In addition, it will be observed by inspection of FIG. 14 that the time delay in pickup of the basement timing relay KTB is reduced substantially to zero, since make contacts SB8 and NDR15 are closed to shunt all but a small portion of the charging resistor R62 (refer to the discussion of FIG. 14). Consequently, the car selected to provide basement service always is expressed to the basement floor during modified no demand return operation.

Referring to FIG. 9, it will be noted that when the elevator system is conditioned to provide special basement service, break contacts SB4 are open to prevent energization of the down zone demand registering relay K0 to register an artificial demand for first-floor service through break contacts SFB1 and make contacts NDR5. As a result, during this modified mode of operation, the control system does not tend to maintain at least two cars at the first floor, as was the case during basic no demand return operation. However, the relay K0 may be energized if no elevator car is located at the first floor (break contacts Z0–10, BZ0–10 and CZ0–10 are open), if no car is conditioned for down travel or even if a car is conditioned for down travel but is assigned to answer up floor calls (in both of which instances break contacts MX3 are closed) and if the elevator system is not conditioned for instant dispatch operation (break contacts PD3 are closed). Pickup of the relay K0 under these conditions effects travel in the down direction of an elevator car which is available for assignment, as will be clear from the foregoing description of operation. Furthermore, during modified no demand return operation, as during basic no demand return operation, the closest car relay 69P (FIG. 12) operates to express an unassigned down-traveling car to the first floor if no car is located at such floor. Thus, the control system tends to maintain at least one elevator car at each of the basement and first floors.

It will be recalled that normally during an up peak traffic condition, when the elevator system is conditioned for basic no demand return operation, no elevator car which is located at the lower terminal floor can become available for assignment to serve another floor. This will be apparent by inspection of the circuits of FIG. 2 associated with the available car relays FR and BFR and the auxiliary available car relays FRS and BFRS, wherein break contacts NDR1 and NDR2 and similar contacts associated with the corresponding relays for the car C (not shown) open to prevent pickup therethrough of the respective associated relay. However, when the system is conditioned to provide special basement service and the basement floor in effect becomes as important as the first floor insofar as the provision of up service for each of such floors as concerned, such contacts are rendered ineffective, inasmuch as make contacts of the special basement service relay SB respectively in parallel therewith are closed. For example, referring to the energizing circuit of the relays FR and FRS for the car A, make contacts SB1 in parallel with the contacts NDR1 remain closed throughout special basement service operation. Thus, at all times during such operation, including up peak periods, an elevator car located at the first floor, provided that it meets the remaining conditions necessary to effect pickup of its associated available car and auxiliary available car relays, may be conditioned to serve the basement floor.

It now will be assumed that the up peak traffic condition has subsided sufficiently to effect interruption of the holding circuit of the no demand return relay NDR (FIG. 11) in a manner which has been described heretofore. Thus the relay NDR drops out.

It also will be assumed that the switch SW6 (FIG. 14) or the timing mechanism contacts 301, as the case may be, open to drop out the special basement service relay SB. Consequently, the elevator system no longer is conditioned to provide special service for the basement floor.

Relay B2CR also opens its make contacts B2CR2 (FIG. 5) to drop out the car call below relay B38D, which closes its break contacts B38D1 (FIG. 2) to prepare the down available car relay BDFR for subsequent energization.

After the passenger departs the elevator car B and sufficient time has elapsed for the non-interference relay B70T (FIG. 1) to drop out, break contacts B70T2 (FIG. 5) close to energize the door-control relay B45, thus initiating a closing operation of the doors of the car B. As the doors approach their fully closed position, the switch B27 (FIG. 2) closes to complete the energizing circuit for the down available car relay BDFR, since all of the contacts in such circuit now are closed, as will be apparent by inspection thereof. Pickup of the relay BDFR is accompanied by closure of its make contacts BDFR2 to establish through break contacts BFR22 a holding circuit around the contacts B38D1 and BX15. Make contacts BDFR1 close to prepare the available car relay BFR for subsequent energization therethrough. Finally, the relay BDFR closes its make contacts BDFR3 (FIG. 7) to energize the low call reversal relay B69L, which opens its break contacts B69L2 (FIG. 1) to drop out the down preference relay BX. The resulting closure of break contacts BX2 effects pickup of the up preference relay BW. Make contacts BX15 (FIG. 2) open, but the relay BDFR remains energized through its holding contacts BDFR2 and the contacts BFR22.

In picking up, the relay BW closes its make contacts BW7 to complete an energizing circuit for the available car relay BFR, which consequently picks up to close its holding contacts BFR3. (It will be noted that the closed contacts BDFR1 permit pickup of the relay BFR even though make contacts B78U3 may be open to indicate that an up floor call is registered for the second or a higher floor.) In addition, the relay BFR opens its break contacts BFR22 to interrupt the holding circuit of the down available car relay BDFR, and the relay BDFR consequently drops out. As a result, make contacts BDFR1 open, but the relay BFR is maintained and picked up through its holding contacts BFR3, and make contacts BDFR3 (FIG. 7) open to drop out the low call reversal relay B69L without further effect on system operation. The relay BFR also opens its break contacts BFR4 (FIG. 5) to drop out the second auxiliary running relay B80, which picked up when break contacts B70T1 closed upon expiration of the non-interference time for the car B. As a result, make contacts B80–1 (FIG. 1) open to prevent energization of the running relay BM as the doors of the car B arrive at their fully closed position.

In summary, the elevator car B has become conditioned for up travel and available for assignment at the second floor after answering its last car call while traveling in the down direction, as indicated by closure of break contacts B38D1 of the car call below relay for the car B. If desired, break contacts of suitable car passenger detecting means may be substituted for the contacts B38D1 for the reason that occasionally a passenger, knowing that his car is conditioned for down travel, will fail to register a car call for the first floor, expecting his car to proceed automatically thereto. As has just been explained, this is not necessarily true when contacts such as the contacts B38D1 are employed, and a passenger may be left waiting inside of his car to no avail. The aforesaid detecting means, for example, may take the form of a group of mat switches, which are well known in the art, in the floor of each elevator car, and such switches may have contacts which are open when a passenger is standing in the associated car to prevent energization of the corresponding down available car relay. Consequently, as long as a passenger is disposed in a car which is conditioned for down travel above the first floor, the car cannot become available for assignment, and it must travel to the first floor even though no car call is registered therefor, as will be understood from the preceding discussion.

In continuing the application of the operation of the reference patent the following additional changes should be noted:

REFERENCE PATENT LOCATION

| Column: | Line | Change |
| --- | --- | --- |
| 107 | 56 | holding circuit includes BFU17 |
| 108 | 33 | pickup circuit includes BZB3 |
| 108 | 35 | holding circuit includes BZB3 |
| 112 | 36 | pickup circuit includes BFU17 |
| 114 | 54 | circuit includes 79P1 |
| 116 | 14 | energizing circuit includes ZB3 |
| 116 | 31 | include 79P1 |
| 116 | 61 | include EDC1, SW3, 79P1 |
| 119 | 25 | down floor calls refer to those above first floor |
| 120 | 7 | energizing circuit includes EUC7 |
| 120 | 22 | self holding circuit is through 45–4, 70T7 |
| 120 | 28 | after the period the following may be read. |

Make contacts FU16 (FIG. 4) close to energize the limited up travel relay LU through break contacts FUH6 and EUC5 and make contacts W18 and H17. Pickup of the relay LU results in closure of its make contacts LU2 to establish a holding circuit through break contacts FR23 (upon dropout of the relay FR) and Z2–8. The relay LU also closes its make contacts LU1, but the up call above relay 78U remains dropped out, inasmuch as break contacts 2UR2 are open as aforesaid. (It will be recalled that break contacts 5UR2 also are open.)

In our reference patent the subject matter starting after the period in column 120, line 62, through column 121, line 32, is revised to read on the present drawings as follows.

The running relay closes it make contacts M4 to pick up the non-interference relay 70T, which opens its break contacts 70T2 (FIG. 5), but the door-control relay 45 is maintained energized through its holding contacts 45–1 and now-closed make contacts M10 of the running relay. The non-interference relay also opens its break contacts 70T7 (FIG. 7), but the up call assigned relay FU remains picked up through its holding contacts FU8 and make contacts 45–4.

Upon expiration of its time delay in dropout, the available car relay FR closed its break contacts FR1 (FIG. 3) to prepare the floor call stopping relay S (FIG. 3) for energization. Break contacts FR2 closed to permit subsequent cancellation of registered up floor calls. In addition, break contacts FR15 (FIG. 11) closed to prepare the low up zone position relay Z1U for energization therethrough.

As the elevator car A leaves the first floor, its floor selector carriage notches to its second-floor position to effect engagement of the contact segment a2 (FIG. 2) by the brush aa. Such operation results in completion of the following energizing circuit:

L1, 2UR1, FUH1, a2, aa, FR1, FA1, W3, L4, L4a (FIG. 3), 79P1, LW1, S, L2

Pickup of the floor call stopping relay S results in closure of make contacts S1 (FIG. 1) to effect a stopping operation of the elevator car A at the second floor in a manner which will be understood from the preceding discussion. As the car stops, its running relay M drops out to open make contacts M10 (FIG. 5), thus dropping out the door-control relay 45 to initiate an opening operation of the doors of the car A. In addition, the relay 45 opens its make contacts 45–4 (FIG. 7) to interrupt the holding circuit of the up call assigned relay FU. The relay FU consequently drops out to open its make contacts FU4 (FIG. 5), thus deenergizing the first auxiliary running relay RA without further affecting operation, and to open its make contacts FU16 (FIG. 4), but the limited up travel relay LU remains picked up through its aforesaid holding circuit.

Returning to the dropout of the running relay M, a break contacts M6 (FIG. 3), close to complete the following cancelling circuit (refer to FIG. 2):

L1, 2UR1, 2URN, b2, bb, W4, L3, L3a (FIG. 3), FR2, M6, L2

As a result, the up floor call registering relay 2UR (FIG. 2) is reset.

In resetting, the up floor call registering relay 2UR opens its make contacts 2UR1 to interrupt the holding circuit around the push button 2U. Closure of break contacts 2UR3 (FIG. 4) and similar contacts for the elevator car C has no immediate effect on operation of the up call above relays B78U and C78U (not shown) inasmuch as under the assumed conditions an up floor call still is registered for the fifth floor (break contacts 5UR3 and similar contacts for the car C are open) and the limited up travel relays BLU and CLU are dropped out to open break contacts BLU1 and similar contacts for the car C. Consequently, the relays B78U and C78U remain dropped out. Since the limited up travel relay LU for the car A has picked up as aforesaid, however, closure of break contacts 2UR2 completes an energizing circuit for the car A up call above relay 78U through make contacts LU1, break contacts 3UR2, the contact segment k2 and the brush kk. In picking up, the relay 78U closes its make contacts 78U3 to prepare the available car relay FR for subsequent energization therethrough. It will be noted that inasmuch as the doors of the car A are assumed to be open, the switch 27 is open to prevent completion of an energizing circuit for the relay FR. It also will be noted that the lower terminal no-start relay 981, FIG. 8, dropped out as the car A left the first floor and the zone position relay Z0 dropped out to open its make contacts Z0–8. As a result, make contacts 981–1, FIG. 2, in the energizing circuit of the relay FR also are open, as are make contacts ZB9 of the zone position relay ZB.

In lieu of the sentence starting after the period in column 122, line 13, of our reference patent the following discussion should be read.

Cancellation of such call to reset the car call registering relay 3CR results in opening of make contacts 3CR3 (FIG. 4), but the limited up travel relay LU is maintained energized through its holding circuit, and its make contacts LU1 thus remain closed to maintain pickup of the up call above relay 78U. Referring for a moment to FIG. 5, it will be noted that the notching of the car A floor selector carriage to its third-floor position resulted in the opening of the switch m3 by the cam mm to drop out the car call above relay 38R. Consequently, upon expiration of the car A non-interference time, the doors of the car reclose to close the switch 27 (FIG. 2), which completes the following energizing circuit for the available car relay FR:

L1, 27, SS1, M9, FU2, FA3, 38R2,
                78U3, NDR1 and Z0-1, W7, FR, L2

Thus, the car A is available for assignment (as indicated by pickup of the relay FR) at the third floor. In picking up, the relay FR closes its holding contacts FR3 and opens its break contacts FR23 (FIG. 4) to interrupt the holding circuit of the limited up travel relay LU. Consequently, the relay LU drops out to open its make contacts LU1, as a result of which the up call above relay 78U drops out, inasmuch as an up floor call still is assumed to be registered for the fifth floor and break contacts 5UR2 thus are open.

It will be noted that the elevator car A has become available for assignment after answering its last car call in the low up zone, despite the fact that an up floor call is registered for the fifth floor in the high up zone.

Suppose, however, that the car A has stopped at the second floor in response to a car call therefor (the car call registering relay 2CR, FIG. 3, was energized) and that an up floor call previously has been registered for the third floor, as indicated by energization of the up floor call registering relay 3UR (FIG. 2). Referring to FIG. 4, when the relay 2CR is initially picked up, it closed its make contacts 2CR3 to energize the limited up travel relay LU, which closed its make contacts LU2 to establish a self-holding circuit. Since break contacts 3UR2 are open, however, the up call above relay 78U cannot pick up upon closure of make contacts LU1. As a result, make contacts 78U3 (FIG. 2) remain open to prevent pickup of the available car relay FR, although it is assumed that the car A has answered its last car call (break contacts 38R2 of the car call above relay for the car A are closed), and the car A must travel to the third floor to answer the up floor call which is registered therefor, at which time the relay 78U (FIG. 4) picks up, as will be apparent from the preceding discussion, to close its make contacts 78U3 (FIG. 2) in the energizing circuit of the available car relay FR. But, assuming that the prospective passenger who registered the up floor call for the third floor enters the car A after it stops at the third floor and registers a car call for a higher floor, as is to be expected, the resulting opening of break contacts 38R2 of the car A car call above relay prevents energization of the relay FR upon reclosure of the doors to close the switch 27, and the car A thus proceeds to answer its car call above. It will be noted that when the floor selection carriage of the car A notches from its third to its fourth-floor position, the brush jj, FIG. 4, disengages the contact segment j3 to drop out the zone position relay Z1 and thereafter engages the contact segment j4 to pick up the zone position relay Z2. As a result, break contacts Z2-8 open to interrupt the holding circuit of the limited up travel relay LU, and the relay LU thus drops out and is reset.

From the foregoing discussion, it will be observed that an elevator car in the present system which has made its last stop in the low up zone during an up trip may become available for assignment in such zone provided that it has answered its last car call and that no up floor call is registered for a higher floor in the low up zone, although an up floor call may be registered for a floor in the up zone. In addition, it will be apparent by inspection that a car which has made its last stop in the high up zone during an up trip may become available for assignment in such zone provided again that it has answered its last car call and that no up floor call is registered for a higher floor in the high up zone. The foregoing may be stated in general terms as follows: a car which has answered its last car call during an up trip may become available for assignment at the floor at which it is stopped if no up floor call is registered for a higher floor in the up zone of floors in which the car is located.

In some applications, however, it may be deemed desirable for an elevator car which has answered its last car call during an up trip to become available for assignment at the corresponding floor regardless of whether or not any up floor call is registered for a higher floor, be it for a floor in the same or a higher up zone. In such instance, it will be understood that the up floor call above relay contacts and all contacts in parallel therewith in the energizing circuit of the available car relay for each car and the limited up travel relay for each car may be eliminated. Referring to the available car relay FR (FIG. 2) for the car A, for example, parallel make contacts 78U3, 981-1, ZB9 and FR3 may be omitted, and break contacts 38R3 then may be connected directly to the parallel combination of break contacts Z0-1, break contacts NDR1 and make contacts SB1 to accomplish the desired result. In addition, it will be clear that the limited up travel relay LU (FIG. 4) no longer serves a useful function and it also may be omitted.

Returning to the preceding example wherein the elevator car A has answered its last car call at the third floor and thereafter has become available for assignment at such floor and recalling that an up floor call is registered for the fifth floor, assume that before the car A becomes available for assignment the elevator car B has reached the first floor and has become available for assignment (the available car relay BFR, FIG. 2, is picked up).

The discussion of our reference patent may be resumed with the following notations.

REFERENCE PATENT

| Column: | Line | Change |
|---|---|---|
| 125 | 18 | make contacts ZB11 are also open |
| 125 | 33 | Contacts 80-2 not in present circuit. Contacts W10, 45-4, 70T7 are all closed at this time. |
| 127 | 4 | Contacts ZB9 also are open |
| 127 | 9 | For the next two sentences read the following: |

Opening of break contacts W10 results in dropout of the up call assigned relay FU, since break contacts 70T7 of the non-interference relay are open, as are make contacts 45-4 of the door-control relay 45 (FIG. 5), which dropped out as the car A stopped at the third floor. (It will be noted that make contacts W18, FIG. 4, in the energizing circuit of the limited up travel relay LU close upon pickup of the relay W, but it is assumed that the inherent lag in pickup of the relay LU is sufficient to prevent its pickup before make contacts FU16 open upon the aforesaid dropout of the relay FU. If necessary to insure that such is the case, the relay LU may be provided with a slight additional time delay in pickup by any conventional means.).

The discussion of our reference patent may be resumed with the following notations:

REFERENCE PATENT

| Column: | Line | Change |
|---|---|---|
| 127 | 40 | car A also may be available at basement floor |
| 127 | 59 | include L4, L4a, 79P1 |

Such energization is accompanied by closure of make contacts 1DR1 to establish a holding circuit around the push button 1D. In addition, make contacts 1DR4 (FIG. 14) close to pick up the basement demand relay 79D through break contacts 79M2 and the two lower circuit branches respectively associated with the cars A and C.

In picking up, the basement demand relay opens its break contacts 79D1 (FIG. 2) and similar contacts associated with the car C to prevent energization therethrough of the respective auxiliary available car relays FRS and CFRS. However, the closed break contacts 79N2 of the car A basement cut-out relay and similar contacts for the car C render such openings ineffective. On the other hand, break contacts 79D3 and B79N2 both are open to prevent subsequent energization of the auxiliary available car relay BFRS for the car B. The basement demand relay also closes its make contacts 79D5 (FIG. 4) and similar contacts for the car C to prepare the basement service relays 79 and C79 for subsequent energization and opens it break contacts 79D7 (FIG. 6) and similar contacts associated with the car C to prevent subsequent energization of the coils of the respective assigned zone stepping switches KA and CKA. Finally, the basement demand relay closes its make contacts 79D9 (FIG. 12) to energize the closets car relay 69P.

Pickup of the relay 69P is accompanied by closure of its make contacts 69P2 (FIG. 2) to energize the auxiliary available car relay FRS. Similar contacts close to pick up the relay CFRS for the car C. Referring to FIG. 13, these relays, in turn, close their respective make contacts FRS1, FRS2, FRS3, CFRS1, CFRS2 and CFRS3. It will be recalled that pickup of the closest car relay 69P under the specified conditions results in the operation of the circuits of FIG. 13 to select for serving the basement floor the closest basement car to such floor which is available for assignment or which is unassigned and set for down travel. Thus, the scanning for a basement elevator car satisfying either of the foregoing conditions takes place in the following sequence: a car located at the basement floor; a non-next basement car located at the first floor; a next basement car located at the first floor; a basement car located in the first zone (second and third floors); a basement car located in the second zone (fourth and fifth floors); and finally a basement car located in the third zone (sixth floor). Thus, under the assumed conditions, the elevator car A, which is traveling down in the first zone is selected to serve the basement floor, since it is closer thereto than the car C, which is traveling down in the second zone, i.e., when the brushes of the low zone stepping switch FSL reach their tenth position, the demand response relay FCR for the car A is energized in a manner which will be understood from the preceding discussion.

Pickup of the relay FCR results in closure of its make contacts FCR6 (FIG. 4) to complete through make contacts 79D5 an energizing circuit for the basement service relay 79, whose pickup indicates that the car A is conditioned to serve the basement floor. In picking up, the relay 79 closes its make contacts 79-6 to establish a holding circuit through make contacts 70T6 of the non-interference relay for the car A. Break contacts 79-16 (FIG. 2) open to drop out the auxiliary available car relay FRS. In addition, make contacts 79-12 (FIG. 14) close to pick up the master basement service relay 79M, which opens its break contacts 79M2 to drop out the basement demand relay 79D. The basement demand relay opens its make contacts 79D5 (FIG. 4), but the car A basement service relay 79 is maintained energized through the aforesaid holding circuit. Furthermore, the relay 79D opens its make contacts 79D9 (FIG. 12) to deenergize and drop out the closest car relay 69P, thus preventing the selection of another elevator car to serve the basement floor at this time, inasmuch as such dropout and dropout of the auxiliary available car relay FRS results in the resetting of the brushes of the low zone stepping switch FSL (FIG. 13) to their homing position.

The elevator car A, which now is conditioned to serve the basement floor answers on its way down to the first floor all car calls which may be registered therefor and all registered down floor calls which another car in the system, for example the car B, is not specifically assigned to answer, as will be apparent from the preceding discussion. As the car A approaches the first floor, the brush $cc$ (FIG. 3) engages the contact segment $c1$ to energize the floor call stopping relay S through make contacts 79-3. Thus, the car A is brought to a stop at the first floor. In addition, the brush $ee$ engages the contact segment $e1$ to energize the cancelling coil 1DRN through make contacts 79-4 as the car comes to a stop, thus resetting the down floor call registering relay 1DR.

It will be noted that although make contacts Z0-7 (FIG. 8) of the zone position relay Z0 closed as the car A approached the first floor, the open break contacts 79-11 in series therewith prevents energization of the next car relay N even though no other car may be located at the first floor upon arrival of the car A.

The stopping of the car A at the first floor results in the opening of its doors by a sequence of operations which will be understood from the preceding discussion. In addition, the limit switch 24 (FIG. 1) opens without affecting operation, inasmuch as the down preference relay X remains energized through make contacts 79-2 and the limit switch 31, and the car A thus remains conditioned for down travel. It will be recalled that the stopping of the car A also is accompanied by opening of make contacts M4 of its running relay to initiate deenergization of the non-interference relay 70T. The relay 70T, however, remains picked up until expiration of its time delay in dropout, and consequently make contacts 70T6 (FIG. 4) remain closed to maintain energization of the basement service relay 79. (It will be noted that break contacts Z0-21 and make contacts $b$UR2 and FA15 in parallel with the contacts 70T6 are open at this time.) As a result, the relay 79 remains picked up for a time sufficient to permit the registration of a car A car call for the basement floor. Should no such car call be registered before the contacts 79T6 open upon expiration of the non-interference time, however, interruption of the holding circuit of the relay 79 would result in dropout thereof, and make contacts 79-2 (FIG. 1) would open to deenergize and drop out the down preferance relay X. Such dropout, in turn, would be accompanied by closure of break contacts X2 to energize the up preference relay W through break contacts D6 and 69H2, thus conditioning the car A for up travel, the car A no longer being conditioned to serve the basement floor.

It will be assumed, however, that before the non-interference time expires, a passenger enters the car A and presses the push button $bc$ (FIG. 3) to register a car call for the basement floor. Energization of the car call registering relay $b$CR is accompanied by closure of its make contacts $b$CR1 to establish a holding circuit around the push button $bc$ and break contacts 79N3. Closure of make contacts $b$CR2 (FIG. 4) maintains energization of the basement service relay 79 through make contacts X16 of the car A down preference relay. Thus, the subsequent dropout of the non-interference relay to open make contacts 70T6 in the holding circuit of the relay 79 has no effect on operation. After the doors of the car A close, downward travel of the car is initiated in a manner which will be clear from the preceding discussion. As the car approaches the basement floor, the brush $ff$ (FIG. 3) engages the contact segment $fb$, which is connected permanently to the bus L1. The resulting energization of the car call stopping relay T effects a stopping operation of the car A at the basement floor. In addition, the brush $hh$ engages the contact segment $hb$ to cancel the car A basement car call as the car stops at the basement floor. Finally, arrival of the car A at the basement floor is accompanied by opening of the limit switch 31 (FIG. 1) to deenergize and drop out the down preference relay X. (It will be recalled that the limit switch 24 remains open as long as the car A is located at or below the first floor.) In dropping out, the relay X closes its break contacts X2 to energize and pickup the up preference relay W, thus conditioning the car A for up travel.

Assume now that the elevator car C again is traveling down in the second zone and is unassigned and that the car A is located at the first floor with its doors closed and is available for assignment, as indicated by pickup of the available car relay FR (FIG. 2). Such pickup is accompanied by closure of make contacts FR21 to prepare the auxiliary available car relay FRS for energization therethrough. It will be understood from the preceding example that the auxiliary available car relay CFR for the car C also is energized and picked up. At this time, a prospective passenger at the first floor registers a down floor call therefor by pressing the push button 1D (FIG. 3) to energize the down floor registering relay 1DR. Closure of make contacts 1DR4 (FIG. 14) results in pickup of the basement demand relay 79D through break contacts 79M2, through break contacts 79N4 and make contacts FR25 and through make contacts CX17 and break contacts C79N5, CSH14 and CFU18. In picking up, the relay 79D closes its make contacts 79D2 (FIG. 2) to complete through make contacts FR21 and break contacts 79N2 an energizing circuit for the auxiliary available car relay FRS. The relay 79D also closes its make contacts 79D9 (FIG. 12) to energize the closest car relay 69P.

It will be understood by inspection of FIG. 13 and from the preceding discussion that the foregoing operations result in the selection of the car A to serve the basement floor, as indicated by pickup of its associated basement service relay 79 (FIG. 4) through make contacts 79D5 and FCR6. Closure of make contacts 79-6 partially completes a holding circuit for the relay 79.

Turning to FIG. 5, pickup of the relay 79 also is accompanied by closure of its make contacts 79-8 to energize the down call assigned relay FA through make contacts FR5 and break contacts ZB5, 38R3 and FU17. In picking up, the relay FA closes it make contacts FA4 to energize the high call reversal relay 69H through make contacts DCA1 and break contacts ZB3 and X6. (Referring to FIG. 6, it will be observed that the down call above relay DCA must be energized at this time to close its contacts DCA1 even though a down floor call may be registered for a floor above the first floor, since make contacts 79-9 are closed and the brush nn is in engagement with the contact segment n1.)

Pickup of the high call reversal relay 69H is accompanied by opening of its break contacts 69H2 (FIG. 1) to drop out the up preference relay W. As a result, break contacts W2 close to energize the down preference relay X through break contacts U6 and 69L2, make contacts 79-2 and the limit switch 31. The elevator car A now is conditioned for down travel from the first floor.

It will be observed by inspection of FIG. 3 and from the preceding discussion that the following energizing circuit now is completed for the floor call stopping relay S:

L1, 1DR1, 79-3, c1, cc, F1C1, SH1, X3, 79P1, LW1, S, L2

Pickup of the relay S is accompanied by closure of its make contacts S2 (FIG. 5) to energize the auxiliary door-control relay 42 through make contacts FR6. (Since the available car relay FR is provided with a slight time delay in dropout, the contacts FR6 are closed at this time.) From the preceding discussion, it will be understood that pickup of the relay 42 results in the opening of the doors of the elevator car A to permit the entry of the passenger who registered down floor call for the first floor. Pickup of the relay 42 also is accompanied by closure of its make contacts 42-1 (FIG. 1) to energize the non-interference relay 70T, and this relay closes its make contacts 70T6 (FIG. 4) to complete a holding circuit for the basement service relay 79.

Referring to FIG. 3, closure of make contacts X4 upon the aforesaid pickup of the down preference relay X results in cancellation of the down floor call for the first floor, inasmuch as make contacts 79-4 are closed and the brush ee is in engagement with the contact segment e1.

Assuming that a passenger enters the car A and presses the pushbutton bc to register a car call for the basement floor before the non-interference time expires to initiate closure of the doors of the car A, make contacts bCR2 (FIG. 4) close to insure continued pickup of the basement service relay 79 through make contacts X16, although make contacts 70T6 in the holding circuit of the relay 79 open upon expiration of the non-interference time. (Although make contacts FA15 closed upon the aforesaid pickup of the down call assigned relay FA, FIG. 5, the relay FA dropped out shortly after it picked up upon opening of make contacts FR5 at the expiration of the slight time delay in dropout of the available car relay FR, inasmuch as break contacts X7 in the holding circuit of the relay FA opened when the car A become conditioned for down travel.)

It will be noted that when the basement service relay 79 picked up, it closed its make contacts 79-15 (FIG. 5) to shunt the open break contacts 981-2 in the energizing circuit of the second auxiliary running relay 80. (It will be noted that the lower terminal no-start relay 981, FIG. 8, is picked up through make contacts Z0-8 and break contacts SS5.) Thus, since break contacts FR4 and FA5 now are assumed to be closed, closure of break contacts 70T1 upon expiration of the non-interference time results in pickup of the relay 80. Consequently, upon closure of its doors, the car A travels downwardly from the first floor to answer its car call for the basement floor, as will be understood from the preceding discussion.

Next assume once again that the cars A and C are unassigned and traveling down and that the car A is located in the first zone while the car C is located in the second zone. Under these conditions, it will be assumed that a prospective passenger at the basement floor registers an up floor call therefor by pressing the push button bU (FIG. 2) to energize the basement up floor call registering relay bUR. Pickup of this relay is accompanied by closure of its make contacts bUR8 (FIG. 14) to effect energization of the basement demand relay 79D. As a result, the elevator car A, which is the closest suitable car to the basement floor, is selected to serve such floor by a sequence of operations which will be clear from the preceding discussion. Such selection results in energization of the basement service relay 79 (FIG. 4) which picks up to indicate that the car A is conditioned to serve the basement floor. Closure of make contacts 79-6 completes a holding circuit for the relay 79 through make contacts bUR2 of the basement up floor call registering relay, which is assumed to be picked up. Assuming also that no car A car call and that no down floor call is registered in the system, the car A will proceed directly to the basement floor. It will be observed that the car A will not stop at the first floor, as is otherwise the case when it is not assigned to serve the basement floor, inasmuch as break contacts 79-5 (FIG. 3) in series with the contact segment f1 are open at this time to prevent energization of the car call stopping relay T as the car A approaches the first floor.

Let it now be assumed that the car A is traveling down and that the push button bc has been actuated to register a car call for the basement floor for the car A. In picking up, the car call registering relay bCR closes its make contacts bCR2 (FIG. 4) to energize the basement service relay 79 through make contacts X16, again indicating that the car A is conditioned to serve the basement floor. It will be appreciated that this energizing circuit is maintained until the car A arrives at the basement floor and the contacts bCR2 open to indicate that the car call has been cancelled.

Referring to FIG. 14, pickup of the relay 79 is accompanied by closure of its make contacts 79–12 to energize the master basement service relay 79M, which opens its break contacts 79M2 to prevent subsequent energization of the basement demand relay 79D. Thus, although make contacts 1DR4 or bUR8 may close to indicate the registration of a demand for basement service, the relay 79D cannot pick up to effect the selection of another elevator car, for example, the car C, to serve the basement floor. In other words, once any elevator car is conditioned to serve the basement floor, whether in response to the registration of a basement car call for such car or of a down floor call for the first floor or of an up floor call for the basement floor, no other car may be so conditioned in response to a demand for basement service. (It will be observed by inspection of the down floor call registering circuits of FIG. 3 that the former car, unless it is located below the first floor when a down floor call is registered therefor, will answer such down floor call. If it is located below the first floor when such call is registered, it or another car will be selected to respond to such call after the former car arrives at the basement floor.)

Assume next that the car A has arrived at the basement floor in response to the aforementioned basement car call therefor, that it is conditioned for up travel, and that it has discharged all of its passengers. It will be observed by inspection of FIG. 2 that as the doors of the car A reclose and they approach their fully closed position, the available car relay FR picks up to indicate that the car A is available for assignment, and that the auxiliary available car relay FRS also picks up. It will be noted that such pickup is effected through make contacts ZB9 even though make contacts 78U3 may be open as a result of dropout of the up call above relay 78U (FIG. 4) to indicate that an up floor call has been registered for a floor above the first floor, since the brush jj is in engagement with the contact segment jb to pick up the zone position relay ZB.

It will be assumed also at this time that the car C is traveling down in the third zone and that the push button bU (FIG. 2) is pressed by a prospective passenger at the basement floor to register an up floor call therefor.

It will be apparent from the preceding discussion that the car A, since it is located at the basement floor, will be selected to answer the up floor call therefor. Since the doors of the car A are assumed to be closed, it is necessary that they be opened in order that the prospective passenger who registered the basement up floor call may enter the car. Thus, the selection of the car A is accompanied by energization of its associated basement service relay 79 (FIG. 4) through make contacts 79D5 and FSR6. Upon pickup, the relay 79 closes its make contacts 79–6 to complete a self-holding circuit through make contacts bUR2. In addition, make contacts 79–10 (FIG. 7) close to pick up the up call assigned relay FU through make contacts FR11, FCR3, bUR6 and ZB7. (It will be noted that if the car A is the only car which is available for assignment, break contacts MFC5 in parallel with the contacts FCR3 also are closed at this time.) Inasmuch as the car A is located at the basement floor, the brush rr is in engagement with the contact segment rb to pick up the up call below relay 78D. Consequently, pickup of the up call assigned relay FU to close its make contacts FU1 (FIG. 2) completes the following energizing circuit:

L1, bUR1, ab, aa, FU1, 78D1, FA1, W3, L4, L4a (FIG. 3), 79P1, LW1, S, L2

In picking up, the floor call stopping relay S closes its make contacts S2 (FIG. 5) to energize the auxiliary door-control relay 42. As will be understood from the preceding discussion, pickup of the relay 42 results in the opening of the doors of the car A. In addition, make contacts 42–1 (FIG. 1) close to energize the non-interference relay 70T, which closes its make contacts 70T6 (FIG. 4) in the holding circuit of the basement service relay 79.

Referring again to FIG. 2, it will be observed that when the relay 79 picked up, it closed its make contacts 79–14 to complete an energizing circuit for the canceling coil bURN. Such energization results in the cancellation of the up floor call for the basement floor. (If the inherent lag in dropout of the basement service relay 79, FIG. 4, is insufficient to prevent its dropout when make contacts bUR2 open upon cancellation of the up floor call for the basement floor before make contacts 70T6 close when the non-interference relay picks up as aforesaid, the relay 79 may be provided with a slight additional time delay in dropout by any conventional means.)

Assuming that a passenger enters the car A and registers a car call for a floor above the basement floor, upon expiration of the car A non-interference time, its doors reclose, and the car travels upwardly from the basement floor to answer such car call. It will be noted by inspection of the up floor call registering circuits of FIG. 2 and the car call registering circuits of FIG. 3 that during such upward travel the car A stops at the first floor only if an up floor call is registered therefor (make contacts 1UR1 are closed) or if a car A car call is registered therefor (make contacts 1CR2 are closed) or, if in the absence of both of such call registrations, only if no next car is located at the first floor (break contacts MN2 of the master next car relay MN, FIG. 12, are closed). If the car A should stop at the first floor because no next car is located at such floor, it will be understood that the next car selecting mechanism of FIG. 8 will effect selection of the car A as the next car to leave the first floor by closing the switch Y to pick up the next car relay N. Subsequent to such selection, the control system and the car A will operate in a manner which will be apparent from the preceding discussion.

Assume next that the elevator car A is located at the basement floor, is conditioned for up travel and is available for assignment (the available car relay FR and the auxiliary available cr rely FRS, FIG. 2, re energized). At this time prospective passenger at the first floor registers a down floor call therefor by pressing the push button 1D (FIG. 3). The resulting energization of the down floor car registering relay 1DR is accompanied by closure of make contacts 1DR4 (FIG. 14) to pick up the basement demand relay 79D, which closes its make contacts 79D9 (FIG. 12) to energize the closest car relay 69P. Consequently, the selection circuits of FIG. 13 effect the selection of the car A to answer the down floor call for the first floor by a sequence of operations which will be understood from the preceding discussion. Such selection results in pickup of the car A basement service relay 79 (FIG. 4) through make contacts 79D5 and FCR6.

In picking up, the relay 79 closes its make contacts 79–8 (FIG. 5) to energize the down call assigned relay FA through make contacts FR5 and ZB6 and break contacts bUR4, and FU17. Pickup of the relay FA is accompanied by closure of its make contacts FA6 to establish a self-holding circuit through break contacts X7 of the down preference relay X. In addition, make contacts FA15 (FIG. 4) close to complete a holding circuit for the relay 79 through its make contacts 79–6. Returning to FIG. 5, the relay FA also closes its make contacts FA4 to prepare the high call reversal relay 69H for subsequent energization. (It will be noted that break contacts ZB3 are open, inasmuch as the car A is located at the basement floor, and that make contacts DCA1 also are open, since the down call above relay DCA, FIG. 6, is dropped out because of the fact that break contacts 1DR2 are open as a result of the registration of the down floor call for the first floor.) Additionally, the relay FA closes its make contacts FA7 (FIG. 5) to pick up the first auxiliary running relay RA through break contacts 42–2, and the relay RA closes its make contacts RA1 to energize the second auxiliary running relay 80 through break contacts 70T1. Closure of make contacts 80–1 (FIG. 1) effects energization of the up switch U and the running relay M, as a result of which upward travel of the car A from the basement floor is initiated. This is accompanied by the notching of the floor selector carriage 15C for the car A from its basement to its first-floor position.

As a result of the notching of the floor selector carriage, the brush jj (FIG. 4) disengages the contact segment jb to drop out the zone position relay ZB and engages the contact segment j1 to pick up the zone position relay Z0. Furthermore, the brush nn (FIG. 6) disengages the contact segment nb and engages the contact segment n1 to energize the down call above relay DCA through make contacts 79–9 of the car A basement service relay. It will be noted once again that the relay DCA has picked up regardless of the fact that a down floor call may be registered for a floor above the first floor.

Turning now to FIG. 5, the foregoing operations result in closure of make contacts DCA1 and break contacts ZB3 to pick up the high call reversal relay 69H, which closes its make contacts 69H1 (FIG. 1) to effect a stopping operation of the car A at the first floor, as will be clear from the preceding discussion. In addition, break contacts 69H2 open to drop out the up preference relay W, which closes its break contacts W2 to energize the down preference relay X, as the car A stops at the first floor, through break contacts U6, and 69L2, make contacts 79–2 and the limit switch 31. Thus, the car A is stopped at the first floor and is conditioned for down travel.

Pickup of the down preference relay X is accompanied by opening of its break contacts X7 (FIG. 5) to interrupt the holding circuit for the down call assigned relay FA, and the relay FA drops out to open its make contacts FA15 (FIG. 4) in the holding circuit of the basement service relay 79. However, the relay 79 is maintained picked up through make contacts 70T6, which remain closed until the non-interference time for the car A expires.

It will be understood that the stopping of the car A at the first floor is accompanied by opening of its doors. If a passenger enters the car and registers a car call for the basement floor by pressing the pushbutton bc (FIG. 3) to energize the car call registering relay bCR, make contacts bCR2 (FIG. 4) close to maintain energization of the basement service relay 79 through make contacts X16, although make contacts 70T6 in the holding circuit of the relay 79 open upon expiration of the non-interference time. Subsequently, the car A travels to the basement floor in response to the registration of the car call therefor. If, on the other hand, a car call for the basement floor is not registered before make contacts 70T6 open, the basement service relay 79 drops out to open its make contacts 79–2 (FIG. 1), thus dropping out the down preference relay X, which closes its break contacts X2 to energize the up preference relay W through break contacts D6 and 69H2. (It will be noted that the high call reversal relay 69H FIG. 5, dropped out when break contacts X6 opened to indicate that the car A was conditioned for down travel at the first floor.) Thus, under the last-named circumstances, the car A would be conditioned for up travel at the first floor.

It now will be assumed that there is a demand for basement service as a result of the registration of an up floor call for the basement floor by pickup or the up floor call registering relay bUR (FIG. 2) or of the registration of a down floor call for the first floor by pickup of the down floor call registering relay 1DR (FIG. 3). It also will be assumed that the elevator car A, which is conditioned for down travel (the down preference relay X, FIG. 1, is picked up) at the sixth floor in the third down zone (the zone position relay Z3, FIG. 4, is picked up), has been selected to respond to such demand for basement service, as indicated by energization of its basement service relay 79 (FIG. 4). Referring to FIG. 14, it will be observed that make contacts bUR9 or make contacts 1DR5, as the case may be, closed when the aforesaid demand for basement service was registered to initiate a timing operation of the circuits associated with the basement timing relay KTB. It will be recalled from the discussion of FIG. 14 that the relay KTB, if the elevator system is not conditioned to provide special service for the basement floor (make contacts SB8 are open), is energized when a demand for basement service has been registered continuously for at least one minute. Assuming that such is now the case, pickup of the relay KTB is accompanied by closure of its make contacts KTB3 to establish a self-holding circuit through break contacts 79FL2 and make contacts bUR9 or 1DR5.

Pickup of the relay KTB also results in closure of its make contacts KTB1 (FIG. 4) to energize the basement by-pass relay 79P for the car A through make contacts 79–7 and break contacts M79P1 and Z0–22. In picking up, the relay 79P closes its make contacts 79P2 to establish a holding circuit around the contacts M79P1. Pickup of the relay 79P indicates that the elevator car A, which has been selected and conditioned to serve the basement floor, is to by-pass each floor above the first floor for which a down floor call may be registered, i.e., that the elevator car A is to be expressed to the basement floor. Referring to FIG. 3, it will be observed that the foregoing objective is accomplished by opening of break contacts 79P1 in the circuit of the floor call stopping relay S. It will be apparent that the open contacts 79P1 prevent energization of the relay S, thus preventing a stopping operation of the car A at each floor for which a down floor call may be registered as it travels toward the first floor. If it is desired that the car A during such travel stop at each floor for which a priority down floor call is registered, the switch SW2 may be closed to render effective for such purpose make contacts TDC5 of the priority zone stopping relay for the car A in parallel with the contacts 79P1. The operation of the relay TDC (FIG. 12) to this end has been discussed in detail heretofore.

Returning to pickup of the basement by-pass relay 79P (FIG. 4), such pickup also is accompanied by closure of make contacts 79P3 (FIG. 14) to energize the master basement by-pass relay M79P. Pickup of the relay M79P results in opening of its break contacts M79P1 (FIG. 4), but energization of the relay 79P is maintained through its holding contacts 79P2. It will be understood, however, that contacts corresponding to the contacts M79P1 prevent subsequent pickup of the basement by-pass relay for the elevator car C, which also is assumed to be a basement car. Thus, should the car C now become conditioned to serve the basement floor as a result of the registration of a basement car call therefor, its basement by-pass relay cannot pick up to prevent the car C from answering any down floor call which may be registered for a floor between the location of the car and the first floor, whether or not such down floor call is a priority call.

As the elevator car A approaches the first floor, its associated brush jj engages the contact segment j1 to energize the zone position relay Z0, which picks up to open its break contacts Z0–22, thus dropping out the basement by-pass relay 79P for the car A. Consequently, break contacts 79P1 (FIG. 3) close to render the floor call stopping relay S effective for stopping the car A at the first floor if a down floor call is registered therefor. If not, the car A continues downwardly past the first floor and subsequently stops at a basement floor, unless a car call is registered for the first floor for the car A, as will be clear from the preceding discussion.

Turning now to FIG. 14, it will be noted that the aforesaid pickup of the zone position relay Z0 is also accompanied by closure of making contacts Z0–24 to energize the basement time resetting relay 79FL through make contacts 79–13 of the basement service relay for the car A. Pickup of the relay 79FL results in closure of its make contacts 79FL1 to discharge the capacitor C14 through the resistor R61 and in opening of its break contacts 79FL2 to interrupt the charging circuit of the capacitor and to drop out the basement timing relay KTB. Thus, the timing circuits for the relay KTB are reset, that is, the indication that the basement service demand for which the car A was selected to respond was a priority demand is cancelled as the car A approaches the first floor.

Although additional examples of operation of the elevator system to provide service for the basement floor might be set forth, the preceding illustrations are deemed sufficient for a full understanding thereof. In general, for providing optimum system efficiency, the closest unassigned basement car to the basement floor, either available or down-traveling, is selected to respond to a demand for basement service; and if such demand is a priority demand, the selected car is expressed to the basement floor.

EMERGENCY SERVICE

It will be recalled that the elevator control system includes means for providing emergency service in the event of the occurrence of certain system malfunctions.

Let it be assumed initially that up floor calls are registered for the second and fifth floors, as indicated by energization of the respective up floor call registering relays 2UR and 5UR (FIG. 2), and that as a result the up zone demand relay DU (FIG. 11) has picked up by a sequence of operations which will be understood from the preceding discussion. Assume also that the elevator car A has been selected as the next car to leave the first floor (the next car relay N, FIG. 8, is picked up) and that it is available for assignment is dispatched in response to the afore-available car relay FR (FIG. 2), as a result of which make contacts FR20 (FIG. 12) are closed to energize the master available car relay FRM.

Turning now to FIG. 14 and bearing in mind the foregoing discussion, it will be noted that make contacts FRM8 and DU8 are closed and break contacts FRM7 and DU9 are open to effect a timing operation of the circuits associated with the up emergency timing relay EUT. It will be recalled that the relay EUT is assumed to have a time delay in pickup of 20 seconds. Assuming that because of a malfunction in the control system, neither the car A nor any other car which may be available for assignment is dispatched in response to the aforesaid up zone demands for service, i.e., to answer the up floor calls which are registered for the second and fifth floors, and that as a result both of the contacts FRM8 and DU8 remain closed, at the expiration of such time delay the capacitor C17 charges sufficiently to fire the tube TU19. Consequently, the relay EUT picks up and closes its make contact EUT1 to establish a self-holding circuit. Make contacts EUT2 close to energize the up emergency relay EUC, which picks up to condition the elevator system to provide emergency up service.

In picking up, the relay EUC closes its make contacts EUC3 to complete a self-holding circuit through make contacts URM3. (It will be noted that the master up call relay URM picked up when make contacts 2UR6 and 5UR5 closed upon registration of the up floor calls for the second and fifth floors.) It will be assumed that the switch SW8 in parallel with the contacts URM3 is open at this time. The relay EUC also closes its make contacts EUC4 to energize the emergency signal lamp 303. Opening of break contacts EUC7 (FIG. 11) results in dropout of the up zone demand relay DU, which opens its make contacts DU8 (FIG. 14) to drop out the up emergency timing relay EUT and closes its break contacts DU9 to discharge the capacitor C17 through the resistor R67. In dropping out the relay EUT opens its make contacts EUT2, but the relay EUC is maintained picked up through its aforesaid holding circuit. Closure of make contacts EUC1 (FIG. 7) effects pickup of the start relay SS for the car A, which is assumed to have been selected as the next car to leave the first floor, through make contacts N4, URM1 and Z0–5. As a result, upward travel of the car A from the first floor is initiated by a sequence of operations which will be clear from the preceding discussion, and the car A will stop at the second floor in response to the up floor call which is assumed to be registered therefor and subsequently at the fifth floor in response to the up floor call therefor. In addition, of course, the car A will answer all car calls which are registered therefor as a result of its stops at the second and fifth floors.

Referring to FIG. 4, it will be observed that break contacts EUC5 of the up emergency relay open to prevent pickup of the limited up travel relay LU for the elevator car A as long as the elevator system is conditioned to provide emergency up service, while break contacts EUC6 and corresponding contacts for the car C similarly prevent energization of the respective relays BLU and CLU (not shown). The effect of this will be apparent from the description of operation in the section entitled Up Floor Calls.

Assuming that after the elevator car A leaves the first floor, the car B is selected as the next car to leave such floor (the next car relay BN, FIG. 8, is energized), it will be observed by inspection of FIG. 7 that closure of make contacts BN4 upon such selection results in pickup of the start relay BSS for the car B to initiate upward travel thereof from the first floor through cake contacts EUC2, URM2 and BZ0–5. Thus, it will be clear that as long as the elevator system remains conditioned to provide emergency up service, successive next elevator cars are dispatched from the first floor to answer up floor calls.

Referring again to FIG. 14, it will be noted that when the last registered up floor call is answered, the master up call relay URM drops out to open its make contacts URM3, thus interrupting the holding circuit of the up emergency relay EUC. As a result, the relay EUC drops out and the elevator system no longer is conditioned to provide up emergency service. If it is desired that the elevator system, once conditioned to provide emergency up service, remains so conditioned regardless of whether the contacts URM3 subsequently open, the manually-operable switch SW8 may be closed to maintain emergency up service continuously until maintenance personnel have had an opportunity to inspect the control system and to make any repairs which may be necessary, for example. In such instance, it should be emphasized that successive next elevator cars are dispatched from the first floor in the manner just described only if the master up call relay URM is picked up to indicate that at least one up floor call is registered, as will be apparent by inspection of the respective circuits of the start relays SS and BSS in FIG. 7.

Assume now that down floor calls are registered for the third, fourth and fifth floors as indicated by energization of the down floor call registering relays 3DR, 4DR and 5DR (FIG. 3) and that as a result the down zone demand relay ZD (FIG. 10) has picked up by a sequence of operations will be understood from the preceding discussion to indicate the existence of a down zone demand for service. Assume also that the elevator car B is available for assignment, as signified by pickup of the available car relay BFR (FIG. 2) and that consequently make contacts BFR20 (FIG. 12) are closed to energize the master available car relay FRM.

Referring to FIG. 14, it will be observed that make contacts FRM6 and ZD9 are closed and break contacts FRM5 and ZD8 are open to effect a timing operation of the circuits associated with the down emergency timing relay EDT, which, it will be recalled, has a time delay in pickup of 20 seconds. Assuming that because of a malfunction in the control system neither the car B nor any other car which may be available for assignment is dispatched in response to the down zone demands for service, i.e., to answer the down floor calls which are registered for the third, fourth and fifth floors, and that as a result both of the contacts FRM6 and ZD9 remain closed. At the expiration of its time delay, the relay EDT picks up and closes its make contacts EDT1 to establish a self-holding circuit. In addition, make contacts EDT2 close to energize the down emergency relay EDC, which closes its make contacts EDC7 to complete a self-holding circuit through make contacts DRM1. (It will be noted that the master down call relay DRM picked up as a result of closure of make contacts 3DR5, 4DR5 and 5DR5 in response to the aforesaid registration of down floor calls for the third, fourth and fifth floors, respectively.) Make contacts EDC9 close to energize the emergency service indicating lamp 303. Break contacts EDC12 (FIG. 10) open to drop out the down zone demand relay ZD, which opens its make contacts ZD9 (FIG. 14) to deenergize the down emergency timing relay EDT. Opening of make contacts EDT2, however, has no immediate effect on operation, inasmuch as the down emergency relay EDC is maintained energized through its holding circuit.

The relay EDC also closes its make contacts EDC6 to energize the coil of the down emergency stepping switch ESC through its self-stepping contacts ESC1, make contacts FRM4 and break contacts EX2. This results in the rapid scanning for an available car by the brushes of the level ESCb. When these brushes arrive at their second position, the coil of the stepping switch is energized continuously through make contacts BFR26, which are closed, inasmuch as the available car relay for the car B is assumed to be picked up as aforesaid. As a result, the scanning operation of the brushes is terminated.

Turning now to FIG. 5, it will be noted that the level ESCa simultaneously effects pickup of the down call assigned relay BFA for the elevator car B through make contacts EDC3 and BFR24 and break contacts B38R3 and BFU17. (It is assumed that no car call is registered for a floor above the floor at which the car B is located and that the car B is not assigned to answer up floor calls, as a result of which break contacts B38R3 and BFU17 both are closed.) Pickup of the relay BFA indicates that the car B is assigned to answer down floor calls, and, as will be understood from the preceding discussion, the car B travels to the highest floor for which a down floor call is registered, which is assumed to be the fifth floor. Such pickup is accompanied by closure of make contacts BFA6 to complete a holding circuit for the relay BFA through break contacts BX7 of the car B down preference relay (assuming that the car B must travel in the up direction in order to reach the fifth floor). Consequently, the relay BFA is maintained energized through its holding circuit until the contacts BX7 open to indicate that the car B has become conditioned for down travel upon its arrival at the fifth floor.

Returning to FIG. 14, the relay BFA also closes its make contacts BFA16 to maintain energization of the coil of the down emergency stepping switch ESC through make contacts EDC6 and break contacts EX2. Thus, the stepping switch is prevented from selecting another available car until the car B stops at the fifth floor in response to the down floor call which is registered therefor and becomes conditioned for down travel to drop out the relay BFA, as aforesaid. Assuming that such is the case and that the elevator car A now is available for assignment (make contacts FRM4 and FR26 are closed), the brushes of the b level of the stepping switch ESC rotate until they arrive at their first position and the coil of the stepping switch is energized continuously through the contacts FR26. It will be understood from the foregoing discussion that this results in the dispatching of the elevator car A to answer the down floor call which is assumed to be registered for the fourth floor. Thus, it will be clear that when the elevator system is conditioned to provide emergency down service, the stepping switch ESC effects the selection and dispatching of successive available elevator cars to answer the highest down floor call remaining after the preceding available car has been so selected and dispatched and has answered the then existing highest down floor call.

It will be noted that when the down emergency relay EDC picks up to condition the elevator system for providing emergency down service, it opens its break contacts EDC10 and EDC11 (FIG. 2) in the energizing circuits of the respective down available car relays DFR and BDFR for the elevator cars A and B and similar contacts in the energizing circuit of the down available car relay for the car C (not shown). As a result, energization of the respective down available car relays is prevented when the elevator system is conditioned to provide emergency down service. Thus, during such operation, the down available car relays cannot operate to render their respective associated elevator cars available for assignment at a floor above the first floor in the manner described heretofore, and, as a result, each car which is assigned to answer a down floor call must return to the first floor after answering such call and its last car call, even though the latter call may be for a floor above the first floor. (It will be apparent that such car also will answer on its way down any down floor call which has not been answered by another car by the time the first-named car reaches the corresponding floor.) If the last car call is for the basement floor, the car conveniently may be made to return to the first floor in response to the registration of an automatic car call therefor when the car is located at the basement floor. This may be accomplished by inserting serially-connected make contacts of the basement zone position relay for such car and make contacts of the down emergency relay EDC across the first-floor car call push button for the car. For example, make contacts of the car A basement zone position relay ZB (FIG. 4) may be connected in series with make contacts of the relay EDC, and this series combination may be connected directly across the car A first-floor car call push button 1c (FIG. 3).

It may be deemed desirable for at least one of the elevator cars, when providing emergency down service, to serve only a lower portion of the floors above the first floor so that undue preference will not be given to the higher floors. The car A, for example, may be prevented from answering down floor calls for floors above the third floor during emergency down service. For this purpose, the switch SW3 (FIG. 3) associated with the car A floor call stopping relay S may be opened, and the switch SW5 (FIG. 6) associated with the down call above relay DCA for the car A may be closed. As a result, the open break contacts EDC1 of the down emergency relay in parallel with the switch SW3 and the closed make contacts EDC4 in series with the switch SW5 will effect the desired result, i.e., the contacts EDC1 will prevent the stopping of the car A during down travel in response to a down floor call which may be registered for the fourth or fifth floor, as will be clear by inspection of FIG. 3, and the contacts EDC4 will insure that the third floor is the highest floor at which the car A may stop in response to a registered down floor call.

As an illustration, it will be recalled that when emergency down service was initiated, down floor calls were assumed to be registered for the third, fourth and fifth floors and that the down emergency stepping switch ESC effected pickup of the down call assigned relay FA (FIG. 5), as a result of which the car A traveled to the fourth floor to answer the down floor call therefor. Assume once again that the relay FA has picked up under similar circumstances, that down floor calls are registered for the third and fourth floors, and that the car A is approaching the third floor in the up direction and finally that the switch SW5 (FIG. 6) now is closed to shunt, through make contacts EDC4, break contacts 6DR2, 5DR2 and 4DR2 of the down floor call registering relays for the sixth, fifth and fourth floors, respectively, the contacts 4DR2 being open. As the carriage of the car A floor selector notches to its third-floor position, the brush nn engages the contact segment n3 to complete the following energizing circuit:

L1, EDC4, SW5, n3, nn, DCA, L2

Pickup of the down call above relay DCA is accompanied by closure of its make contacts DCA1 (FIG. 5) to energize the high call reversal relay 69H through make contacts FA4 and break contacts ZB3 and X6. In picking up, the relay 69H closes its make contacts 69H1 (FIG. 1) to energize the holding relay G, the inductor slowdown relay E and the inductor stopping relay F, as a result of which the car A is brought to a stop at the third floor. In addition, break contacts 69H2 open to drop out the up preference relay W as the car comes to a stop, and the resulting closure of break contacts W2 effects energization of the down preference relay X. Thus, the car A is stopped at the third floor and is conditioned for down travel, although a down floor call is registed for the fourth floor. Such call, of course, may be answered by one of the remaining cars in the elevator system which is not conditioned to provide emergency down service for only the floors below the fourth floor in the manner just described for the car A.

Referring to FIG. 14, it will be observed that a timing operation of the down emergency reset timing relay EXT was initiated simultaneously with the initiation of operation of the down emergency stepping switch ESC. Reference may be made to the previous discussion in detail of FIG. 14 for the purpose and operation of the relay EXT and of the down emergency reset relay EX associated therewith. Suffice it to say for present purposes that in the event that a malfunction causes a failure in operation in the manner heretofore described of the down call assigned relay of an elevator car selected by the stepping switch ESC, the relays EXT and EX pick up after a time delay of 15 seconds, as a result of which the brushes of the stepping switch may step to effect the selection of another available elevator car to provide emergency down service.

It will be noted that the down emergency relay EDC remains picked up and thus emergency down service operation of the elevator system is maintained until all down floor calls have been answered and the master down call relay DRM consequently drops out to open its make contacts DRM1 in the holding circuit of the relay EDC. It will be apparent that the switch SW7 in parallel with the contacts DRM1 serves a purpose similar to that heretofore discussed for the switch SW8 associated with the up emergency relay EUC.

It will be observed that when the relay EDC is picked up for conditioning the elevator system to provide emergency down service, its make contacts EDC8 are closed to energize the relay EUC, which thus conditions the system to furnish emergency up service in the manner heretofore described. It will be recalled that once the relay EDC picks up, its break contacts EDC12 (FIG. 10) open to drop out the down zone demand relay ZD and to prevent subsequent energization thereof. The relay ZD, in turn, closes its break contacts ZD4 (FIG. 11) to permit energization of the low up zone demand relay DUL or the high up zone demand relay DUH therethrough. If, upon pickup of the relay EDC, the relay EUC were not made to pick up to open its break contacts EUC7, make contacts DUL1 or DUH4 could effect pickup of the up zone demand relay DU, as a result of which the control system would attempt to select an available elevator car to answer up floor calls in the normal manner. Simultaneously, however, the down emergency stepping switch ESC (FIG. 14) would attempt to select an available car, conceivably the same car, to answer a down floor call. Thus, in order to prevent the control system components from working at cross purposes, it is deemed desirable to condition the elevator system for emergency up service whenever a malfunction results in its conditioning for emergency down service, regardless of whether or not there is a malfunction which would result in its conditioning for emergency up service alone. Consequently, only successive next cars may be dispatched from the first floor to answer up floor calls, while each of the remaining cars, upon becoming available for assignment may be selected to answer down floor calls.

It will be noted that the converse of the above is not true, i.e., that the relay EDC does not pick up in response to energization of the relay EUC. Since the only effect of the conditioning of the elevator system to provide emergency up service is that successive next cars are dispatched from the first floor to answer up floor calls, the control system components during such operation may function without mutual interference, and available cars may be selected to respond to down zone demands for service in the normal manner if possible. Thus, it is not deemed necessary or desirable for the elevated system automatically to provide emergency down service in response to a malfunction which conditions it for emergency up service operation.

REFERENCE PATENT

| Column: | Line | Change |
|---|---|---|
| 132 | 27 | energizing circuit includes ZB-3 |
| 135 | 50 | Do. |

MODIFICATIONS

Figure 17:
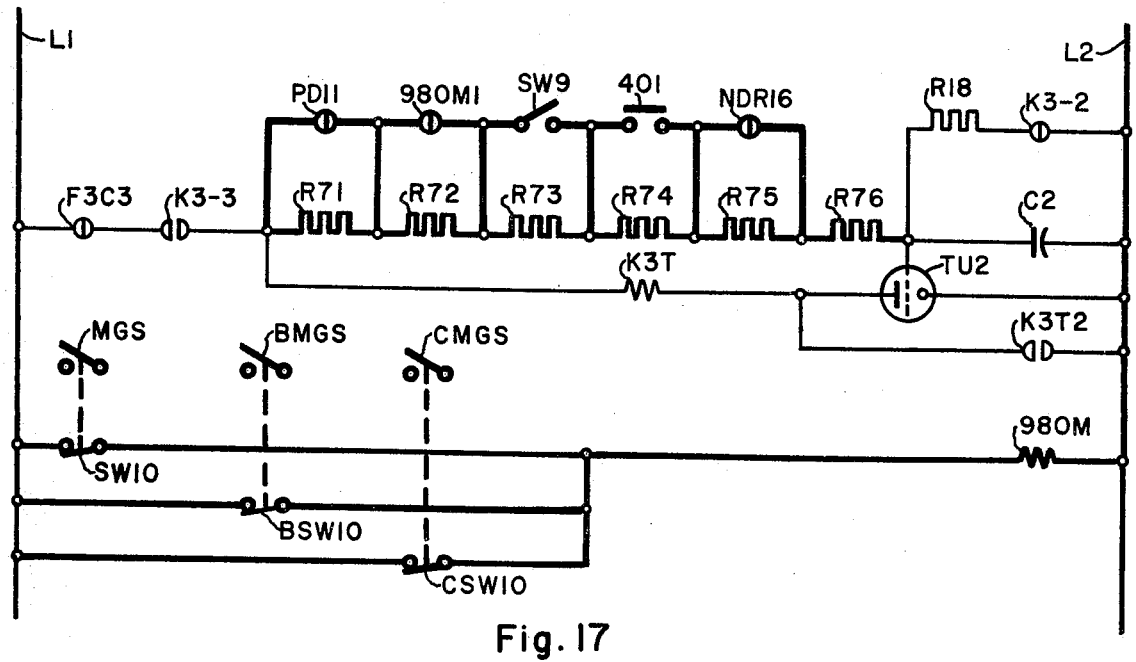
FIG. 17 is a schematic view in straight-line form illustrating a further aspect of the invention.
Figure 18A:
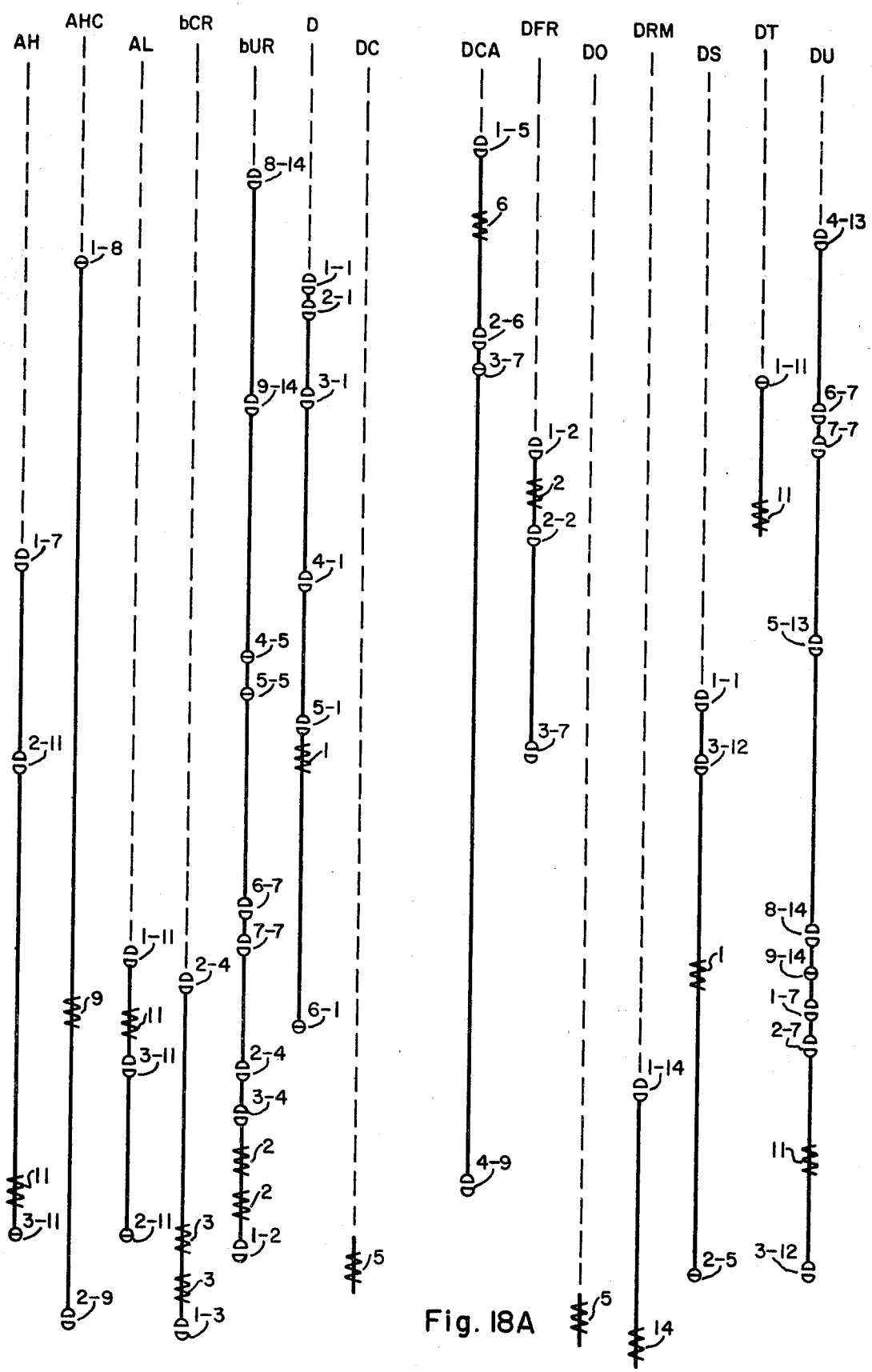
Figure 18B:
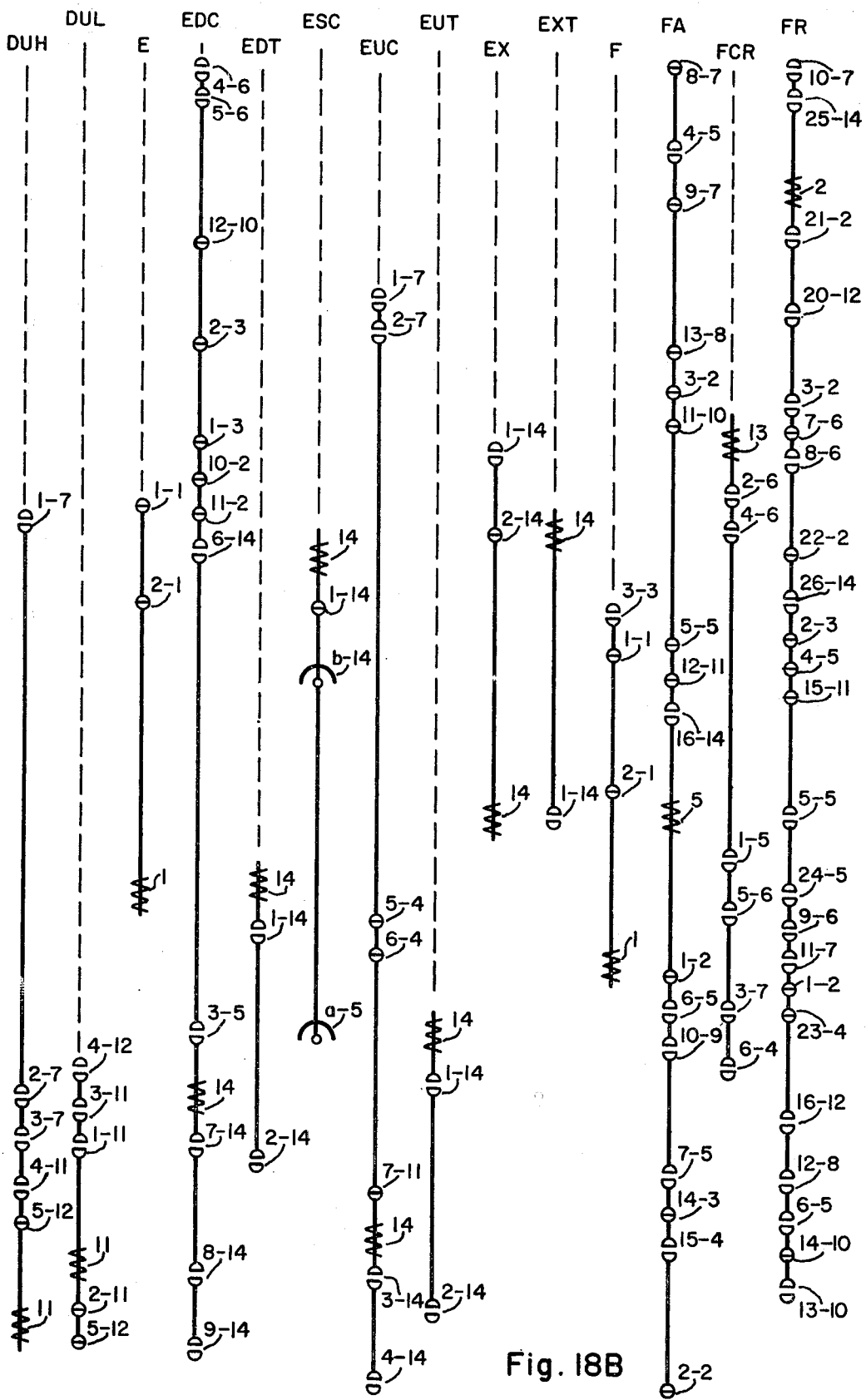
Figure 18C:
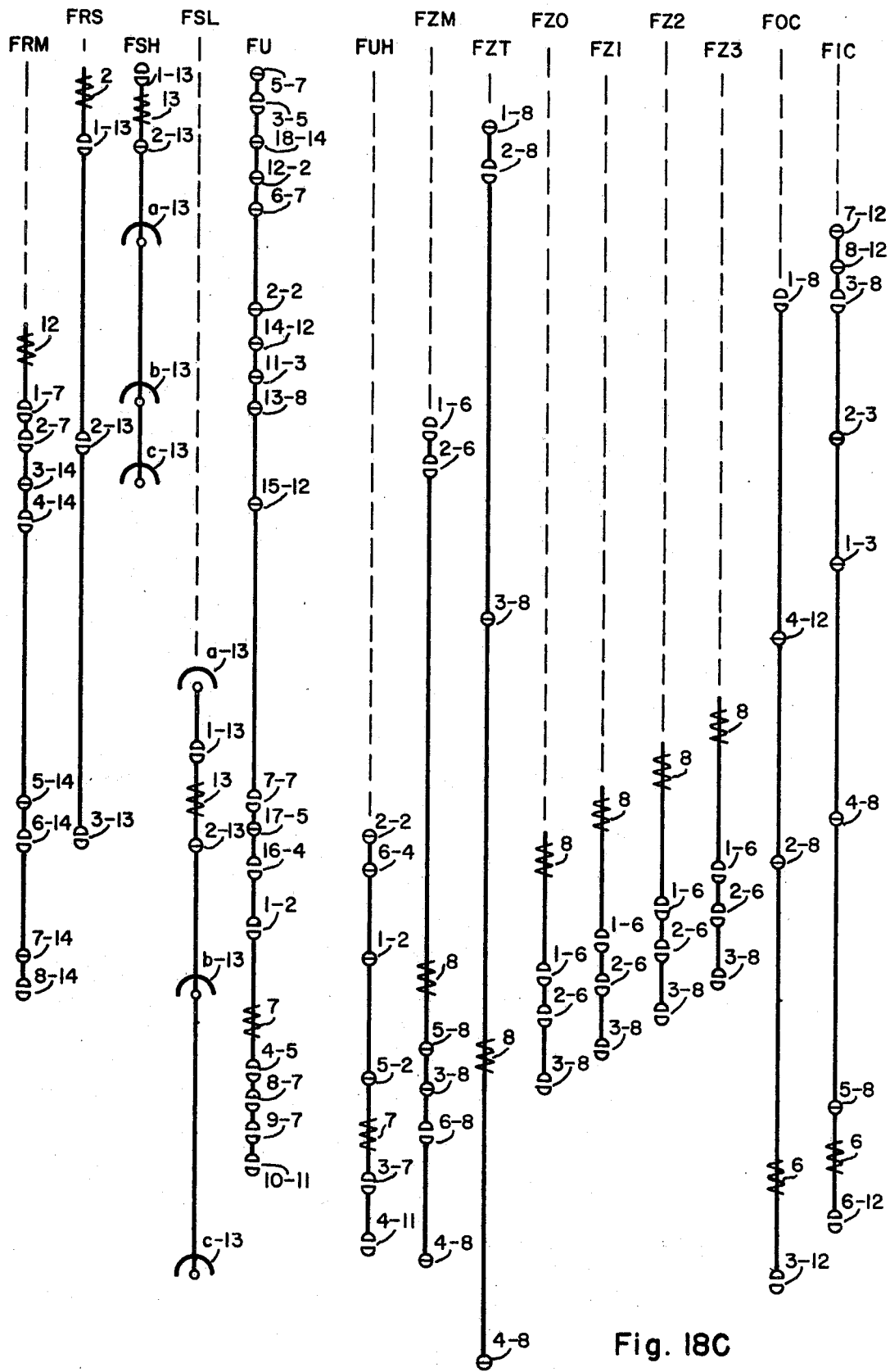
Figure 18D:
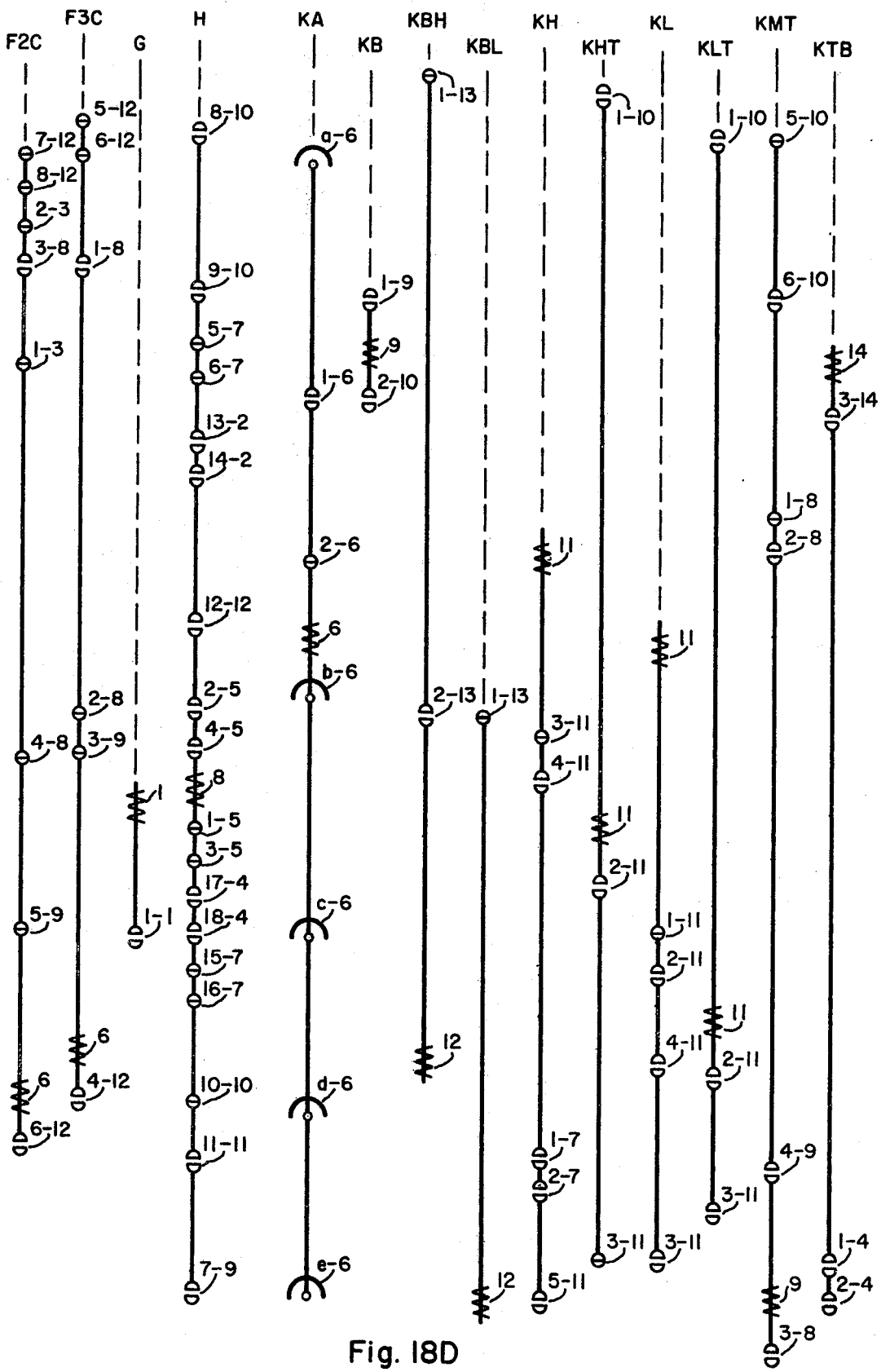
Figure 18E:
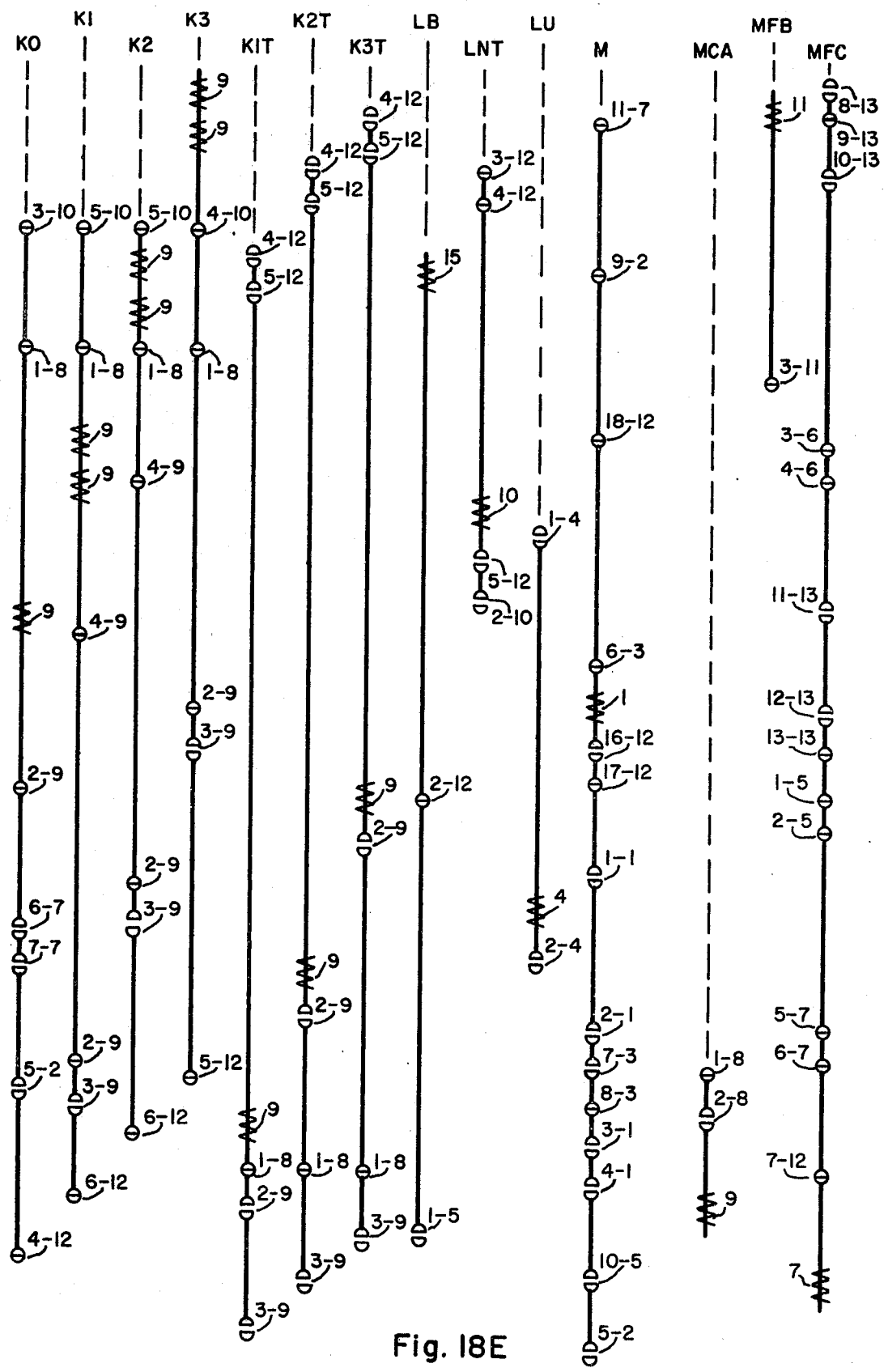
Figure 18F:
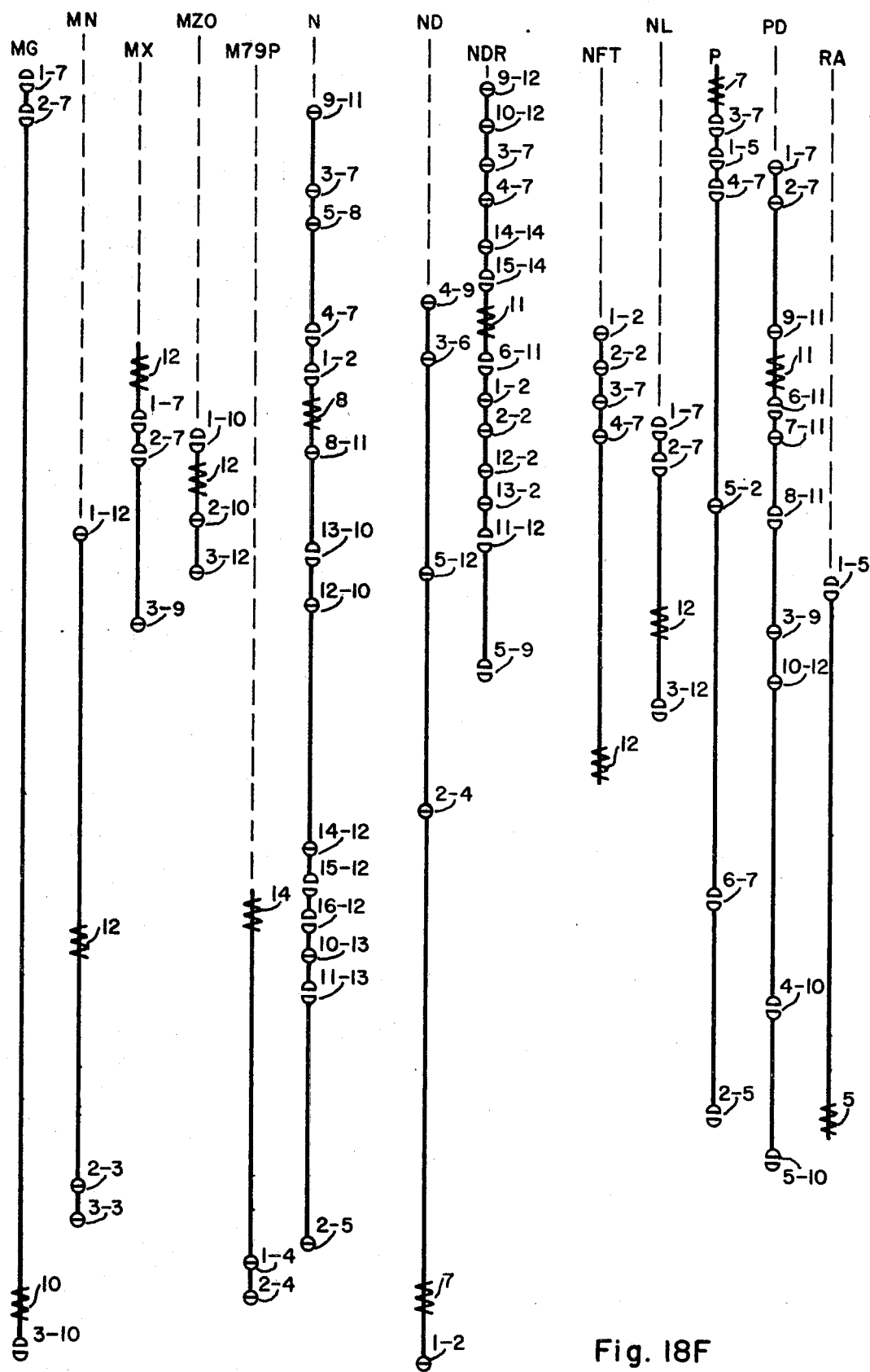
Figure 18G:
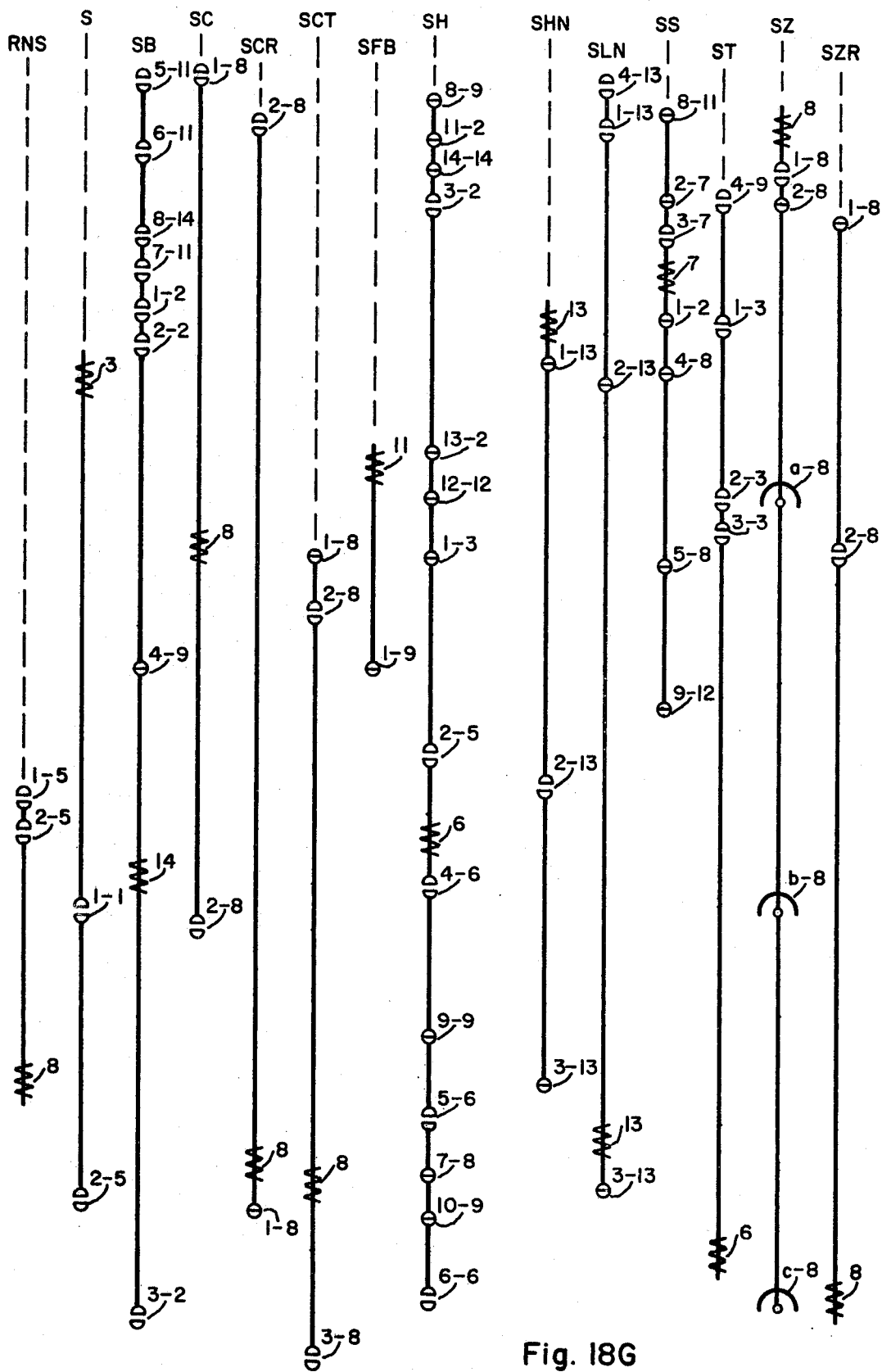
Figure 18H:
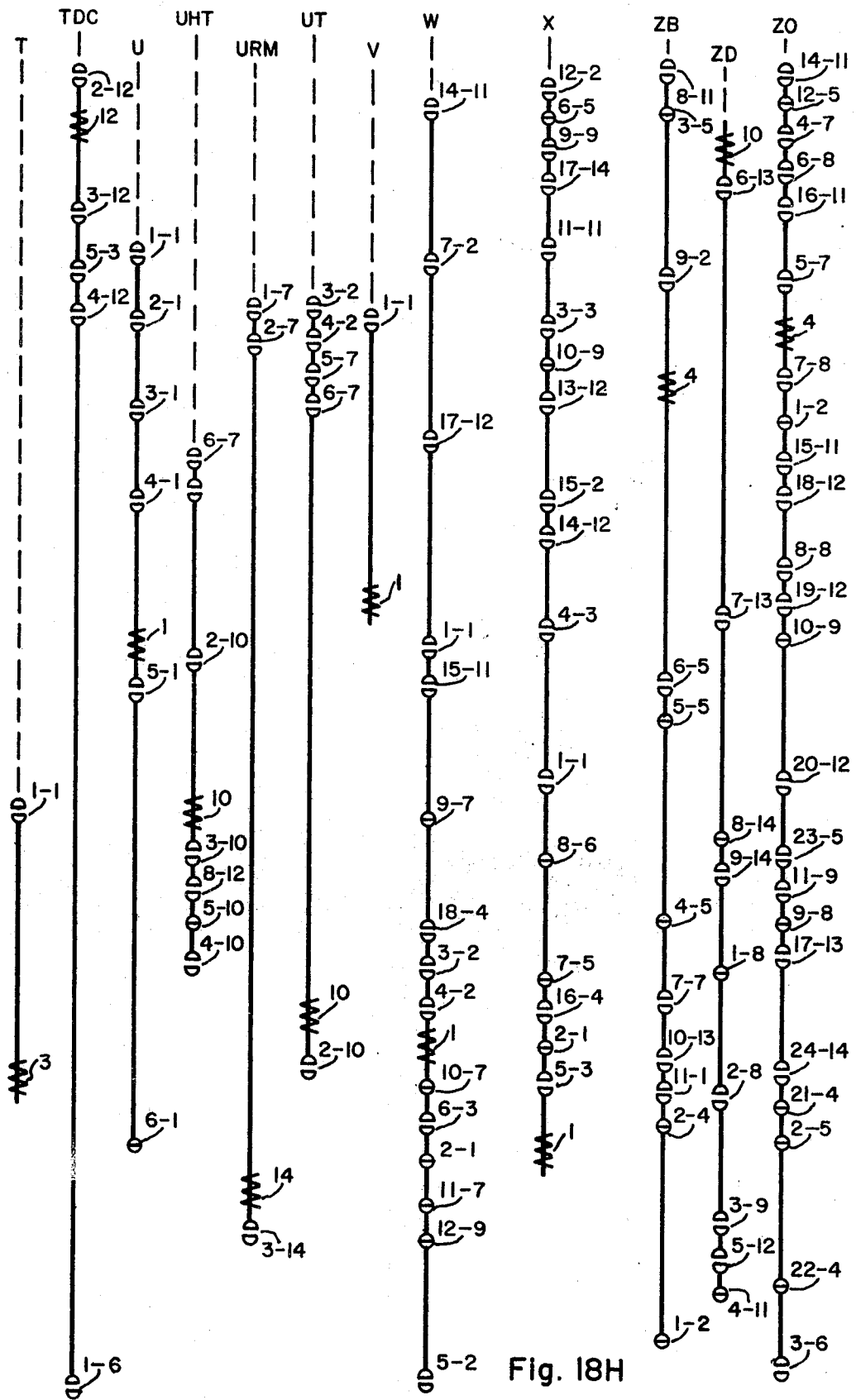
Figure 181:
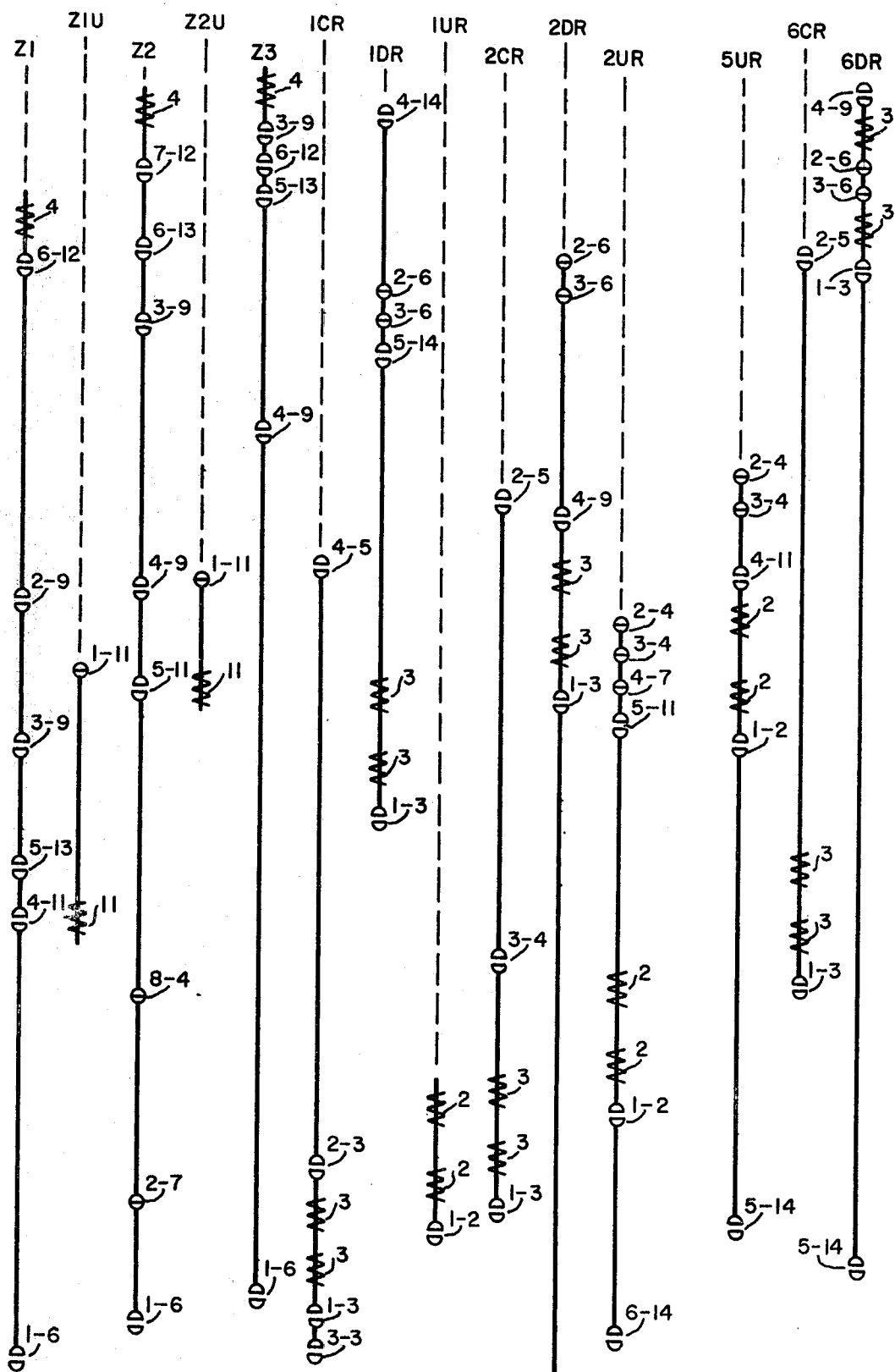
Figure 18J:
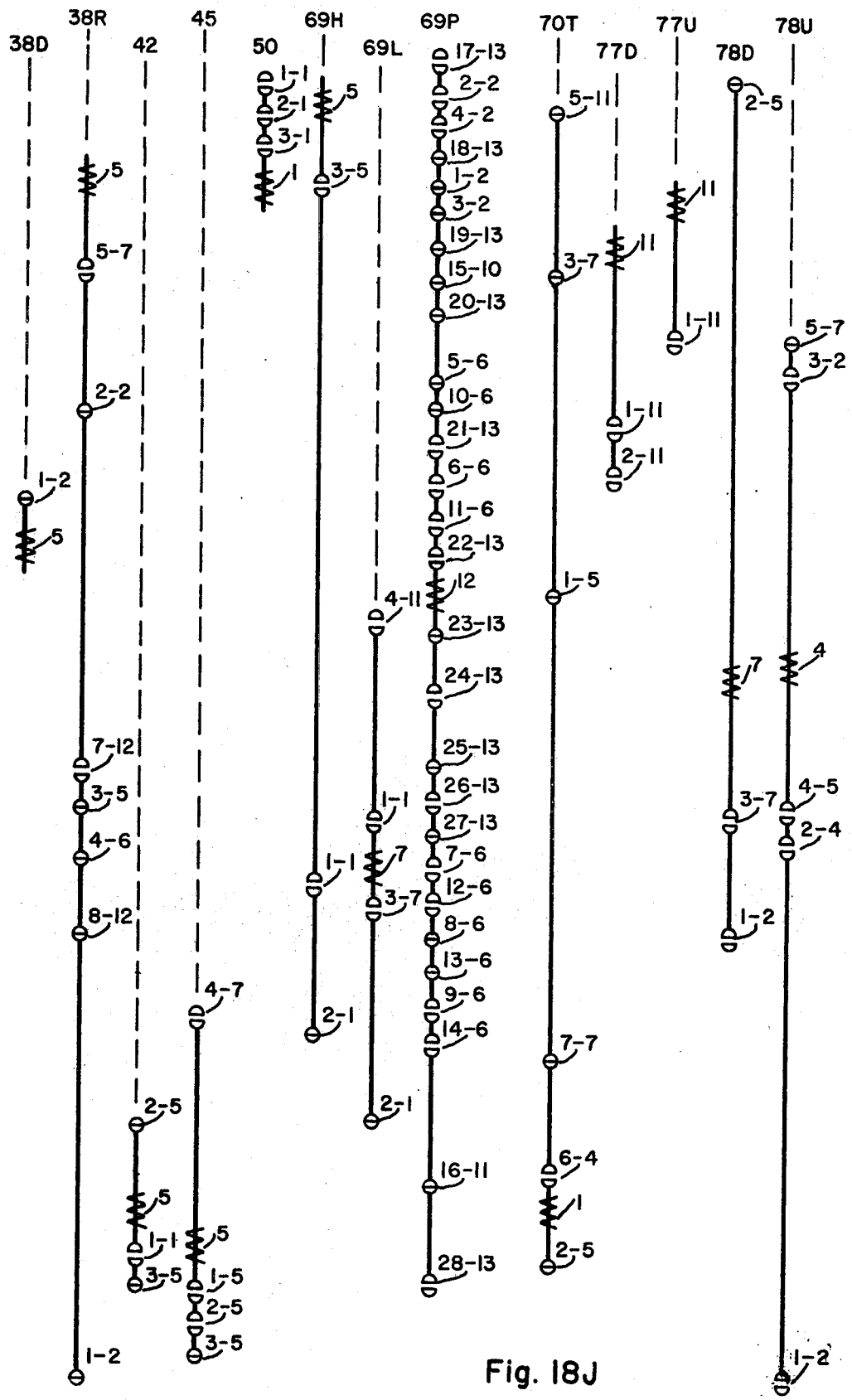
Figure 18K:
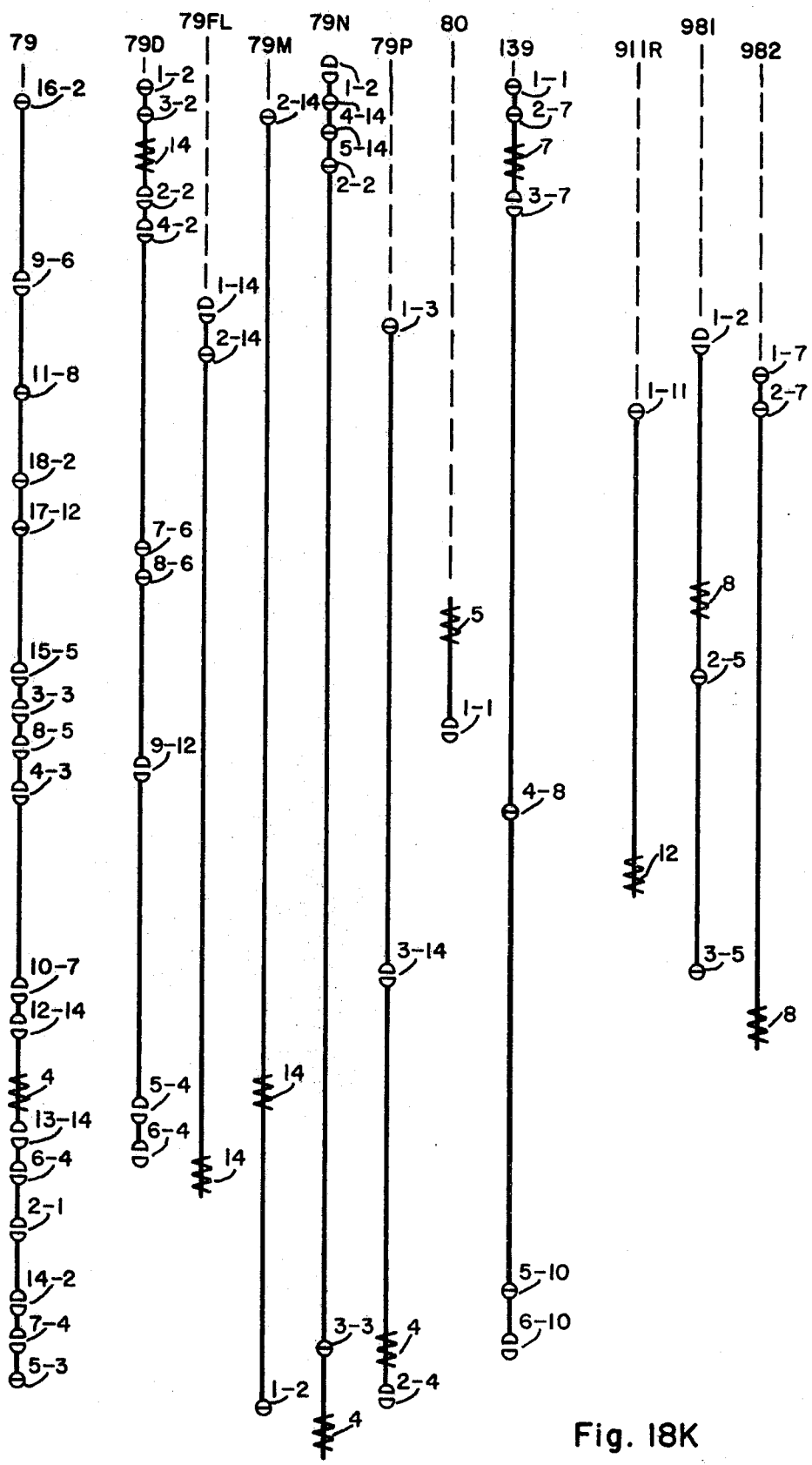

It will be recalled that the present elevator system includes means for furnishing preferential service for a zone of floors in which a floor call has been registered for greater than a predetermined time. The down zone timing relays K1T, K2T and K3T of FIG. 9, the low up zone timing relay KLT and the high up zone timing relay KHT of FIG. 11 and the basement timing relay KTB of FIG. 14 are provided for this purpose. Each of these relays has a fixed time delay in pickup, and, for the purpose of illustration, the time delay for each relay was assumed to be of the order of 40 seconds, with the exception of the relay KTB, whose basic time delay was assumed to be one minute. It may be desirable, however, for one or more of such relays to be provided with means for varying its time delay. To this end, reference may be made to FIG. 17, which shows a modified form of the timing circuits for the typical relay K3T, which is associated with the third down zone (sixth floor). It will be observed that all of the components associated with the relay K3T in FIG. 17 are identical to those shown for the same relay in FIG. 9, with the exception of the resistor R19, which has been replaced by serially-connected resistors R71 through R76.

Since the basic operation of the relay K3T has been described in detail in the discussion of FIG. 9, it is deemed unnecessary to repeat such description at this time. Suffice it to say that when break contacts F3C3 and make contacts K3-3 simultaneously are closed and break contacts K3-2 are open, the time delay in pickup of the relay K3T is dependent upon the period required for the capacitor C2 to charge sufficiently to fire the tube TU2 and that the charging rate of the capacitor is dependent upon the magnitude of its capacitance and of the resistance in series therewith. Let it be assumed initially, as is shown in FIG. 17, that break contacts PD11, 980M1 and NDR16 are closed and that a manually-operable switch SW9 and timing mechanism contacts 401 are open. As a result, the capacitor C2 must charge through the resistors R73, R74 and R76. It also will be assumed that the resistors R76 has a resistance sufficient to place a minimum limitation of 20 seconds on the time delay in pickup of the relay K3T and that each of the resistors R73 and R74 adds a time delay of 10 seconds. Thus, the resistors R73, R74 and R76 produce a total time delay of 40 seconds, which is equal to the time delay that the relay K3T heretofore was assumed to have.

During down peak periods of demand for service, it may be desirable to lengthen the time required for a for a floor call to become a priority call. It will be recalled that during such periods the instant dispatch relay PD is picked up to condition the elevator system for instant dispatch operation. In FIG. 17, such pickup is accompanied by opening of break contacts PD11 to lengthen the time delay in pickup of the relay K3T by an amount determined by the resistance of the resistor R72. This resistor may add a time delay of 20 seconds, for example, making the total time delay in pickup of the relay K3T 60 seconds.

It may be deemed desirable during down peak periods to increase in predetermined increments the time delay in pickup of the down zone timing relays respectively associated with down zones closer to the first floor. Thus, the time delay of the relay K2T for the second down zone (fourth and fifth floors) might be increased to 90 seconds, while the time delay of the relay K1T for the first down zone (second and third floors) might be lengthened to 120 seconds. In such instance, it will be apparent that the further away a down zone of floors lies from the first floor, the greater the perferential down service provided for such floors.

It also may be desirable to lengthen the time required for a floor call to become a priority call during up peak periods of demand for service. Assume now that the elevator system no longer is conditioned for instant dispatch operation, as indicated by closure of the contacts PD11, but that as a result of an up peak demand for service break contacts NDR16 have opened to indicate that the elevator system is conditioned for no demand return operation. Once again, the time delay in pickup of the relay K3T is increased, in this instance by amount determined by the resistance of the resistor R75. This resistance also may add a time delay of 20 seconds, for example, so that the total delay in pickup of the relay K3T again is increased from 40 to 60 seconds.

It will be observed that the circuits of FIG. 17 include a master car service relay 980M. Pickup of this relay indicates that at least one car in the elevator system is incapable of providing service. The relay 980M, for example, may be energized when at least one of three parallel switches, each of which is associated with a separate one of the elevator cars, is in its closed position. Thus, the switch SW10, which is associated with the car A, may be closed to pick up the relay 980M. Conveniently, the operating member of the switch SW10 may be coupled to the operating member of the switch MGS (FIG. 1), so that when the latter switch is opened to prevent operation of the car A, the switch SW10 is closed to energize the relay 980M. It will be understood that the corresponding switches BSW10 and CSW10 for the respective cars B and C operate in a similar manner.

Assume now that the switch SW10 has closed to indicate that the elevator car A is incapable of operation. Under this condition, it will be apparent that the average time during which a respective passenger must await the arrival of an elevator car to answer a floor call which he has registered is increased, since fewer elevator cars must serve the same number of floors. As a result, it is again desirable to lengthen the time required for a floor call to become a priority call. Thus, pickup of the relay 980M is accompanied by opening of its break contacts 980M1 to increase the time delay in pickup of the relay K3T by an amount now determined by the resistance of the resistor R72. This resistor may lengthen the time delay of the relay K3T by 10 seconds, for example, so that its total delay is 50 rather than 40 seconds.

Under certain conditions it may be desirable to shorten rather than lengthen the time required for a floor call to become a priority call. For instance, a floor such as a sixth floor in the present case may be occupied by executive personnel who wish their floor to be provided with special elevator service. For this purpose, the switch SW9 may be closed to shunt the resistor R73. From the preceding discussion, it will be understood that this results in a reduction of the basic time delay in pickup of the relay K3T from 40 to 30 seconds.

Finally, it may be desirable to provide special preferential service for a portion or all of the floors served by the elevator system at various times during the day. The timing mechanism contacts 401 may be employed to this end for the relay K3T. Thus, the contacts 401 may be operated by a clock to close for predetermined lengths of time at predetermined intervals, shunting the resistor R74. It will be clear that this again results in a reduction of the basic time delay in pickup of the relay K3T from 40 to 30 seconds, or, if the switch SW9 also is closed, from 30 to 20 seconds. It will be understood that contacts similar to the contacts 401 may be employed in association with the remaining timing relays in the control system for a similar purpose, but that all of such contacts need not necessarily be open or closed simultaneously or for the same periods of time.

We claim as our invention:

1. In an elevator system for a structure having a plurality of vertically-spaced floors including a main floor, a plurality of intermediate floors above the main floor and an extension floor below the main floor, a plurality of elevator cars, door means for each of the elevator cars operable for opening and closing a doorway of the associated elevator car, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, and selecting means for selecting an available one of the elevator cars to provide down elevator service from one of said intermediate floors a first one of said elevator cars being available for selection by the selecting means while such car is adjacent an intermediate one of the floors while a call is registered by the up floor call registering means for a floor above such first elevator car, the selecting means comprising assigning means for assigning an available car selected by the selecting means to answer a call for service registered by one of the down floor call registering means at an intermediate one of the floors.

2. In an elevator system for a structure having a plurality of vertically spaced floors including a station floor, a plurality of floors disposed on a first side of the station floor and an extension floor disposed on a second side of the station floor, a plurality of elevator cars, means mounting the elevator cars for movement relative to the structure to serve the floors, separate call registering means for each of a plurality of said floors located on the first side of said station floor, assigning means responsive to operation of said call registering means for assigning a separate one of said elevator cars to answer each of the operated call registering means, extension call registering means operable for registering a call for elevator service requiring movement of one of the elevator cars to the extension floor, and selecting means coacting with the assigning means for selecting one of the elevator cars when set for travel towards the extension floor within a range of several of the floors on said first side which are served by the cars for movement to the extension floor in response to operation of the extension call registering means, said selecting means when there are two elevator cars set for travel toward the extension floor and capable of serving the extension floor located on said first side within said range at different distances from the extension floor operating to select the one of such two elevator cars which is nearer to the extension floor.

3. In an elevator system for a structure having a plurality of vertically spaced floors including a station floor, a plurality of floors disposed in a first direction from the station floor and an extension floor disposed in a second direction from the station floor, a plurality of elevator cars, means mounting the elevator cars for movement relative to the structure to serve the floors, separate call registering means for each of a plurality of said floors located on the first side of said station floor, assigning means responsive to operation of said call registering means for assigning a separate one of said elevator cars to answer each of the operated call registering means, extension call registering means operable for registering a call for elevator service requiring movement of one of the elevator cars to the extension floor, and selecting means for selecting one of the elevator cars when located within a range of several of said floors served by the cars for movement to the extension floor in response to operation of the extension call registering means, said selecting means comprising scanning means for successively scanning in said first direction cars capable of serving the extension floor, and means coacting with the assigning means responsive to arrival of the scan at the first elevator car within said range capable of serving the extension floor for assigning such first elevator car to respond to a call registered by the call registering means.

4. In an elevator system for a structure having a plurality of vertically spaced floors including a station floor, a plurality of floors disposed on a first side of the station floor and an extension floor disposed on a second side of the station floor, a plurality of elevator cars, means mounting the elevator cars for movement relative to the structure to serve the floors, extension call registering means operable for registering a call for elevator service requiring movement of one of the elevator cars to the extension floor, second call registering means for registering a call for service toward said station floor for each of a plurality of said floors disposed on said first side, means for stopping each of the elevator cars when traveling toward said extension floor at each floor approached by such elevator car for which a call is registered by the second call registering means, assigning means responsive to operation of the second call registering means for assigning a separate one of said elevator cars to answer each of the operated second call registering means, and selecting means coacting with the assigning means for selecting one of the elevator cars for movement to the extension floor in response to operation of the extension call registering means, said selecting means when there are two elevator cars traveling toward the extension floor capable of serving the extension floor located at different distances from the extension floor operating to select the one of such two elevator cars which is nearer to the extension floor, and means responsive to a predetermined call registration by the extension call registering means for causing one of the elevator cars selected by the selecting means to by-pass a floor approached by the selected elevator car for which a call is registered by the second call registering means.

5. In an elevator system for a structure having a plurality of vertically spaced floors including a station floor, a plurality of floors disposed on a first side of the station floor and an extension floor disposed on a second side of the station floor, a plurality of elevator cars, means mounting the elevator cars for movement relative to the structure to serve the floors, extension call registering means operable for registering a call for elevator service requiring movement of one of the elevator cars to the extension floor, second call registering means for registering a call for service toward said station floor for each of a plurality of said floors disposed on said first side, means for stopping each of the elevator cars when traveling toward said extension floor at each floor approached by such elevator car for which a call is registered by the second call registering means, assigning means responsive to operation of the second call registering means for assigning a separate one of said elevator cars to answer each of the operated second call registering means, and selecting means for selecting one of the elevator cars for movement to the extension floor in response to operation of the extension call registering means, said selecting means when there are two elevator cars traveling toward the extension floor capable of serving the extension floor located at different distances from the extension floor operating to select the one of such two elevator cars which is nearer to the extension floor, and means responsive to a predetermined call registration by the extension call registering means for causing one of the elevator cars selected by the selecting means to by-pass a floor approached by the selected elevator car for which a call is registered by the second call registering means for less than a predetermined time, said last-named registered call if registered for more than said predetermined time being effective for stopping said selected elevator car.

6. In a load transporting system for a structure having a plurality of spaced stations, including a primary station, a plurality of first stations disposed in a first direction from the primary station and an extension station disposed in a second direction from the primary station, a load transporting car, means mounting the car for movement relative to the structure to transport load between the stations, extension call registering means operable for registering a call for transport service requiring movement of a car to the extension floor, second call registering means for registering a call for transport service in the second direction from each of a plurality of said first stations, means for stopping the car at each station approached by the car when traveling in the second direction for which a call as registered by the second call registering means, and means responsive to a predetermined call registration by the extension call registering means for conditioning the car while traveling in the second direction to pass without stopping at a station for which a call is registered by the second call registering means.

7. In a load transporting system for a structure having a plurality of spaced stations, including a primary station, a plurality of first stations disposed in a first direction from the primary station and an extension station disposed in a second direction from the primary station, a load transporting car, means mounting the car for movement relative to the structure to transport load between the stations, extension call registering means operable for registering a call for transport service requiring movement of a car to the extension floor, second call registering means for registering a call for transport service in the second direction from each of a plurality of said first stations, means for stopping the car at each station approached by the car when traveling in the second direction for which a call as registered by the second call registering means, and means responsive to a predetermined call registration by the extension call registering means for conditioning the car while traveling in the second direction to pass without stopping a station for which a call is registered by the second call registering means for less than a predetermined time, said last-named call if registered for more than said predetermined time being effective for stopping said conditioned car.

8. In an elevator system for a structure having a plurality of vertically spaced floors including a station floor, a plurality of floors disposed on a first side of the station floor and an extension floor disposed on a second side of the station floor, a plurality of elevator cars, means mounting the elevator cars for movement relative to the structure to serve the floors, extension call registering means operable for registering a call for elevator service requiring movement of one of the elevator cars to the extension floor, second call registering means for registering a call for service toward said station floor for each of a plurality of said floors disposed on said first side, means for stopping each of the elevator cars when traveling toward said extension floor at each floor approached by such elevator car for which a call is registered by the second call registering means, assigning means responsive to operation of the second call registering means for assigning a separate one of said elevator cars to answer each of the operated second call registering means, and selecting means for selecting one of the elevator cars for movement to the extension floor in response to operation of the extension call registering means, said selecting means when there are two elevator cars traveling toward the extension floor capable of serving the extension floor located at different distances from the extension floor operating to select the one of such two elevator cars which is nearer to the extension floor, and means responsive to a predetermined call registration by the extension call registering means for causing one of the elevator cars selected by the selecting means to bypass a floor approached by the selected elevator car for which a call is registered by the second call registering means, and means responsive to assignment of a second elevator car to serve the extension floor while the car selected by the selecting means is conditioned for said by-pass of a floor for preventing the second elevator car from bypassing a floor for which a call is registered by the second call registering means.

9. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by the car when traveling in the second direction for which a call is registered by the second call registering means, means effective with at least one of the cars stopped at the primary station for designating one of the cars at the primary station as the next car to leave the primary station, and selecting means responsive to registration of a call by the extension call registering means for selecting to answer such call registration the first car available in the following sequence:

(A) a car adjacent the extension station;
(B) a non-next available car at the primary station;
(C) a next available car at the primary station;
(D) the nearest car to the extension station traveling in the second direction.

10. In an elevator system for a structure having a plurality of vertically spaced floors including a station floor, a plurality of floors disposed on a first side of the station floor and an extension floor disposed on a second side of the station floor, a plurality of elevator cars, means mounting the elevator cars for movement relative to the structure to serve the floors, extension call registering means operable for registering a call for elevator service requiring movement of one of the elevator cars to the extension floor, and selecting means for selecting one of the elevator cors for movement to the extension floor in response to operation of the call registering means, said selecting means when there are two of the elevator cars capable of serving the extension floor located at different distances from the extension floor operating to select the one of such two elevator cars which is nearer to the extension floor, means for stopping each of the elevator cars traveling on the first side of the station floor towards the station floor at the station floor, and means responsive to registration of a call by the extension call registering means for causing one of the cars approaching the station floor from the first side to pass the station floor without stopping.

11. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by each of the cars when traveling in the second direction for which a call is registered by the second call registering means, means for stopping at the primary station each of the cars traveling in the second direction towards the primary station, and means effective in response to the absence of each of the cars from a position adjacent the extension station for assigning one of the cars to proceed to the extension station.

12. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by each of the cars when traveling in the second direction for which a call is registered by the second call registering means, means responsive to registration of a call by the extension call registering means for more than a predetermined substantial time without response by one of the elevator cars to such call for expediting service by one of the elevator cars to such call, and means responsive to a predetermined condition for altering the value of said predetermined substantial time.

13. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by each of the cars when traveling in the second direction for which a call is registered by the second call registering means, means responsive to registration of a call by the extension call registering means for more than a predetermined substantial time without response by one of the elevator cars to such call for expediting service by one of the elevator cars to such call, and means responsive to a predetermined demand for elevator service for altering the value of said predetermined substantial time.

14. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by each of the cars when traveling in the second direction for which a call is registered by the second call registering means, means responsive to a first predetermined condition for causing a certain plurality of the cars to be present when available at a predetermined one of the stations, and means responsive to a second predetermined condition to alter the number of the cars caused to be present when available at the predetermined one of the stations during said first predetermined condition.

15. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by each of the cars when traveling in the second direction for which a call is registered by the second call registering means, means responsive to a first predetermined demand for service for causing a certain plurality of the cars to be present when available at the primary station with none of the cars present when available at the extension station in the absence of a call registered by the extension call registering means, and means responsive to a second predetermined condition while said predetermined demand for service is present for reducing the number of the available cars required to be at the primary station, said last-named means being effective in response to the second predetermined condition for causing one of the cars when available to be present at the extension station 16. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by each of the cars when traveling in the second direction for which a call is registered by the second call registering means, and means responsive to a predetermined condition for causing a first one of the elevator cars when available to be present at the primary station and a second one of the elevator cars when available to be present at the extension station.

17. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by each of the cars when traveling in the second direction for which a call is registered by the second call registering means, and means responsive to a predetermined condition with no car present at either the primary station or the extension station for causing two of the elevator cars when available to proceed respectively to the primary and extension stations and to pass without stopping at stations for which calls are registered by the second call registering means.

18. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by each of the cars when traveling in the second direction for which a call is registered by the second call registering means, primary expediting means responsive to a predetermined traffic condition for expediting service available from the primary station in the first direction, secondary expediting means responsive to a second predetermined condition for expediting service for the extension station, and means responsive to operation of the extension expediting means for altering the parameters of the predetermined traffic condition to which the primary expediting means responds.

19. In a load transporting system for a structure having a plurality of spaced stations, including a primary station, a plurality of first stations disposed in a first direction from the primary station and an extension station disposed in a second direction from the primary station, a plurality of load transporting cars, means mounting each of the cars for movement relative to the structure to transport load between the stations, extension call registering means operable for registering a call for transport service requiring movement of a car to the extension floor, second call registering means for registering a call for transport service in the second direction from each of a plurality of said first stations, means for stopping each of the cars at each station approached by each of the cars when traveling in the second direction for which a call is registered by the second call registering means, primary expediting means responsive to a predetermined traffic condition other than car loading at the extension station for expediting service available from the primary station in the first direction, secondary expediting means responsive to a second predetermined condition for expediting service for the extension station, and means responsive to operation of the extension expediting means for causing said predetermined traffic condition to include car loading at the extension station.

20. In an elevator system for a structure having a plurality of vertically-spaced floors including a lower terminal floor and a plurality of intermediate floors above the lower terminal floor divided into a plurality of zones, a plurality of elevator cars, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, and scanning means for scanning the elevator cars to select a car available for assignment to any of said zones, said scanning means being effective upon reaching a car at one of said intermediate floors in a predetermined condition wherein such car is set for down travel and has no call registered by the associated car call means for a floor ahead of such car for selecting such car as an available first car for assignment to any one of said zones, and means responsive to a predetermined condition of each one of said zones for assigning a car selected by the scanning means to any of the zones having such predetermined condition.

21. In an elevator system for a structure having a plurality of vertically-spaced floors including a lower terminal floor and a plurality of intermediate floors above the lower terminal floor divided into a plurality of zones, a plurality of elevator cars, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, selecting means for selecting the next one of the elevator cars to leave the bottom one of said floors in the up direction, and scanning means for scanning the elevator cars to select as available a car available for assignment to any of said zones, said scanning means being effective upon reaching a car at the lower terminal floor in a predetermined condition wherein no call is registered by the associated car call means for selecting such car as an available first car for assignment to any one of said zones, and said scanning means being effective upon reaching a car at one of said intermediate floors in a predetermined condition wherein such car is set for down travel and has no call registered by the associated car call means for a floor ahead of such car for selecting such car as an available first car for assignment to any one of said zones, and means responsive to a predetermined condition of each one of said zones for assigning a car selected by the scanning means to any of the zones having such predetermined condition.

22. In an elevator system for a structure having a plurality of vertically-spaced floors including a lower terminal floor and a plurality of intermediate floors above the lower terminal floor divided into a plurality of zones, a plurality of elevator cars having car doors, means mounting the elevator cars for movement relative to the structure to serve the floors, down floor call registering means operable for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, selecting means for selecting the next one of the elevator cars to leave the bottom one of said floors in the up direction, and scanning means for scanning the elevator cars to select a car available for assignment to any of said zones, said scanning means being effective upon reaching a car at the lower terminal floor in a predetermined condition wherein no call is registered by the associated car call means for selecting such car as an available first car for assignment to any one of said zones, and said scanning means being effective upon reaching a car at one of said intermediate floors in a predetermined condition wherein such car is set for down travel, is stopped with its doors substantially closed and has no call registered by the associated car call means for a floor ahead of such car for selecting such car as an available first car for assignment to any one of said zones, and means responsive to a predetermined condition of each one of said zones for assigning a car selected by the scanning means to any of the zones having such predetermined condition, said scanning means being effective, in the absence of said first car, for selecting as available one of the elevator cars which is selected by the selecting means as the next one of the elevator cars to leave the bottom one of the floors provided that no call is registered by the car call registering means for the last-named car.

23. In an elevator system for a structure having a plurality of vertically-spaced floors including a lower terminal floor, said floors being divided into zones each including at least one of the floors, a plurality of elevator cars, means mounting each of the elevator cars for movement relative to the structure to serve said floors, car call registering means for each of the elevator cars operable for registering a call for each of a plurality of said floors which may be desired by load in the associated elevator car, up call registering mans operable for registering a call for up elevator service from each of a plurality of said floors located in a plurality of said zones, up demand means for each of said zones operable for indicating demand for up service for the associated one of said zones in response to registration of an up call by the up call registering means for at least one of the floors of the associated zone with no car set for up travel in such asociated zone, selecting means for selecting the next one of the elevator cars to leave the lower terminal floor, scanning means for scanning the elevator cars to select as an available car a first car which is set for up travel, which has no call registered by the car call registering means for a floor above such first car and which is not selected by the selecting means, one of said cars set for down travel becoming selectable as the first car by the scanning means at an intermediate floor if no car call is registered by the car call registering means for a floor below such car, and assigning means responsive to operation of said up demand means for each of the zones for assigning said first car to answer up call registration for the zone corresponding to the operated up demand means.

24. An elevator system as claimed in claim 8 including car call registering means for each of the elevator cars for registering calls for floors desired by car passengers, first call registering means for registering a call for service for each of a plurality of floors on said first side for stopping each of the elevator cars when traveling away from the extension floor at each floor approached by such elevator car for which a call is registered by the first call registering means, said assigning means comprising means effective in the presence of a call registered by said first call registering means for a floor ahead of one of the elevator cars when set for travel away from the extension floor for selecting the last-named car for assignment, means cooperating with the assignment means in response to a predetermined failure of an assigned elevator car to answer an assignment for transferring such assignment to another of said elevator cars, said predetermined call registration comprising a call which remains registered for a predetermined time, means responsive to a predetermined system service condition for altering the value of said predetermined time, said assigning means being effective for assigning an elevator car on said first side set for travel towards the station floor and having no car call registered for a floor ahead of such elevator car.

References Cited

UNITED STATES PATENTS

| | | | |
|---|---|---|---|
| 2,936,858 | 4/1960 | Hornung et al. | 187—29 |
| 2,973,059 | 2/1961 | Hornung | 187—29 |
| 3,256,958 | 6/1966 | Savino et al. | 187—29 |
| 3,292,736 | 12/1966 | Savino et al. | 187—29 |
| 2,688,384 | 9/1954 | Yeasting | 187—29 |
| 2,717,056 | 9/1955 | Santini et al. | 187—29 |
| 2,795,298 | 6/1957 | Suozzo et al. | 187—29 |
| 2,827,980 | 3/1958 | Suozzo et al. | 187—29 |
| 2,857,987 | 10/1958 | Savino | 187—29 |
| 3,022,864 | 2/1962 | Burgy et al. | 187—29 |
| 2,857,987 | 10/1958 | Savino et al. | 187—29 |
| 2,998,866 | 9/1961 | Dinning | 187—29 |
| 2,833,376 | 5/1958 | Burgy | 187—29 |
| 2,968,364 | 1/1961 | Robertson | 187—29 |
| 2,795,296 | 6/1957 | Suozzo | 187—29 |
| 2,728,417 | 12/1955 | Burgy | 187—29 |
| 2,840,189 | 6/1958 | Santini et al. | 187—29 |
| 2,934,170 | 4/1960 | Yeasting | 187—29 |
| 2,492,010 | 12/1949 | Santini | 187—29 |
| 2,621,759 | 12/1952 | Esselman | 187—29 |

THOMAS E. LYNCH, Primary Examiner